US009424709B2

(12) United States Patent
Kitamura et al.

(10) Patent No.: US 9,424,709 B2
(45) Date of Patent: Aug. 23, 2016

(54) GAMING MACHINE

(71) Applicants: Universal Entertainment Corporation, Koto-ku, Tokyo (JP); Aruze Gaming America, Inc., Las Vegas, NV (US)

(72) Inventors: Kenta Kitamura, Tokyo (JP); Kenji Enokido, Tokyo (JP); Kou Kobayashi, Tokyo (JP)

(73) Assignees: Universal Entertainment Corporation, Tokyo (JP); Aruze Gaming America, Inc., Las Vegas, NV (US)

(*) Notice: Subject to any disclaimer, the term of this patent is extended or adjusted under 35 U.S.C. 154(b) by 112 days.

(21) Appl. No.: 13/870,455

(22) Filed: Apr. 25, 2013

(65) Prior Publication Data

US 2013/0288797 A1 Oct. 31, 2013

(30) Foreign Application Priority Data

Apr. 27, 2012 (JP) ................................ 2012-104207

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ................................ *G07F 17/3206* (2013.01)

(58) Field of Classification Search
CPC . G07F 17/32; G07F 17/3204; G07F 17/3206
USPC ...................... 463/39, 30, 33, 34, 36, 37, 46
See application file for complete search history.

(56) References Cited

U.S. PATENT DOCUMENTS

| | | | | |
|---|---|---|---|---|
| 7,627,139 | B2 * | 12/2009 | Marks et al. | 382/103 |
| 8,702,485 | B2 * | 4/2014 | Flury et al. | 463/7 |
| 2001/0024970 | A1 * | 9/2001 | McKee | G07F 17/32 463/16 |
| 2004/0053661 | A1 * | 3/2004 | Jones et al. | 463/16 |
| 2004/0166937 | A1 | 8/2004 | Rothschild et al. | |
| 2008/0113708 | A1 * | 5/2008 | Beadell et al. | 463/16 |
| 2011/0250947 | A1 | 10/2011 | Okamoto | |

OTHER PUBLICATIONS

Office Action dated Jun. 3, 2015 issued in connection with corresponding Chinese Patent Application No. 201310150941.9.

* cited by examiner

*Primary Examiner* — Kevin Y Kim
(74) *Attorney, Agent, or Firm* — KMF Patent Services, PLLC; Kenneth M. Fagin, Esq.; S. Peter Konzel, Esq.

(57) ABSTRACT

A gaming machine with more gaming excitement is provided. The gaming machine includes: a lamp body provided with LEDs so that the lighting state thereof is viewable from the outside; a sensor configured to detect a player's gesture with respect to the lamp body 132; and a controller used to start a game, the controller starting the detection of the player's gesture by the sensor at a timing corresponding to the state of the game, and causing the LEDs to emit light in a light emission mode in sync with the detected player's gesture while the player's gesture is being detected.

6 Claims, 58 Drawing Sheets

FIG.18

DETECTION STATE STORAGE TABLE

| FRAME | STATE |
|---|---|
| 1 | OFF |
| 2 | ON |
| 3 | OFF |
| 4 | ON |
| 5 | ON |
| 6 | OFF |
| 7 | ON |
| 8 | ON |
| 9 | OFF |
| 10 | ON |
| ... | ... |

FIG.52

EXPAND FEATURE WEIGHT TABLE

| ID | COMBINATIONS | | | | | WEIGHT | PROB |
|---|---|---|---|---|---|---|---|
| | R1 | R2 | R3 | R4 | R5 | | |
| 0 | WILD | WILD | WILD | WILD | WILD | 0 | 0.00% |
| 1 | /WILD | WILD | WILD | WILD | WILD | 0 | 0.00% |
| 2 | WILD | /WILD | WILD | WILD | WILD | 0 | 0.00% |
| 3 | WILD | WILD | /WILD | WILD | WILD | 0 | 0.00% |
| 4 | WILD | WILD | WILD | /WILD | WILD | 0 | 0.00% |
| 5 | WILD | WILD | WILD | WILD | /WILD | 0 | 0.00% |
| 6 | /WILD | /WILD | WILD | WILD | WILD | 4 | 3.20% |
| 7 | /WILD | WILD | /WILD | WILD | WILD | 5 | 4.00% |
| 8 | /WILD | WILD | WILD | /WILD | WILD | 2 | 1.60% |
| 9 | /WILD | WILD | WILD | WILD | /WILD | 2 | 1.60% |
| 10 | WILD | /WILD | /WILD | WILD | WILD | 6 | 4.80% |
| 11 | WILD | /WILD | WILD | /WILD | WILD | 2 | 1.60% |
| 12 | WILD | /WILD | WILD | WILD | /WILD | 2 | 1.60% |
| 13 | WILD | WILD | /WILD | /WILD | WILD | 2 | 1.60% |
| 14 | WILD | WILD | /WILD | WILD | /WILD | 2 | 1.60% |
| 15 | WILD | WILD | WILD | /WILD | /WILD | 2 | 1.60% |
| 16 | /WILD | /WILD | /WILD | WILD | WILD | 10 | 8.00% |
| 17 | /WILD | /WILD | WILD | /WILD | WILD | 12 | 9.60% |
| 18 | /WILD | /WILD | WILD | WILD | /WILD | 10 | 8.00% |
| 19 | /WILD | WILD | /WILD | /WILD | WILD | 12 | 9.60% |
| 20 | /WILD | WILD | /WILD | WILD | /WILD | 10 | 8.00% |
| 21 | /WILD | WILD | WILD | /WILD | /WILD | 8 | 6.40% |
| 22 | WILD | /WILD | /WILD | /WILD | WILD | 9 | 7.20% |
| 23 | WILD | /WILD | /WILD | WILD | /WILD | 9 | 7.20% |
| 24 | WILD | /WILD | WILD | /WILD | /WILD | 8 | 6.40% |
| 25 | WILD | WILD | /WILD | /WILD | /WILD | 8 | 6.40% |
| 26 | /WILD | /WILD | /WILD | /WILD | WILD | 0 | 0.00% |
| 27 | /WILD | /WILD | /WILD | WILD | /WILD | 0 | 0.00% |
| 28 | /WILD | /WILD | WILD | /WILD | /WILD | 0 | 0.00% |
| 29 | /WILD | WILD | /WILD | /WILD | /WILD | 0 | 0.00% |
| 30 | WILD | /WILD | /WILD | /WILD | /WILD | 0 | 0.00% |
| TOTAL | | | | | | 125 | 100.00% |

FIG.53

CREDIT PAYOUT BONUS GAME TABLE

| NO | WIN | WEIGHT | PROB | NO | WIN | WEIGHT | PROB |
|---|---|---|---|---|---|---|---|
| 0 | 50 | 3 | 1.6% | 28 | 330 | 2 | 1.1% |
| 1 | 60 | 3 | 1.6% | 29 | 340 | 2 | 1.1% |
| 2 | 70 | 3 | 1.6% | 30 | 350 | 5 | 2.7% |
| 3 | 80 | 3 | 1.6% | 31 | 360 | 2 | 1.1% |
| 4 | 90 | 3 | 1.6% | 32 | 370 | 2 | 1.1% |
| 5 | 100 | 12 | 6.4% | 33 | 380 | 2 | 1.1% |
| 6 | 110 | 15 | 8.0% | 34 | 390 | 2 | 1.1% |
| 7 | 120 | 15 | 8.0% | 35 | 400 | 5 | 2.7% |
| 8 | 130 | 15 | 8.0% | 36 | 410 | 2 | 1.1% |
| 9 | 140 | 15 | 8.0% | 37 | 420 | 2 | 1.1% |
| 10 | 150 | 15 | 8.0% | 38 | 430 | 2 | 1.1% |
| 11 | 160 | 12 | 6.4% | 39 | 440 | 2 | 1.1% |
| 12 | 170 | 12 | 6.4% | 40 | 450 | 5 | 2.7% |
| 13 | 180 | 12 | 6.4% | 41 | 460 | 2 | 1.1% |
| 14 | 190 | 5 | 2.7% | 42 | 470 | 2 | 1.1% |
| 15 | 200 | 5 | 2.7% | 43 | 480 | 2 | 1.1% |
| 16 | 210 | 3 | 2.7% | 44 | 490 | 2 | 1.1% |
| 17 | 220 | 3 | 2.7% | 45 | 500 | 5 | 2.7% |
| 18 | 230 | 3 | 2.7% | 46 | 510 | 2 | 1.1% |
| 19 | 240 | 3 | 2.7% | 47 | 520 | 2 | 1.1% |
| 20 | 250 | 6 | 3.2% | 48 | 530 | 2 | 1.1% |
| 21 | 260 | 3 | 1.6% | 49 | 540 | 2 | 1.1% |
| 22 | 270 | 3 | 1.6% | 50 | 550 | 5 | 2.7% |
| 23 | 280 | 3 | 1.6% | 51 | 560 | 2 | 1.1% |
| 24 | 290 | 3 | 1.6% | 52 | 570 | 2 | 1.1% |
| 25 | 300 | 5 | 2.7% | 53 | 580 | 2 | 1.1% |
| 26 | 310 | 2 | 1.1% | 54 | 590 | 2 | 1.1% |
| 27 | 320 | 2 | 1.1% | 55 | 600 | 6 | 3.2% |
|  |  |  |  |  | TOTAL | 187 | 100.0% |

FIG.54

PICKUP BONUS GAME PAYOUT TABLE

| NO | TYPE | WIN |
|---|---|---|
| 0 | CREDIT | 100 |
| 1 | CREDIT | 150 |
| 2 | CREDIT | 200 |

※MULTIPLIED BY BET PER LINE

FIG.55

PICKUP BONUS GAME DEVELOPMENT TABLE

| NO | TYPE | WEIGHT | PROB. |
|---|---|---|---|
| 0 | FREE GAME A ×1 | 9 | 42.9% |
| 1 | FREE GAME B ×1 | 8 | 38.1% |
| 2 | FREE GAME A ×1 & FREE GAME B ×1 | 4 | 19.0% |
| | TOTAL | 21 | 100.0% |

FIG.56

PICKUP BONUS GAME REDEVELOPMENT TABLE

| NO | TYPE | WEIGHT | PROB. |
|---|---|---|---|
| 0 | END | 31 | 77.5% |
| 1 | FREE GAME A | 5 | 12.5% |
| 2 | FREE GAME B | 4 | 10.0% |
| | TOTAL | 40 | 100.0% |

FIG.57

EXPAND WILD OCCURRENCE RANDOM DETERMINATION TABLE

| NO | | WEIGHT | PROB |
|---|---|---|---|
| 0 | BLANK | 8 | 66.7% |
| 1 | OCCURRENCE | 4 | 33.3% |
| | TOTAL | 12 | 100.0% |

FIG.58

EXPAND WILD RANK DETERMINATION TABLE

| NO. | RANK | WEIGHT | PROB. |
|---|---|---|---|
| 0 | LOW | 20 | 68.97% |
| 1 | MIDDLE | 7 | 24.14% |
| 2 | HIGH | 2 | 6.90% |
| 3 | VERY HIGH | 0 | 0.00% |
| | TOTAL | 29 | 100.00% |

FIG.59

EXPAND WILD RANDOM DETERMINATION TABLE (LOW)

| ID | NO. | SYMBOL | KIND | COMBINATIONS | | | | | WEIGHT | PROB. |
|---|---|---|---|---|---|---|---|---|---|---|
| | | | | R1 | R2 | R3 | R4 | R5 | | |
| 26 | 0 | WILD | 1K | /WILD | /WILD | /WILD | /WILD | WILD | 5 | 18.52% |
| 27 | 1 | WILD | 1K | /WILD | /WILD | /WILD | WILD | /WILD | 6 | 22.22% |
| 28 | 2 | WILD | 1K | /WILD | /WILD | WILD | /WILD | /WILD | 5 | 18.52% |
| 29 | 3 | WILD | 1K | /WILD | WILD | /WILD | /WILD | /WILD | 6 | 22.22% |
| 30 | 4 | WILD | 1K | WILD | /WILD | /WILD | /WILD | /WILD | 5 | 18.52% |
| | | TOTAL | – | – | – | – | – | – | 27 | 100.00% |

FIG.60

EXPAND WILD RANDOM DETERMINATION TABLE (MIDDLE)

| ID | NO. | SYMBOL | KIND | COMBINATIONS | | | | | WEIGHT | PROB. |
|---|---|---|---|---|---|---|---|---|---|---|
| | | | | R1 | R2 | R3 | R4 | R5 | | |
| 16 | 0 | WILD | 2K | /WILD | /WILD | /WILD | WILD | WILD | 7 | 17.50% |
| 17 | 1 | WILD | 2K | /WILD | /WILD | WILD | /WILD | WILD | 7 | 17.50% |
| 18 | 2 | WILD | 2K | /WILD | /WILD | WILD | WILD | /WILD | 2 | 5.00% |
| 19 | 3 | WILD | 2K | /WILD | WILD | /WILD | /WILD | WILD | 7 | 17.50% |
| 20 | 4 | WILD | 2K | /WILD | WILD | /WILD | WILD | /WILD | 2 | 5.00% |
| 21 | 5 | WILD | 2K | /WILD | WILD | WILD | /WILD | /WILD | 2 | 5.00% |
| 22 | 6 | WILD | 2K | WILD | /WILD | /WILD | /WILD | WILD | 7 | 17.50% |
| 23 | 7 | WILD | 2K | WILD | /WILD | /WILD | WILD | /WILD | 2 | 5.00% |
| 24 | 8 | WILD | 2K | WILD | /WILD | WILD | /WILD | /WILD | 2 | 5.00% |
| 25 | 9 | WILD | 2K | WILD | WILD | /WILD | /WILD | /WILD | 2 | 5.00% |
| | | TOTAL | – | – | – | – | – | – | 40 | 100.00% |

FIG.61

EXPAND WILD RANDOM DETERMINATION TABLE (HIGH)

| ID | NO. | SYMBOL | KIND | COMBINATIONS | | | | | WEIGHT | PROB. |
|---|---|---|---|---|---|---|---|---|---|---|
| | | | | R1 | R2 | R3 | R4 | R5 | | |
| 6 | 0 | WILD | 3K | /WILD | /WILD | WILD | WILD | WILD | 1 | 10.00% |
| 7 | 1 | WILD | 3K | /WILD | WILD | /WILD | WILD | WILD | 1 | 10.00% |
| 8 | 2 | WILD | 3K | /WILD | WILD | WILD | /WILD | WILD | 1 | 10.00% |
| 9 | 3 | WILD | 3K | /WILD | WILD | WILD | WILD | /WILD | 1 | 10.00% |
| 10 | 4 | WILD | 3K | WILD | /WILD | /WILD | WILD | WILD | 1 | 10.00% |
| 11 | 5 | WILD | 3K | WILD | /WILD | WILD | /WILD | WILD | 1 | 10.00% |
| 12 | 6 | WILD | 3K | WILD | /WILD | WILD | WILD | /WILD | 1 | 10.00% |
| 13 | 7 | WILD | 3K | WILD | WILD | /WILD | /WILD | WILD | 1 | 10.00% |
| 14 | 8 | WILD | 3K | WILD | WILD | /WILD | WILD | /WILD | 1 | 10.00% |
| 15 | 9 | WILD | 3K | WILD | WILD | WILD | /WILD | /WILD | 1 | 10.00% |
| | | TOTAL | – | – | – | – | – | – | 10 | 100.00% |

FIG.62

EXPAND WILD REVIVAL RANDOM DETERMINATION TABLE

| N-THTIME | WINNING PROBABILITY |
|---|---|
| FIRST TIME | 100.00% |
| SECOND TIME | 50.00% |
| THIRD TIME | 50.00% |
| FOURTH TIME | 0.00% |
| FIFTH TIME | 0.00% |
| SIXTH TIME | 0.00% |
| SEVENTH TIME | 0.00% |
| EIGHTH TIME | 0.00% |
| NINTH TIME | 0.00% |
| TENTH TIME | 0.00% |

FIG.63

EXPAND WILD ADDITIONAL NUMBER OF EXECUTION RANDOM DETERMINATION TABLE

| NO | NUMBER OF TIMES OF EXECUTION | WEIGHT | PROB | COUNT |
|---|---|---|---|---|
| 0 | 3 | 5 | 50.00% | 1.5 |
| 1 | 4 | 3 | 30.00% | 1.2 |
| 2 | 5 | 2 | 20.00% | 1.0 |
| | AVERAGE | 10 | 100.00% | 3.7 |

FIG.64

MULTI-TYPE BONUS GAME BENEFIT RANDOM DETERMINATION TABLE

| NO | TYPE | WEIGHT | PROB |
|---|---|---|---|
| 0 | FREE GAME B_1 (NORMAL[BLANK]) | 75 | 62.5% |
| 1 | FREE GAME B_2 (CREDIT PAYOUT) | 8 | 6.7% |
| 2 | FREE GAME B_3 (PICKUP) | 7 | 5.8% |
| 3 | FREE GAME B_4 (PAYOUT RATE) | 20 | 16.7% |
| 4 | FREE GAME B_5 (EXPAND) | 10 | 8.3% |
| | TOTAL | 120 | 100.0% |

FIG.65

MULTI-TYPE BONUS GAME FIXED PAYOUT RANDOM DETERMINATION TABLE

| NO | WIN | WEIGHT | PROB |
|---|---|---|---|
| 2 | 100 | 7 | 10.6% |
| 3 | 120 | 8 | 12.1% |
| 4 | 150 | 8 | 12.1% |
| 5 | 200 | 12 | 18.2% |
| 6 | 250 | 8 | 12.1% |
| 7 | 300 | 8 | 12.1% |
| 8 | 350 | 8 | 12.1% |
| 9 | 400 | 7 | 10.6% |
| | TOTAL | 66 | 100.0% |

※MULTIPLIED BY BET PER LINE

FIG.66

MULTI-TYPE BONUS GAME ADDITIONAL NUMBER OF EXECUTION RANDOM DETERMINATION TABLE

| NO. | TYPE | WEIGHT | PROB |
|---|---|---|---|
| 0 | a | 8 | 61.5% |
| 1 | b | 3 | 23.1% |
| 2 | c | 2 | 15.4% |
| TOTAL | | 13 | 100.0% |

FIG.67

MULTI-TYPE BONUS GAME ADDITIONAL NUMBER OF EXECUTION TYPE TABLE

| NO | TYPE | ADDITIONAL NUMBER OF TIMES OF EXECUTION OF FREE GAME | | |
|---|---|---|---|---|
| 0 | a | 1 | 1 | 2 |
| 1 | b | 1 | 1 | 3 |
| 2 | c | 1 | 2 | 3 |

FIG.68

MULTI-TYPE BONUS GAME LINE PAYOUT RATE RANDOM DETERMINATION TABLE

| NO | PAYOUT RATE | WEIGHT | PROB |
|---|---|---|---|
| 0 | 2 | 2 | 20.0% |
| 1 | 3 | 2 | 20.0% |
| 2 | 4 | 3 | 30.0% |
| 3 | 5 | 3 | 30.0% |
| | TOTAL | 10 | 100.0% |

FIG.69

MULTI-TYPE BONUS GAME REVIVAL RANDOM DETERMINATION TABLE

| N-THTIME | WINNING PROBABILITY |
|---|---|
| FIRST TIME | 100.00% |
| SECOND TIME | 50.00% |
| THIRD TIME | 50.00% |
| FOURTH TIME | 0.00% |
| FIFTH TIME | 0.00% |
| SIXTH TIME | 0.00% |
| SEVENTH TIME | 0.00% |
| EIGHTH TIME | 0.00% |
| NINTH TIME | 0.00% |
| TENTH TIME | 0.00% |

FIG.70

MULTI-TYPE BONUS GAME ADDITIONAL NUMBER OF EXECUTION RANDOM DETERMINATION TABLE

| NO | NUMBER OF TIMES OF EXECUTION | WEIGHT | PROB | COUNT |
|---|---|---|---|---|
| 0 | 3 | 5 | 50.00% | 1.5 |
| 1 | 4 | 3 | 30.00% | 1.2 |
| 2 | 5 | 2 | 20.00% | 1.0 |
| | AVERAGE | 10 | 100.00% | 3.7 |

FIG.71

NORMAL GAME SYMBOL RANDOM DETERMINATION TABLE

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | JACK | 6 | SWORD | 7 | SWORD | 5 | CAMEL | 8 | QUEEN | 9 |
| 1 | PALACE | 6 | JACK | 7 | ACE | 6 | JACK | 7 | PALACE | 9 |
| 2 | TEN | 6 | QUEEN | 7 | QUEEN | 6 | QUEEN | 6 | TEN | 9 |
| 3 | JACK | 4 | SWORD | 7 | SWORD | 6 | CAMEL | 6 | QUEEN | 4 |
| 4 | SWORD | 4 | JACK | 7 | ACE | 5 | JACK | 7 | CAMEL | 4 |
| 5 | QUEEN | 2 | TEN | 2 | CAMEL | 2 | KING | 2 | ACE | 3 |
| 6 | WILD | 2 | WILD | 2 | WILD | 2 | WILD | 2 | WILD | 3 |
| 7 | WILD | 2 | WILD | 2 | WILD | 2 | WILD | 2 | WILD | 3 |
| 8 | WILD | 2 | WILD | 2 | WILD | 2 | WILD | 2 | WILD | 2 |
| 9 | SWORD | 2 | JACK | 2 | ACE | 2 | JACK | 2 | CAMEL | 3 |
| 10 | QUEEN | 5 | TEN | 7 | CAMEL | 5 | KING | 8 | ACE | 3 |
| 11 | KING | 5 | CAMEL | 5 | QUEEN | 5 | SWORD | 8 | SWORD | 3 |
| 12 | SWORD | 5 | ACE | 5 | TEN | 5 | TEN | 8 | KING | 3 |
| 13 | QUEEN | 4 | TEN | 5 | PALACE | 5 | KING | 8 | JACK | 3 |
| 14 | CAMEL | 4 | CAMEL | 6 | QUEEN | 5 | SWORD | 8 | RESPIN | 3 |
| 15 | TEN | 4 | ACE | 6 | TEN | 5 | JACK | 8 | KING | 3 |
| 16 | ACE | 6 | KING | 6 | CAMEL | 5 | ACE | 7 | JACK | 3 |
| 17 | BONUS | 6 | PALACE | 6 | JACK | 5 | PALACE | 7 | CAMEL | 3 |
| 18 | TEN | 6 | ACE | 6 | KING | 8 | JACK | 7 | TEN | 3 |
| 19 | ACE | 4 | KING | 6 | BONUS | 8 | ACE | 8 | QUEEN | 7 |
| 20 | CAMEL | 4 | CAMEL | 6 | JACK | 8 | SWORD | 8 | BONUS | 7 |
| 21 | TEN | 4 | TEN | 6 | KING | 5 | QUEEN | 8 | TEN | 7 |
| | | 93 | | 115 | | 107 | | 137 | | 98 |

FIG.72

RE-SPINNING FEATURE FIRST TIME SYMBOL RANDOM DETERMINATION TABLE

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | JACK | 2 | SWORD | 3 | SWORD | 2 | CAMEL | 2 | QUEEN | 10 |
| 1 | PALACE | 3 | JACK | 2 | ACE | 3 | JACK | 3 | PALACE | 10 |
| 2 | TEN | 2 | QUEEN | 3 | QUEEN | 3 | QUEEN | 2 | TEN | 10 |
| 3 | JACK | 3 | SWORD | 2 | SWORD | 2 | CAMEL | 2 | QUEEN | 5 |
| 4 | SWORD | 2 | JACK | 3 | ACE | 3 | JACK | 3 | CAMEL | 5 |
| 5 | QUEEN | 0 | TEN | 0 | CAMEL | 0 | KING | 0 | ACE | 0 |
| 6 | WILD | 0 | WILD | 0 | WILD | 0 | WILD | 0 | WILD | 0 |
| 7 | WILD | 0 | WILD | 0 | WILD | 0 | WILD | 0 | WILD | 0 |
| 8 | WILD | 0 | WILD | 0 | WILD | 0 | WILD | 0 | WILD | 0 |
| 9 | SWORD | 0 | JACK | 0 | ACE | 0 | JACK | 0 | CAMEL | 0 |
| 10 | QUEEN | 2 | TEN | 2 | CAMEL | 3 | KING | 2 | ACE | 4 |
| 11 | KING | 3 | CAMEL | 3 | QUEEN | 2 | SWORD | 3 | SWORD | 5 |
| 12 | SWORD | 2 | ACE | 2 | TEN | 2 | TEN | 3 | KING | 4 |
| 13 | QUEEN | 3 | TEN | 3 | PALACE | 2 | KING | 2 | JACK | 6 |
| 14 | CAMEL | 2 | CAMEL | 2 | QUEEN | 3 | SWORD | 3 | RESPIN | 7 |
| 15 | TEN | 3 | ACE | 3 | TEN | 3 | JACK | 2 | KING | 6 |
| 16 | ACE | 4 | KING | 2 | CAMEL | 2 | ACE | 2 | JACK | 4 |
| 17 | BONUS | 3 | PALACE | 3 | JACK | 2 | PALACE | 2 | CAMEL | 5 |
| 18 | TEN | 4 | ACE | 2 | KING | 4 | JACK | 2 | TEN | 5 |
| 19 | ACE | 2 | KING | 3 | BONUS | 5 | ACE | 3 | QUEEN | 4 |
| 20 | CAMEL | 3 | CAMEL | 2 | JACK | 4 | SWORD | 2 | BONUS | 4 |
| 21 | TEN | 2 | TEN | 3 | KING | 2 | QUEEN | 3 | TEN | 4 |
| | | 45 | | 43 | | 47 | | 41 | | 98 |

FIG.73

RE-SPINNING FEATURE SECOND TIME SYMBOL RANDOM DETERMINATION TABLE

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | JACK | 0 | SWORD | 2 | SWORD | 0 | CAMEL | 2 | QUEEN | 0 |
| 1 | PALACE | 0 | JACK | 2 | ACE | 0 | JACK | 2 | PALACE | 0 |
| 2 | TEN | 0 | QUEEN | 2 | QUEEN | 0 | QUEEN | 2 | TEN | 0 |
| 3 | JACK | 0 | SWORD | 2 | SWORD | 0 | CAMEL | 2 | QUEEN | 0 |
| 4 | SWORD | 0 | JACK | 2 | ACE | 0 | JACK | 2 | CAMEL | 0 |
| 5 | QUEEN | 0 | TEN | 0 | CAMEL | 0 | KING | 0 | ACE | 0 |
| 6 | WILD | 0 | WILD | 0 | WILD | 0 | WILD | 0 | WILD | 0 |
| 7 | WILD | 0 | WILD | 0 | WILD | 0 | WILD | 0 | WILD | 0 |
| 8 | WILD | 0 | WILD | 0 | WILD | 0 | WILD | 0 | WILD | 0 |
| 9 | SWORD | 0 | JACK | 0 | ACE | 0 | JACK | 0 | CAMEL | 0 |
| 10 | QUEEN | 0 | TEN | 2 | CAMEL | 0 | KING | 2 | ACE | 0 |
| 11 | KING | 0 | CAMEL | 2 | QUEEN | 0 | SWORD | 2 | SWORD | 0 |
| 12 | SWORD | 0 | ACE | 3 | TEN | 0 | TEN | 3 | KING | 0 |
| 13 | QUEEN | 0 | TEN | 3 | PALACE | 0 | KING | 3 | JACK | 0 |
| 14 | CAMEL | 0 | CAMEL | 2 | QUEEN | 0 | SWORD | 2 | RESPIN | 0 |
| 15 | TEN | 0 | ACE | 2 | TEN | 0 | JACK | 2 | KING | 0 |
| 16 | ACE | 2 | KING | 3 | CAMEL | 0 | ACE | 3 | JACK | 0 |
| 17 | BONUS | 1 | PALACE | 3 | JACK | 0 | PALACE | 3 | CAMEL | 0 |
| 18 | TEN | 3 | ACE | 2 | KING | 2 | JACK | 2 | TEN | 0 |
| 19 | ACE | 0 | KING | 2 | BONUS | 1 | ACE | 2 | QUEEN | 2 |
| 20 | CAMEL | 0 | CAMEL | 3 | JACK | 3 | SWORD | 3 | BONUS | 1 |
| 21 | TEN | 0 | TEN | 3 | KING | 0 | QUEEN | 3 | TEN | 3 |
| | | 6 | | 40 | | 6 | | 40 | | 6 |

FIG.74

MULTI BONUS COMMON SYMBOL RANDOM DETERMINATION TABLE

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | JACK | 9 | SWORD | 6 | SWORD | 7 | CAMEL | 6 | QUEEN | 8 |
| 1 | PALACE | 9 | JACK | 6 | ACE | 7 | JACK | 7 | PALACE | 8 |
| 2 | TEN | 9 | QUEEN | 6 | QUEEN | 8 | QUEEN | 6 | TEN | 8 |
| 3 | JACK | 9 | SWORD | 6 | SWORD | 8 | CAMEL | 6 | QUEEN | 8 |
| 4 | SWORD | 9 | JACK | 6 | ACE | 8 | JACK | 6 | CAMEL | 8 |
| 5 | QUEEN | 3 | TEN | 2 | CAMEL | 2 | KING | 2 | ACE | 2 |
| 6 | WILD | 3 | WILD | 2 | WILD | 2 | WILD | 2 | WILD | 2 |
| 7 | WILD | 3 | WILD | 2 | WILD | 3 | WILD | 2 | WILD | 2 |
| 8 | WILD | 3 | WILD | 2 | WILD | 2 | WILD | 3 | WILD | 2 |
| 9 | SWORD | 3 | JACK | 2 | ACE | 2 | JACK | 3 | CAMEL | 2 |
| 10 | QUEEN | 8 | TEN | 7 | CAMEL | 7 | KING | 7 | ACE | 7 |
| 11 | KING | 8 | CAMEL | 7 | QUEEN | 7 | SWORD | 7 | SWORD | 7 |
| 12 | SWORD | 8 | ACE | 7 | TEN | 7 | TEN | 7 | KING | 7 |
| 13 | QUEEN | 8 | TEN | 7 | PALACE | 7 | KING | 7 | JACK | 0 |
| 14 | CAMEL | 8 | CAMEL | 7 | QUEEN | 7 | SWORD | 7 | RESPIN | 0 |
| 15 | TEN | 8 | ACE | 7 | TEN | 7 | JACK | 7 | KING | 0 |
| 16 | ACE | 0 | KING | 7 | CAMEL | 7 | ACE | 7 | JACK | 7 |
| 17 | BONUS | 0 | PALACE | 7 | JACK | 7 | PALACE | 7 | CAMEL | 7 |
| 18 | TEN | 0 | ACE | 7 | KING | 0 | JACK | 7 | TEN | 7 |
| 19 | ACE | 9 | KING | 7 | BONUS | 0 | ACE | 7 | QUEEN | 0 |
| 20 | CAMEL | 9 | CAMEL | 7 | JACK | 0 | SWORD | 7 | BONUS | 0 |
| 21 | TEN | 9 | TEN | 7 | KING | 7 | QUEEN | 7 | TEN | 0 |
| | | 135 | | 124 | | 112 | | 127 | | 92 |

FIG.75

MULTI BONUS PAYOUT RATE SYMBOL RANDOM DETERMINATION TABLE

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | JACK | 5 | SWORD | 8 | SWORD | 5 | CAMEL | 3 | QUEEN | 3 |
| 1 | PALACE | 5 | JACK | 8 | ACE | 5 | JACK | 3 | PALACE | 3 |
| 2 | TEN | 5 | QUEEN | 8 | QUEEN | 5 | QUEEN | 3 | TEN | 3 |
| 3 | JACK | 5 | SWORD | 8 | SWORD | 5 | CAMEL | 3 | QUEEN | 2 |
| 4 | SWORD | 5 | JACK | 8 | ACE | 5 | JACK | 2 | CAMEL | 2 |
| 5 | QUEEN | 2 | TEN | 5 | CAMEL | 3 | KING | 2 | ACE | 2 |
| 6 | WILD | 2 | WILD | 5 | WILD | 3 | WILD | 2 | WILD | 2 |
| 7 | WILD | 2 | WILD | 5 | WILD | 3 | WILD | 2 | WILD | 2 |
| 8 | WILD | 2 | WILD | 5 | WILD | 3 | WILD | 2 | WILD | 2 |
| 9 | SWORD | 2 | JACK | 5 | ACE | 3 | JACK | 2 | CAMEL | 2 |
| 10 | QUEEN | 4 | TEN | 8 | CAMEL | 5 | KING | 2 | ACE | 2 |
| 11 | KING | 4 | CAMEL | 8 | QUEEN | 5 | SWORD | 2 | SWORD | 2 |
| 12 | SWORD | 4 | ACE | 8 | TEN | 5 | TEN | 2 | KING | 2 |
| 13 | QUEEN | 4 | TEN | 8 | PALACE | 5 | KING | 2 | JACK | 0 |
| 14 | CAMEL | 4 | CAMEL | 8 | QUEEN | 5 | SWORD | 2 | RESPIN | 0 |
| 15 | TEN | 4 | ACE | 8 | TEN | 5 | JACK | 2 | KING | 0 |
| 16 | ACE | 0 | KING | 8 | CAMEL | 5 | ACE | 2 | JACK | 2 |
| 17 | BONUS | 0 | PALACE | 8 | JACK | 5 | PALACE | 2 | CAMEL | 2 |
| 18 | TEN | 0 | ACE | 8 | KING | 0 | JACK | 2 | TEN | 2 |
| 19 | ACE | 5 | KING | 8 | BONUS | 0 | ACE | 2 | QUEEN | 0 |
| 20 | CAMEL | 5 | CAMEL | 8 | JACK | 0 | SWORD | 2 | BONUS | 0 |
| 21 | TEN | 5 | TEN | 8 | KING | 5 | QUEEN | 2 | TEN | 0 |
| | | 74 | | 161 | | 85 | | 48 | | 35 |

FIG.76

EXPAND SYMBOL RANDOM DETERMINATION TABLE

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | JACK | 6 | SWORD | 6 | SWORD | 7 | CAMEL | 5 | QUEEN | 5 |
| 1 | PALACE | 6 | JACK | 6 | ACE | 7 | JACK | 5 | PALACE | 5 |
| 2 | TEN | 7 | QUEEN | 6 | QUEEN | 7 | QUEEN | 5 | TEN | 5 |
| 3 | JACK | 7 | SWORD | 6 | SWORD | 7 | CAMEL | 5 | QUEEN | 7 |
| 4 | SWORD | 7 | JACK | 6 | ACE | 7 | JACK | 5 | CAMEL | 7 |
| 5 | QUEEN | 2 | TEN | 3 | CAMEL | 2 | KING | 2 | ACE | 2 |
| 6 | WILD | 2 | WILD | 3 | WILD | 2 | WILD | 2 | WILD | 2 |
| 7 | WILD | 2 | WILD | 3 | WILD | 2 | WILD | 2 | WILD | 3 |
| 8 | WILD | 3 | WILD | 2 | WILD | 2 | WILD | 2 | WILD | 3 |
| 9 | SWORD | 3 | JACK | 2 | ACE | 2 | JACK | 2 | CAMEL | 3 |
| 10 | QUEEN | 6 | TEN | 5 | CAMEL | 7 | KING | 5 | ACE | 5 |
| 11 | KING | 6 | CAMEL | 6 | QUEEN | 7 | SWORD | 5 | SWORD | 5 |
| 12 | SWORD | 6 | ACE | 6 | TEN | 5 | TEN | 5 | KING | 5 |
| 13 | QUEEN | 7 | TEN | 6 | PALACE | 5 | KING | 5 | JACK | 0 |
| 14 | CAMEL | 7 | CAMEL | 5 | QUEEN | 5 | SWORD | 5 | RESPIN | 0 |
| 15 | TEN | 7 | ACE | 5 | TEN | 7 | JACK | 5 | KING | 0 |
| 16 | ACE | 0 | KING | 6 | CAMEL | 7 | ACE | 5 | JACK | 7 |
| 17 | BONUS | 0 | PALACE | 6 | JACK | 7 | PALACE | 5 | CAMEL | 7 |
| 18 | TEN | 0 | ACE | 6 | KING | 0 | JACK | 5 | TEN | 7 |
| 19 | ACE | 7 | KING | 5 | BONUS | 0 | ACE | 5 | QUEEN | 0 |
| 20 | CAMEL | 7 | CAMEL | 5 | JACK | 0 | SWORD | 5 | BONUS | 0 |
| 21 | TEN | 7 | TEN | 5 | KING | 7 | QUEEN | 5 | TEN | 0 |
| | | 105 | | 109 | | 102 | | 95 | | 78 |

GAMING MACHINE

CROSS REFERENCE TO RELATED APPLICATION

The present application claims priority from Japanese Patent Application No. 2012-104207, which was filed on Apr. 27, 2012, the disclosure of which is herein incorporated by reference in its entirety.

BACKGROUND OF THE INVENTION

Field of the Invention

The present invention relates to a gaming machine that rearranges symbols after variably-displaying the same.

A known slot machine is disclosed in U.S. Laid-Open Patent Publication No. 2011/0250947. This slot machine is arranged such that, when a player inserts a coin, a bill or the like into an insertion slot of the slot machine and presses a spin button, a plurality of symbols are scrolled on a symbol display area on the front surface of the cabinet, and then the symbols automatically stop. Various types of prizes including bonuses are established based on the combination of the stopped symbols.

In gaming machines represented by the known slot machine above, not only normal games are playable but also the enhancement in the gaming excitement of the gaming machines is attempted by adding various factors such as bonus games. As such, in the gaming machines, what kind of factor is added to the game is important in the enhancement of the gaming excitement.

An object of the present invention is therefore to provide a gaming machine with more gaming excitement.

SUMMARY OF THE INVENTION

The present invention relates to a gaming machine including: a formed object provided with a light emitting portion so that the lighting state of the light emitting portion is viewable from the outside; a sensor configured to detect a player's gesture with respect to the formed object; and a controller used to start a game, the controller being programmed to execute the steps of: (A) starting the detection of the player's gesture by the sensor at a timing corresponding to the state of the game; and (B) while in the step (A) the player's gesture is being detected, causing the light emitting portion to emit light in a light emission mode in sync with the detected player's gesture.

According to the arrangement above, the player's gesture with respect to the formed object is detected and the formed object is controlled to establish the light emission mode corresponding to the gesture. As such, the formed object is not only a passive notification device for the player but also an active control device that changes its effect execution as the player actively operates the formed object, with the result that the gaming excitement is enhanced.

In addition to the above, the present invention relates to a gaming machine including: a formed object provided with a light emitting portion so that the lighting state of the light emitting portion is viewable from the outside; a sensor configured to detect a player's gesture with respect to the formed object; and a controller used to start a game, the controller being programmed to execute the steps of: (A) in the game, at a timing of the end of a particular state, starting to detect the player's gesture by the plurality of sensors, (B) during a predetermined time in which the player's gesture is detected in the step (A), causing the light emitting portion to emit light in a first light emission mode in sync with the detected player's gesture; and (C) after the predetermined time, causing the light emitting portion to emit light in a second light emission mode which is different from the first light emission mode.

According to the arrangement above, the player's gesture with respect to the formed object is detected and the formed object is controlled to establish the light emission mode corresponding to the gesture. As such, the formed object is not only a passive notification device for the player but also an active control device that changes its effect execution as the player actively operates the formed object, with the result that the gaming excitement is enhanced.

a formed object provided with a first light emitting portion and a second light emitting portion so that the lighting states of the first light emitting portion and the second light emitting portion are viewable from the outside; a sensor configured to detect a player's gesture with respect to the formed object; and a controller used to start a game, the controller being programmed to execute the steps of: (A) starting the detection of the player's gesture by the sensor at a timing corresponding to the state of the game; (B) during a predetermined time in which the player's gesture is detected in the step (A), causing the first light emitting portion and the second light emitting portion to emit light in a first light emission mode in sync with the detected player's gesture; and (C) after the predetermined time, causing the first light emitting portion to emit light in a second light emission mode which is different from the first light emission mode, while keeping the second light emitting portion to emit light in the first light emission mode.

According to the arrangement above, the player's gesture with respect to the formed object is detected and the formed object is controlled to establish the light emission mode corresponding o the gesture. As such, the formed object is not only a passive notification device for the player but also an active control device that changes its effect execution as the player actively operates the formed object, with the result that the gaming excitement is enhanced.

The present invention makes it possible to further enhance the gaming excitement of the gaming machine.

BRIEF DESCRIPTION OF THE DRAWINGS

FIG. 18 illustrates a detection state storage table.

FIG. 52 illustrates the data table.

FIG. 53 illustrates the data table.

FIG. 54 illustrates the data table.

FIG. 55 illustrates the data table.

FIG. 56 illustrates the data table.

FIG. 57 illustrates the data table.

FIG. 58 illustrates the data table.

FIG. 59 illustrates the data table.

FIG. 60 illustrates the data table.

FIG. 61 illustrates the data table.

FIG. 62 illustrates the data table.

FIG. 63 illustrates the data table.

FIG. 64 illustrates the data table.

FIG. 65 illustrates the data table.

FIG. 66 illustrates the data table.

FIG. 67 illustrates the data table.

FIG. 68 illustrates the data table.

FIG. 69 illustrates the data table.

FIG. 70 illustrates the data table.

FIG. 71 illustrates the data table.

FIG. 72 illustrates the data table.

FIG. 73 illustrates the data table.

FIG. 74 illustrates the data table.

FIG. 75 illustrates the data table.

FIG. 76 illustrates the data table.

DESCRIPTION OF THE PREFERRED EMBODIMENTS

Figure 1:
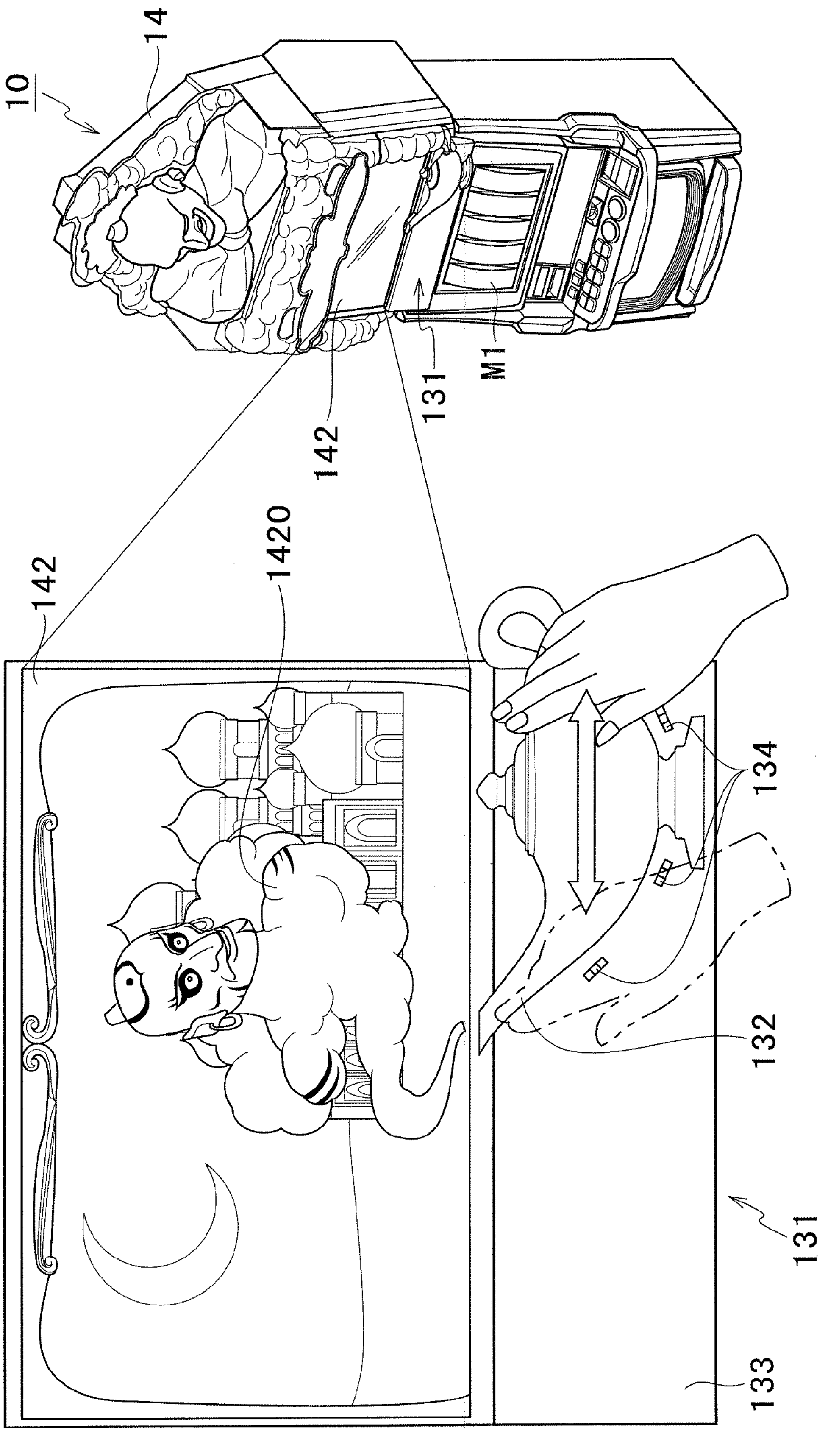
FIG. 1 illustrates the operation state of the gaming machine.

A gaming machine of the present invention will be described with reference to figures.

(Outline of Gaming Machine)

A gaming machine 300 of the present embodiment is a multi-player gaming machine in which a plurality of slot machines 10 that are gaming terminals are connected with a center controller 200 (FIGS. 2 and 3) to be able to exchange data therebetween. The gaming machine 300 is able to run a base game such as a slot game at each slot machine 10 and run a common game at a common display device 622 or the like while synchronizing the slot machines 10. The slot machines 10 and the center controller 200 are connected wireless, by wires, or by both of them.

As shown in FIG. 1, the gaming machine 300 includes a reel unit M1 as a symbol display device and a control panel 30 as an input device. Furthermore, the gaming machine 300 includes, as notification devices (effect executing devices), an upper image display panel 142, a speaker 112, a backlight unit M7, or the like. These members are controlled by a controller 100 provided in the gaming machine 300. The controller 100 is constituted by a later-described main CPU 71 or the like.

A unit of bet amount may be a currency such as dollar, yen, euro, or the like, or may be a game point used exclusively in a hole having the gaming machine 300 or in the industry. That is to say, the slot machine may be arranged so that a game point is stored in a memory as a gaming value is inserted, and a game is run as the stored game point is input. Therefore, betting may be an input of a game point, a bet amount may be the number of game points input to run a game, and a payout amount may be the number of game points added based on a game result.

Figure 10:
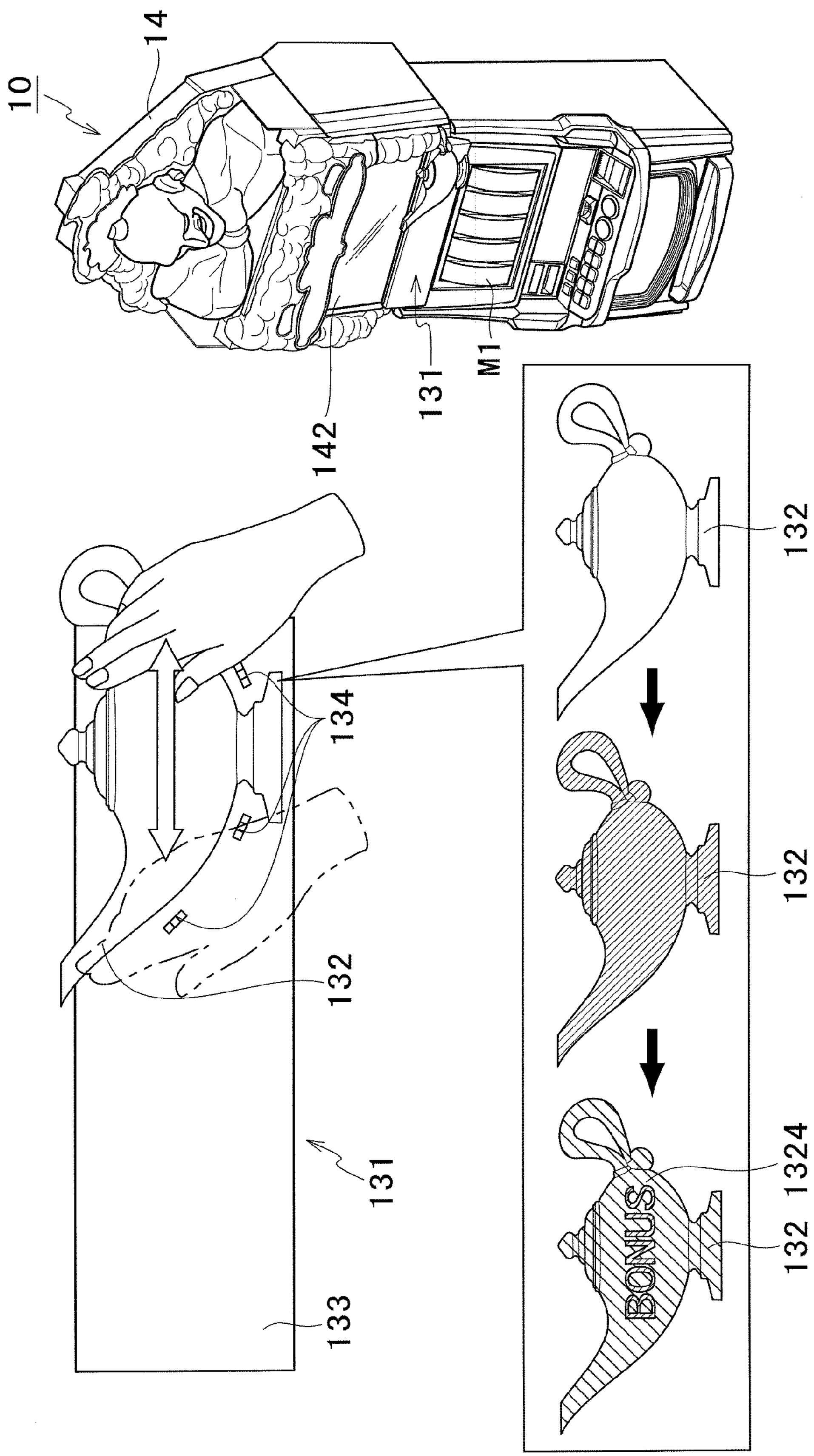
FIG. 10 illustrates the operation state of the gaming machine.

More specifically, as shown in FIG. 10, the gaming machine 300 includes a formed object (lamp body 132) on which LEDs are provided so that the lighting state thereof is viewable from the outside, a sensor 134 configured to detect a player's gesture with respect to the formed object (lamp body 132), and a terminal controller (controller) 10 used to start a game.

The following will describe the steps executed by the terminal controller 100 of the slot machine 10. In the step (A), the detection of a player's gesture by the sensor 134 starts at a timing corresponding to the state of a game. In the step (B), while in the step (A) the player's gesture is being detected, the LEDs of the lamp body 132 emit light in a light emission mode in sync with the detected player's gesture.

To put it differently, the gaming machine 300 includes a processing unit that starts the detection of the player's gesture by the sensor 134 at a timing corresponding to the state of a game and a processing unit that causes the LEDs of the lamp body 132 to emit light in a light emission mode in sync with the detected player's gesture, while the player's gesture is being detected.

Furthermore, the terminal controller 100 may cause the lamp body 132 to emit light in a first light emission mode for a predetermined time in the step (B), and may execute the step (C) below. In the step (C), after the predetermined time, the lamp body 132 is caused to emit light in a second light emission mode which is different from the first light emission mode.

The lamp may be provided with a BONUS text portion 1324 (second light emitter) and a remaining portion (first light emitter) excluding the BONUS text portion 1324, and the terminal controller 100 may cause the entirety of the lamp body 132 to emit light in the first light emission mode for a predetermined time in the step (B) and may execute the step (C) below. In the step (C), after the predetermined time, the entirety of the lamp body 132 except the BONUS text portion 1324 is caused to emit light in the second light emission mode while the BONUS text portion 1324 is maintained to emit light in the first light emission mode.

In addition to the above, the sensors 134 are a plurality of optical sensors provided along the periphery of the lamp body 132. The terminal controller 100 detects the player's gesture with respect to the formed object based on the light receiving state of each optical sensor.

The "formed object" is able to function as "gadget". The gadget is an object that operates in accordance with a combination. The operation includes a change in color (light). The combination is equivalent to a game result. The game result is winning, the shifting of the state of a game, or the like. For example, before a game result determined in advance is notified to the player, the gadget may operate in accordance with the game result. The gadget may actively operate in accordance with a game result or may be passively operated by a player's operation from the outside. The operation of the gadget may influence on the determination of a game result. When the gadget is passively operated, the gadget may operate indirectly corresponding to the gesture of the player or directly corresponding to the gesture of the player.

The formed object of the present embodiment is the lamp body 132 that three-dimensionally mimics the shape of a lamp, but is not limited to this. The formed object is neither a button, a display, nor a touch panel. Furthermore, although the sensors 134 are provided independently from the formed object, the sensors may be attached to the formed object. While a plurality of sensors 134 are provided and the player's gesture is determined based on the detection result of each sensor 134, the disclosure is not limited to this arrangement. Furthermore, the number of the sensors 134 and the locations thereof may be differently arranged.

In the present embodiment, player's gesture to rub the lamp body 132 is detected. It is noted that the gesture "rubbing the lamp body 132" is not related to whether the player touches the lamp body 132 or not. That is to say, because each optical sensor detects the presence of light received by its light receiving element, the player's gesture is detected when the player blocks the light received by the light receiving element.

Furthermore, As shown in FIG. 1, while the display (upper image display panel 142) is arranged to display an effect image in sync with the player's gesture, the disclosure is not limited to this arrangement.

Figure 6:
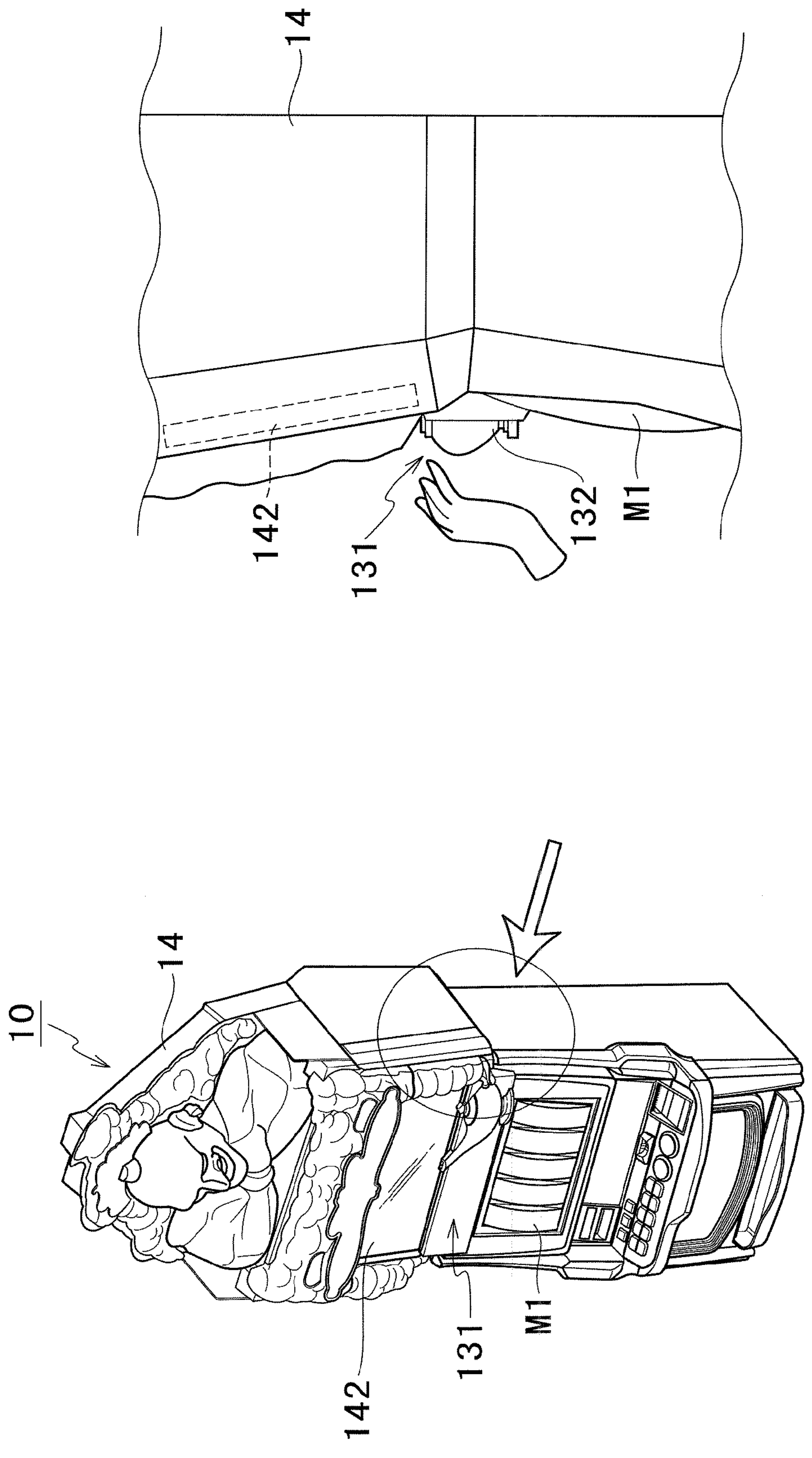
FIG. 6 illustrates the operation state of the gaming machine.

In addition to the above, as shown in FIG. 6, the formed object (lamp body 132) is formed to three-dimensionally protrude toward the front surface to allow the player to perform various gesture (way of touching or the like), as compared to the touch panel and the button. The disclosure, however, is not limited to this arrangement.

Figure 7:
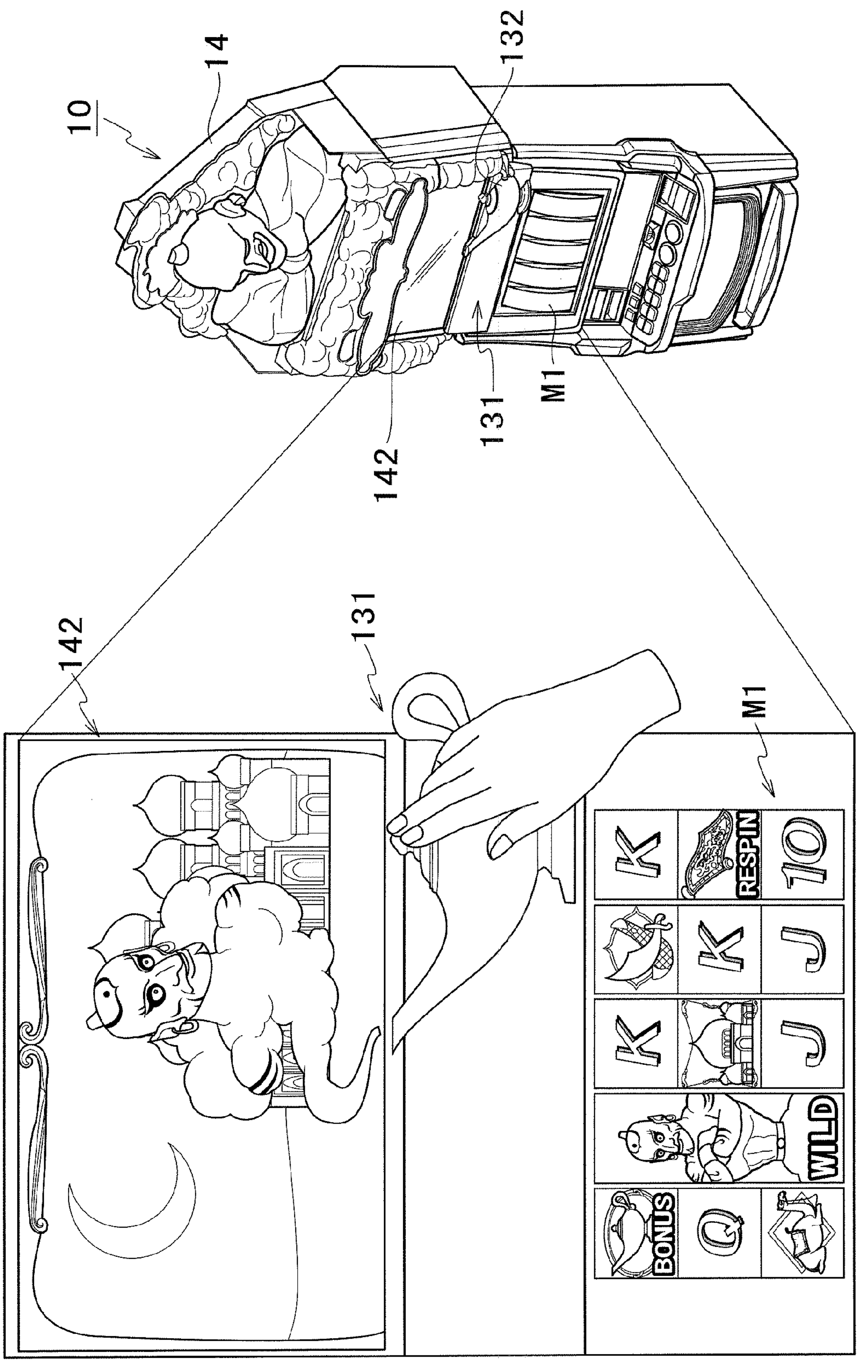
FIG. 7 illustrates the operation state of the gaming machine.

In addition to the above, as shown in FIG. 7, the formed object (lamp body 132) is provided on a formed object unit (lamp body unit 131) which is at a location different from the display (upper image display panel 142). The disclosure, however, is not limited to this arrangement.

Figure 5:
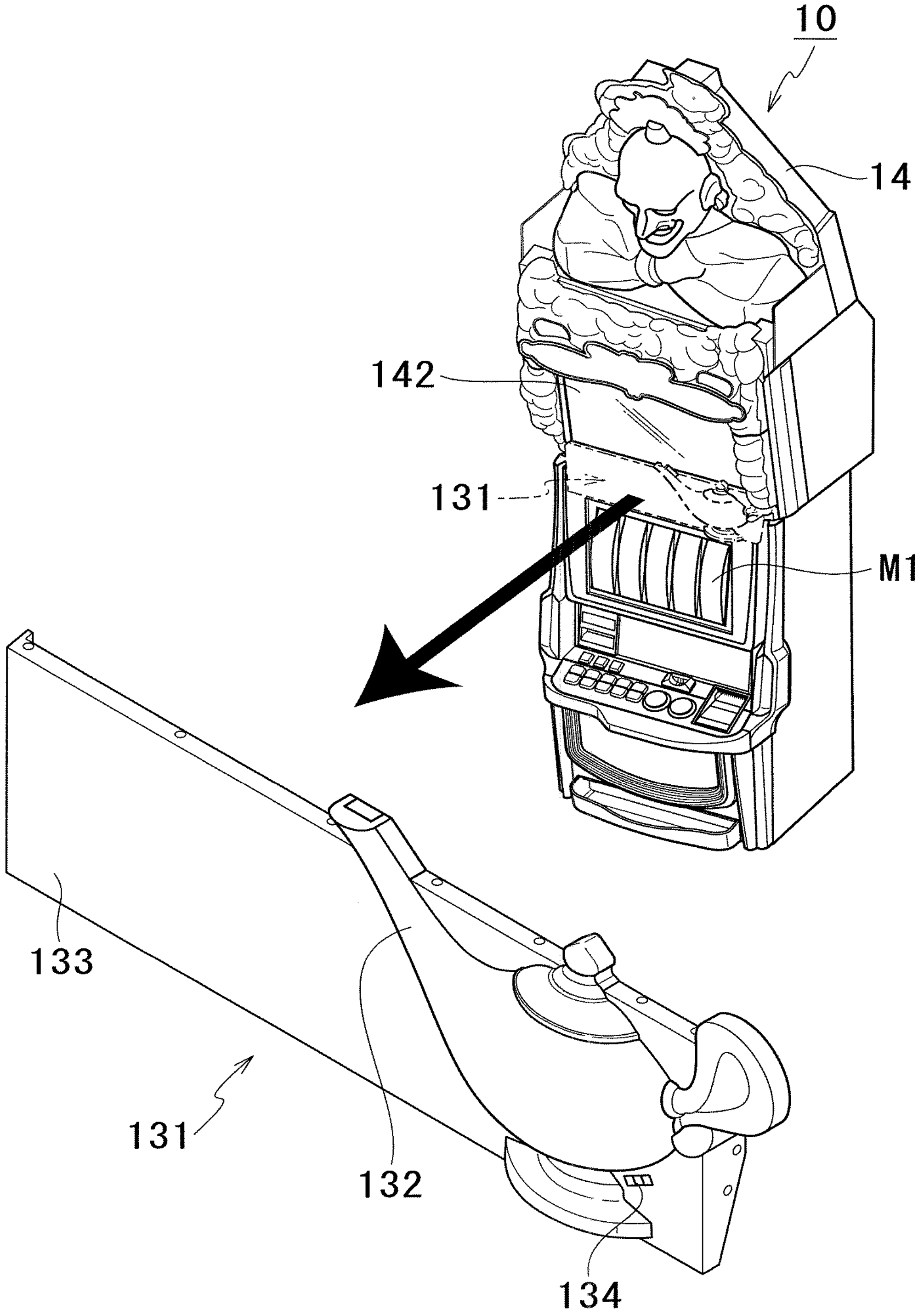
FIG. 5 illustrates the operation state of the gaming machine.

In addition to the above, as shown in FIG. 5, the formed object unit (lamp body unit 131) where the formed object (lamp body 132) is provided is detachable to the cabinet 14. The disclosure, however, is not limited to this arrangement.

Figure 19:
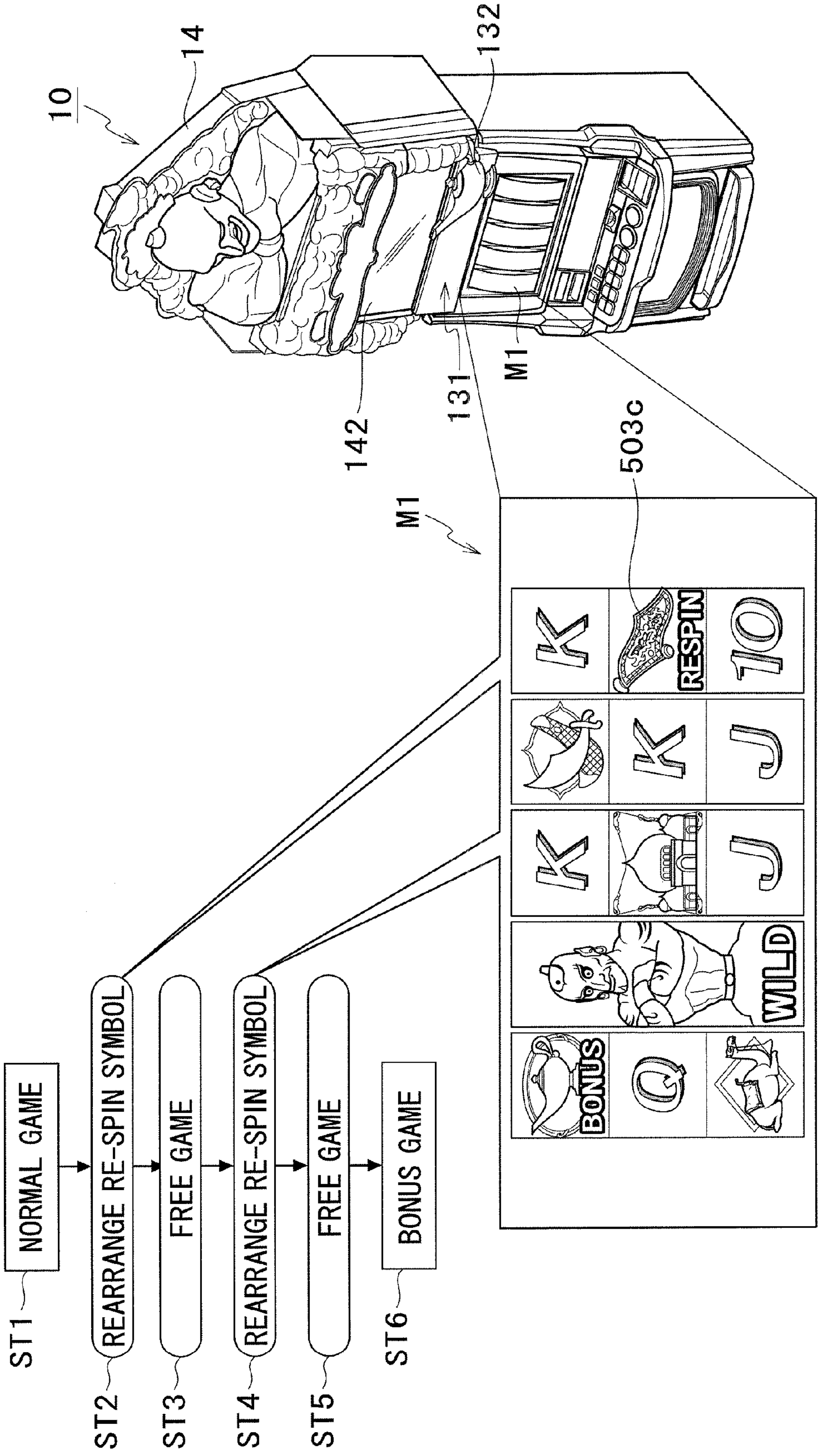
FIG. 19 illustrates the operation state of the gaming machine.

In addition to the above, as shown in FIG. 19, according to the present embodiment, a slot game is run by using a symbol display device (reel unit M1) that rearranges symbols 501 to display a result of the game. In the slot game, a bonus game starts when a specific symbol (re-spin symbol 503*c*) stops consecutively twice. The disclosure, however, is not limited to this arrangement. In addition to the above, while in the present embodiment a free game starts when a specific symbol (re-spin symbol 503*c*) stops, the disclosure is not limited to this arrangement. The free game that starts when the re-spin symbol 503*c* stops is referred to as re-spinning feature game.

(Outline of Gaming Machine: Definitions)

The slot machine 10 above is a kind of the gaming terminals in the gaming machine 300. Although the present embodiment deals with the slot machine 10 as an example of the gaming terminal, the disclosure is not limited to this and any type of device having a terminal controller that is able to independently run a base game may be used as the gaming terminal.

The base game in the present embodiment is run by the slot machine 10. The base game is a slot game of rearranging a plurality of symbols 501. The base game is not limited to the slot game but is any type of games capable of being independently run at a gaming terminal such as the slot machine 10. In other words, the base game is a game in contrast to the common game. For example, a normal game and a bonus game that are described later are types of the base game.

The rearrangement of the symbols in the slot game is performed on the lower image display panel 141. The slot game includes a process of running a normal game of rearranging symbols on the lower image display panel 141 on condition that a gaming value is bet and awarding a normal payout based on the rearranged symbols, a process of running a bonus game of rearranging symbols with the assumption that the payout rate is higher than that of the normal game when the rearranged symbols achieve a predetermined condition and awarding a bonus payout based on the rearranged symbols, and a process of executing a rescue process when a rescue start condition is established.

Symbols 501 are constituted by a specific symbol 503 and a normal symbol 502. In other words, the symbol 501 is a superordinate concept to the specific symbol 503 and the normal symbol 502. The specific symbol 503 includes a wild symbol 503*a*, a trigger symbol 503*b*, and a re-spin symbol 503*c*. The wild symbol 503*a* can be used as a substitute for any type of the symbol 501. The trigger symbol 503*b* is a symbol that triggers at least the execution of the bonus game. The re-spin symbol 503*c* is a symbol that triggers at least the execution of the free game. Furthermore, re-spin symbol 503*c* is a symbol that triggers the start of the execution of the bonus game when this symbol is stopped consecutively twice. That is to say, the trigger symbol 503*b* and the re-spin symbol 503*c* function as triggers of the shifting from the normal game to various types of bonus games. It is noted that the same bonus game or different bonus games is or are triggered by the trigger symbol 503*b* and the re-spin symbol 503*c*. Furthermore, the bonus game triggered by the trigger symbol 503*b* and the re-spin symbol 503*c* may be randomly selected from a plurality of bonus games, or a game or an effect may be executed for the selection.

The trigger symbol 503*b* may function as a trigger of increase in the number of the specific symbols 503 in the bonus game, i.e., increase in the number of the specific symbols 503 of at least one of the trigger symbol 503*b* and the wild symbol 503*a*. Furthermore, the trigger symbol 503*b* may function as a trigger of increase in the number of times to run the bonus game.

The term "rearrangement" indicates that the a symbols 501 are rearranged after the arrangement of the symbols 501 is dismissed. The term "arrangement" indicates a state in which the symbols 501 are visually recognizable by an external player. As such, when a winning combination is formed by the rearrangement of the symbols 501, a payout corresponding to the established winning combination is awarded.

A coin, a bill, or electrically valuable information corresponding to these is used as a gaming value. It is to be noted that the gaming value in the disclosure is not limited to these, and for example a medal, a token, electric money or the like can be adopted. Further, a later-described ticket with a barcode is also used.

Figure 4:
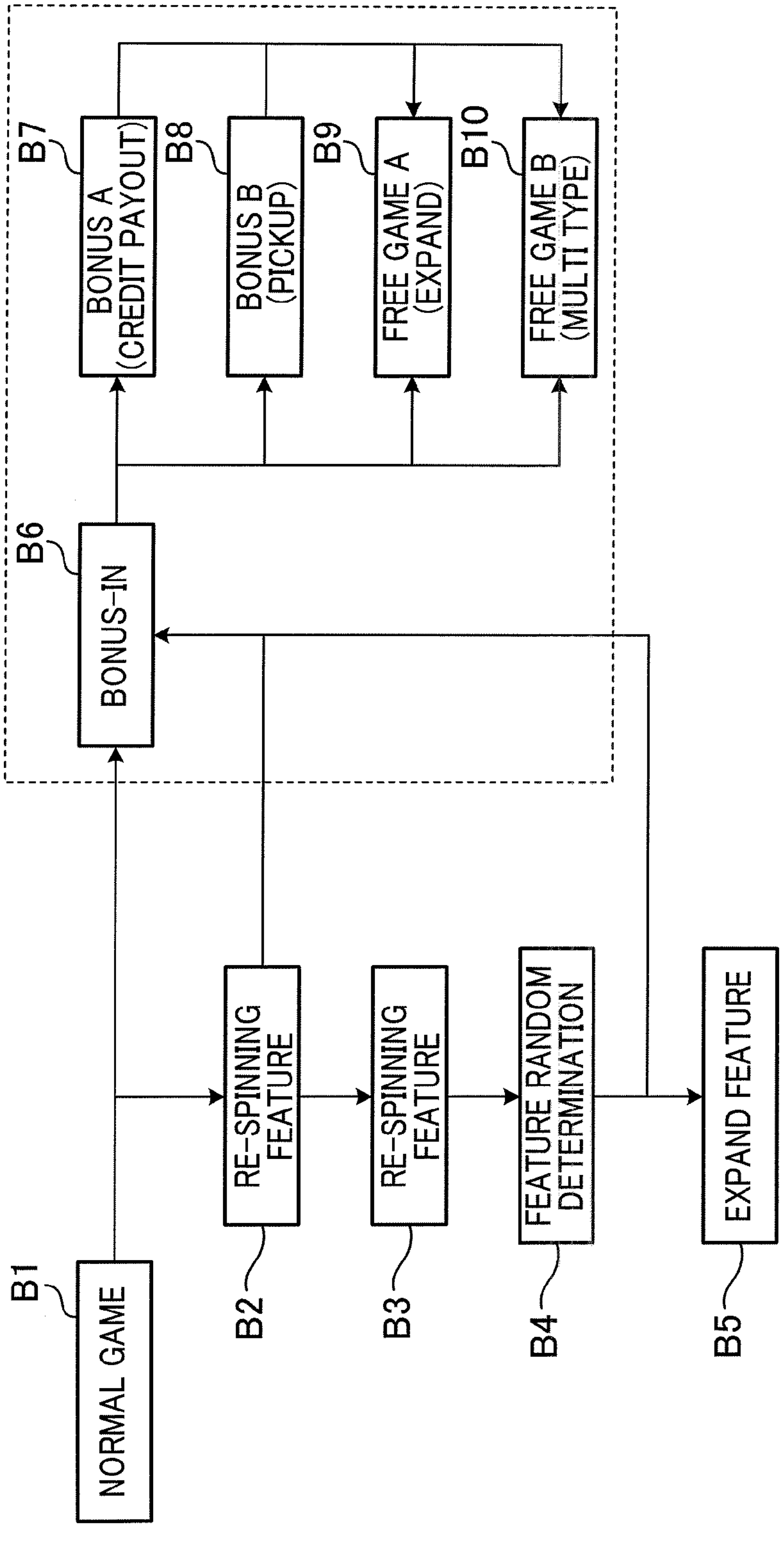
FIG. 4 is a flowchart showing the outline of the game.

The bonus game is equivalent to a feature game. As shown in FIG. 4, in the present embodiment, there are a plurality of types of the bonus games. More specifically, there are "EXPAND FEATURE", "BONUS A (credit payout bonus game)", "BONUS B (pickup bonus game)", "FREE GAME A (expand bonus game)", and "FREE GAME B (multi-type bonus game)".

While the bonus game in the present embodiment is described as games with the names described above, the bonus game is not limited to them but is any type of game as long as the gaming state is more advantageous than that of the normal game. Other types of the bonus game may be employed as long as the gaming state is advantageous for the player, i.e., the gaming state is more advantageous than that of the normal game. For example, in the bonus game, various states such as a state in which more gaming values can be achieved as compared to the normal game, a state in which the probability of obtaining a gaming value is higher than the probability in the normal game, and a state in which the number of consumed gaming values is smaller than in the normal game are achieved independently or in combination.

A free game is a game which is executable with a smaller amount of gaming values bet than in the normal game. The expression "executable with a smaller amount of gaming value bet" includes a case where an amount of gaming values bet is zero. Therefore, the free game may be a game which is run without betting a gaming value and the gaming value is paid out for an amount corresponding to rearranged symbols 501. In other words, the free game may be a game that starts even if no gaming value is consumed. On the other hand, the normal game is run on condition that a gaming value is bet, and is a game of paying out gaming value for an amount corresponding to rearranged symbols 501. In other words, the normal game is a game that starts with the consumption of the gaming value. In the present embodiment, the "free game" is triggered when the re-spin symbol 503*c* is rearranged on the symbol display device (reel unit M1), and is also termed "re-spinning feature".

Now, the flow of a normal game, a bonus game, and a free game of the present embodiment will be described. As shown in FIG. 4, to begin with, a normal game is executed (B1). In the normal game, symbols to be rearranged are randomly determined. The symbols to be rearranged are determined based on a normal game symbol random determination table shown in FIG. 71. In the present embodiment, the symbols are rearranged in cells that form five columns and three rows. As the symbol at the second column (center position) of each reel is determined, symbols at the first and third columns are automatically determined (the same applied to the free game and the bonus game). More than one type of the normal game symbol random determination table are provided, and the table may be switched in accordance with settings such as AUDIT, game conditions, and a purpose such as demonstration.

The normal game is shifted to a re-spinning feature game (B2) which is a free game or to bonus-in (B6) from which the shifting to the execution of the bonus game more than once may occur. The game state of the bonus-in may be referred to as "enchanted lamp bonus". When the re-spin symbol 503*c* is rearranged in the normal game, the re-spinning feature game (first time) is executed (B2). The re-spinning feature game is the execution of the free game once without requiring betting. In the re-spinning feature game (first time), the random determination of symbols to be rearranged is executed in a similar manner as in the normal game. The symbols to be rearranged is determined based on a re-spinning feature first time symbol random determination table shown in FIG. 72. When the re-spin symbol 503*c* is rearranged again in this re-spinning feature game, the re-spinning feature game (second time) is executed (B3). In the re-spinning feature game (second time), the random determination of symbols to be rearranged is executed in a similar manner as in the normal game. The symbols to be rearranged are determined based on a re-spinning feature second time symbol random determination table shown in FIG. 73. Then feature random determination is executed (B4) and expand feature (B5) or bonus-in (B6) in which other bonus games are executable are executed. When the re-spin symbol 503*c* is successively rearranged twice, the re-spinning feature game (second time) may be conducted after the feature random determination. In such a case, when the expand feature is selected in the feature random determination, the expand feature may be executed in place of the re-spinning feature game (second time).

When the bonus-in (B6) is selected, which bonus game will be run is randomly determined. In this regard, as described later, an effect is executed by using the formed object (lamp body 132) or the like to perform notification corresponding to the randomly selected bonus game. Thereafter, one of the "BONUS A (credit payout bonus game)" (B7), the "BONUS B (pickup bonus game)" (B8), the "free game A (expand bonus game)" (B9), and the "free game B (multi-type bonus game)" (B10) is executed. The weight of each of the credit payout bonus game and the pickup bonus game is "3" and the probability thereof is "30%". The weight of each of the expand bonus game and the multi-type bonus game is "2" and the probability thereof is "20%".

After the end of the "BONUS A (credit payout bonus game)" (B7) or the "BONUS B (pickup bonus game)" (B8), the shifting to one of the "free game A (expand bonus game)" (B9) and the "free game B (multi-type bonus game)" (B10) is possible. The weight of the shifting from the credit payout bonus game to the expand bonus game is "1", and the probability thereof is "10%". The weight of the shifting from the credit payout bonus game to the multi-type bonus game is "1" and the probability thereof is "10%". The weight of the shifting from the credit payout bonus game to the normal game (i.e., the end of the bonus game) is "8" and the probability thereof is "80%". The free game and the bonus game will be detailed later.

The credit payout bonus game is a bonus game with which a fixed credit is awarded. The payout amount is determined based on a credit payout bonus game table shown in FIG. 53 to fall within the range of 50 to 600.

The pickup bonus game is a bonus game in which the player selects one of three options and at least one of a credit and the development to the bonus game (free game A or free game B) is awarded to the player. The content of each of the three options is determined based on a pickup bonus game payout table shown in FIG. 54 and a pickup bonus game development table. Furthermore, when in the pickup bonus game the selected option does not include the development to the bonus game, the probability of the development to the bonus game is given to the player again. That is to say, by using a pickup bonus game redevelopment table shown in FIG. 56, one of two choices, i.e., (i) end the pickup bonus game and return to the normal game and (ii) develop to the free game A or the free game B, is selected.

The expand bonus game is a bonus game in which the free game can be executed more than once. In the free game in the expand bonus game, the probability of the rearrangement of the wild symbol 503*a* is high. In the free game in the expand bonus game, to begin with, whether the wild symbol 503*a* is stopped in advance is determined based on an expand wild occurrence random determination table shown in FIG. 57. When the wild symbol 503*a* is stopped, the rank (low, middle, or high) is determined based on an expand wild rank determination table shown in FIG. 58. Then, which one of the reels 101 to 105 the wild symbol 503*a* is stopped is determined. Note that, which one of the reels 101 to 105 the wild symbol 503*a* is stopped is determined based on a random determination table (FIG. 59 to FIG. 61) which is different in each rank. Furthermore, when in the expand bonus game the number of times of execution of the free game becomes 0, whether to add the free game is determined based on an expand wild revival random determination table shown in FIG. 62. The additional number of times of execution of the free game is determined based on an expand wild additional number of execution random determination table shown in FIG. 63.

The multi-type bonus game is a bonus game in which the free game can be run more than once. In the free game in the expand bonus game, the probability of obtaining an advantageous benefit is high. In the free game in the expand bonus game, the addition of a fixed credit (hereinafter, credit payout), the determination of the additional number of times of execution of the free game by the selection of one of three options (hereinafter, pickup), the increase in the payout rate of the line payout (hereinafter, payout rate), and the stop of the wild symbol 503*a* (hereinafter, expand) may occur. One of the cases above and blank is selected each time the free game is run, based on a multi-type bonus game benefit random determination table shown in FIG. 64. When the credit payout is selected, the credit payout amount is determined based on a multi-type bonus game fixed payout random determination table shown in FIG. 65. When the pickup is selected, the content of the option is determined based on a multi-type bonus game random determination table shown in FIG. 66. The content of the option randomly selected is stored in a multi-type bonus game additional number of execution type table shown in FIG. 67. When the payout rate is selected, a number by which the payout rate of each line is multiplied is determined based on a multi-type bonus game line payout rate random determination table shown in FIG. 68.

When the number of times of execution of the free game becomes 0 in the multi-type bonus game, whether to add the number of times of execution of the free game is determined based on a multi-type bonus game revival random determination table shown in FIG. 69. The additional number of times of execution of the free game is determined based on a multi-type bonus game additional number of execution random determination table shown in FIG. 70.

When a result of the free game in the multi-type bonus game is no benefit, credit payout, or pickup, symbols to be rearranged are randomly determined based on a multi bonus common symbol random determination table shown in FIG. 74. When a result of the free game in the multi-type bonus game is payout rate, symbols to be rearranged are randomly determined based on a multi bonus payout rate symbol random determination table shown in FIG. 75.

In the expand feature, the expand bonus game, and the expand of the multi-type bonus game, the wild symbol 503*a* may be stopped. In this regard, the symbols rearranged on the reels where the wild symbol 503*a* is not stopped are determined based on an expand symbol random determination table shown in FIG. 76.

(Lamp Body Unit 131)

The lamp body unit 131 including a lamp body 132 will be described. As shown in FIG. 5, the lamp body unit 131 is detachably attached to the cabinet 14 of the gaming machine 300. Because the lamp body unit 131 is detachable in this way, a failure is treated only by replacing the lamp body unit 131.

As shown in FIG. 6, the lamp body 132 is formed to have a three-dimensional shape to protrude toward the front surface as compared to the lower end of the upper image display panel 142. This allows the player to easily notice the presence of the lamp body 132 when looking at the upper image display panel 142. Furthermore, as shown in FIG. 7, the lamp body 132 is provided between the reel unit M1 and an upper image display panel 142 which is provided above the reel unit M1. Because the lamp body 132 is provided in this way, the player is able to play games with less stress because the upper image display panel 142 and the entirety of the reel unit M1 are easily seen as compared to the touch panel of the upper image display panel 142 and buttons provided below the reel unit M1, which are typically operated by the player.

Figure 8:
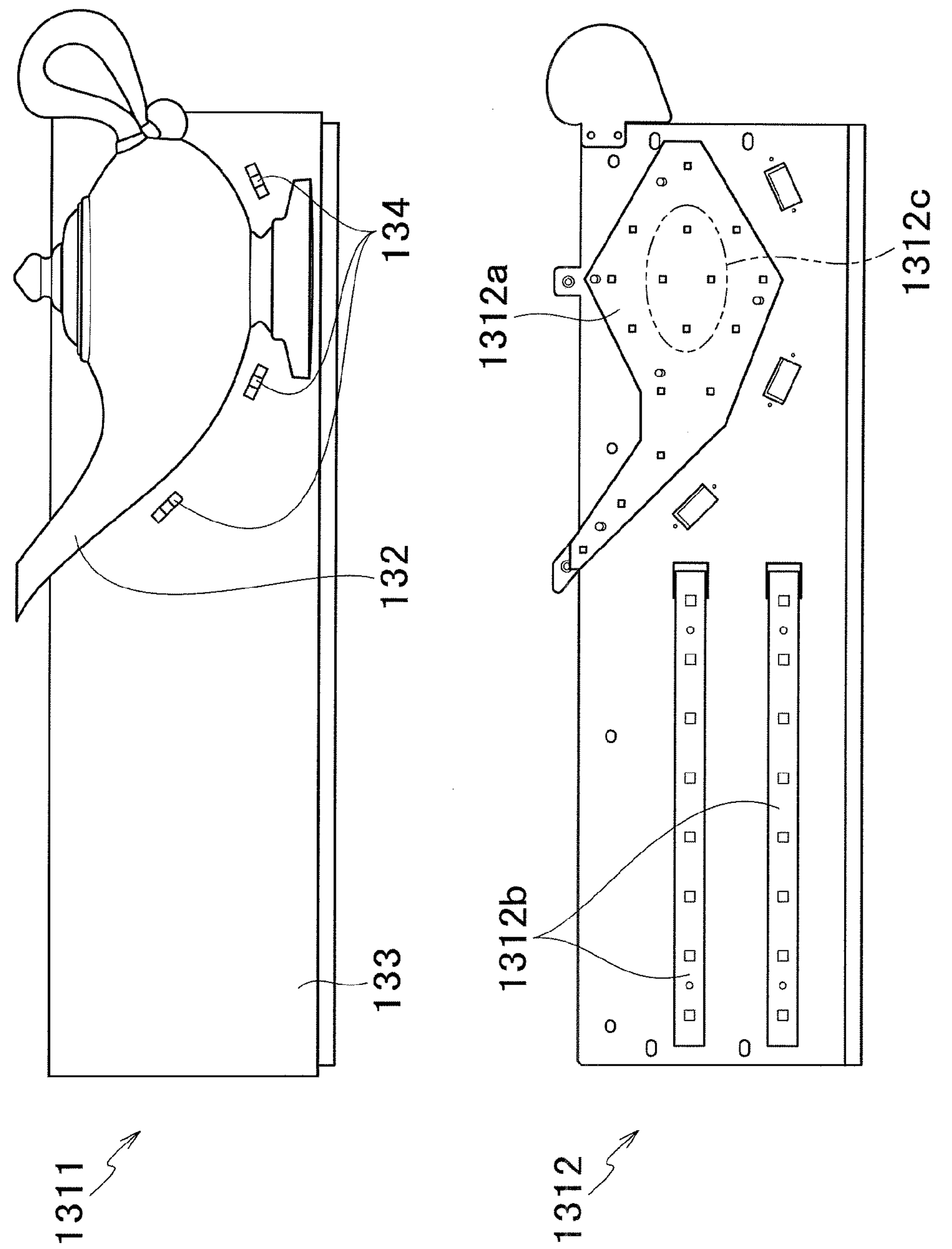
FIG. 8 illustrates the structure of a lamp body unit.

As shown in FIG. 8, the lamp body unit 131 is constituted by a unit front portion 1311 and a unit rear portion 1312 which is provided behind the unit front portion 1311 and on which a board and a LED are provided. On the unit front portion 1311, a lamp body 132, a supporting plate 133, and a plurality of (three) sensors 134 are provided. On the entirety of the right side surface of the plate-shaped supporting plate 133, the lamp body 132 that three-dimensionally mimics the shape of a lamp is provided. Through the supporting plate 133, a plurality of through holes are formed to surround the lamp body 132. At the respective through holes on the back side of the supporting plate 133, the sensors 134 are provided. This allows each sensor 134 to detect the presence of light ahead through the through hole.

The lamp body 132 and the supporting plate 133 are made of light-transmissive material and are surface-treated on the back side. On the back side of the lamp body 132, a half mirror is formed by vapor deposition or the like. The half mirror is formed to have properties of reflecting light advancing from the front surface toward the back surface and transmitting light advancing from the back surface toward the front surface. The half mirror is preferably colored in a noticeable color such as gold, but is not necessarily arranged in this way. Because the half mirror is formed in this way, the light emitted from the LED on the back surface is transmitted forward. Furthermore, the back surface of the supporting plate 133 is colored in black. The supporting plate 133 is preferably arranged to transmit at least a part of light from the back side.

The unit rear portion 1312 is provided with a LED board 1312*a* and two LED boards 1312*b*. On the LED board 1312*a*, a plurality of LEDs illuminating the lamp body 132 from the back side are scattered and a control unit (not illustrated) for controlling the LEDs are provided. The LEDs of the LED board 1312*a* are arranged to emit light with at least two colors (red and green). For example, multicolor LEDs are used or a half of the LEDs emit red light whereas the remaining half of the LEDs emit green light. The two LED boards 1312*b* are provided to extend in the direction in parallel to the length of the supporting plate 133. On each LED board 1312*b*, a plurality of LEDs illuminating the supporting plate 133 from the back side are provided in a parallel manner and a control unit (not illustrated) for controlling the LEDs are provided.

Figure 9:
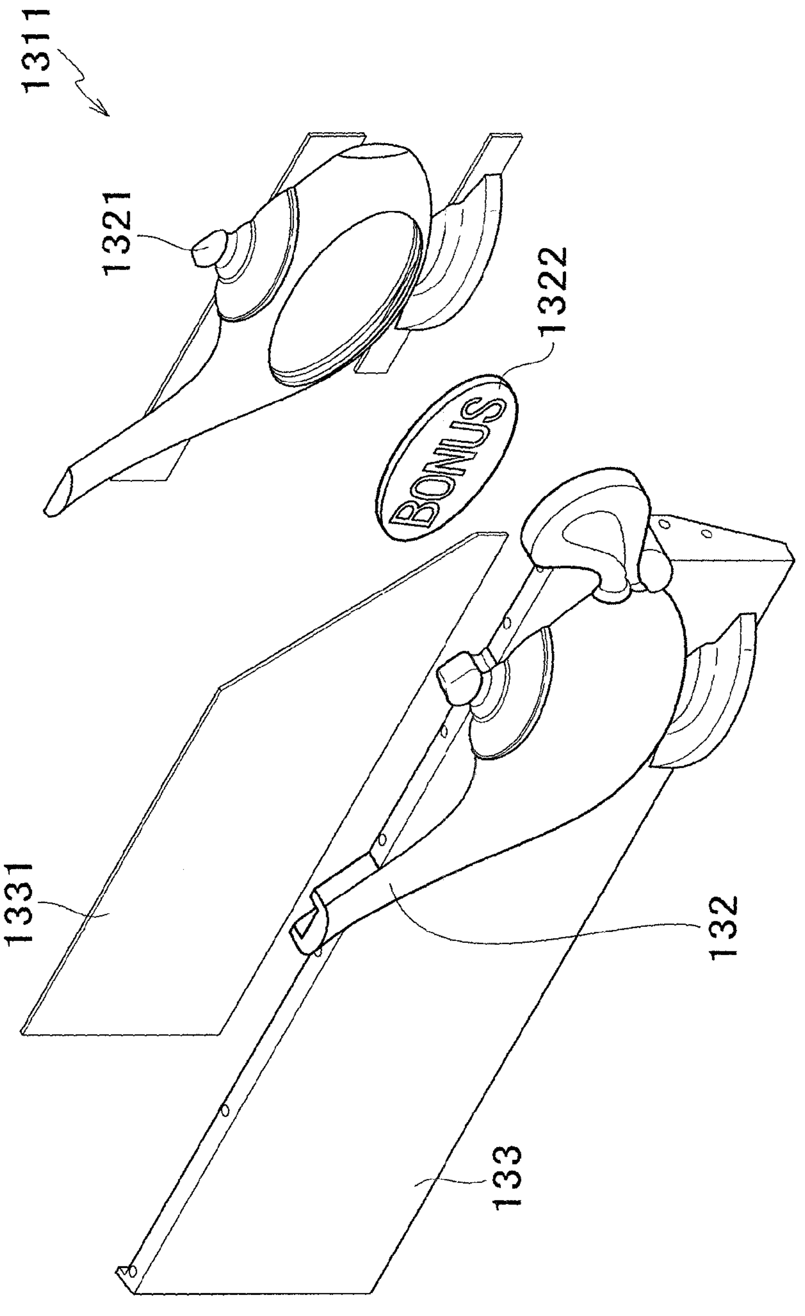
FIG. 9 is an exploded perspective view showing the structure of the lamp body unit.

As shown in FIG. 9, the unit front portion 1311 includes a light scattering part 1321, an ellipsoid 1322, and a sheet 1331. On the back surface of the lamp body 132 is provided the light scattering part 1321 that engages with the lamp body 132 along its shape. The light scattering part 1321 is provided to be superposed onto the back side of the lamp body 132. The light scattering part 1321 is surface-treated to scatter the received light. The light scattering part 1321 has an elliptical concave at the central portion on the front side. With this elliptical concave, the ellipsoid 1322 formed to have an elliptical shape corresponding to the concave is fitted. The ellipsoid 1322 is colored by printing so that the text "BONUS" is shown on the both sides, and the light transmittance is arranged to be high at the "BONUS". Alternatively, sheets each of which is cut out to show the text "BONUS" may be pasted on the ellipsoid 1322.

The sheet 1331 is pasted onto the back side of the supporting plate 133 to avoid the part where the lamp body 132 is provided. The sheet 1331 is a sticker on which a transmissive design is formed. The sheet 1331 receives light from the LEDs of the LED board 1312*b* and projects the design on the sheet on the supporting plate 133.

Because the lamp body unit 131 is arranged as above, the lamp body 132 is able to execute an effect of emitting light in a plurality of modes. As shown in FIG. 10, the slot machine 10 detects the player's gesture with respect to the lamp body 132 at a timing corresponding to the state of the game, and causes the lamp body 132 to emit light in a light emission mode corresponding to the gesture. Now, an effect synchronized with the player's gesture with respect to the lamp body 132 will be described.

(Synchronized Effect Regarding Formed Object)

As shown in FIG. 1, the gaming machine 300 of the present embodiment is arranged so that player's gesture with respect to the lamp body 132 which is a formed object is synchronized with an effect image displayed on the upper image display panel 142. Furthermore, as shown in FIG. 10, the gaming machine 300 is arranged so that player's gesture with respect to the lamp body 132 which is a formed object is synchronized with the light emission mode of the lamp body 132 that emits light as being illuminated by the LEDs.

Figure 11:
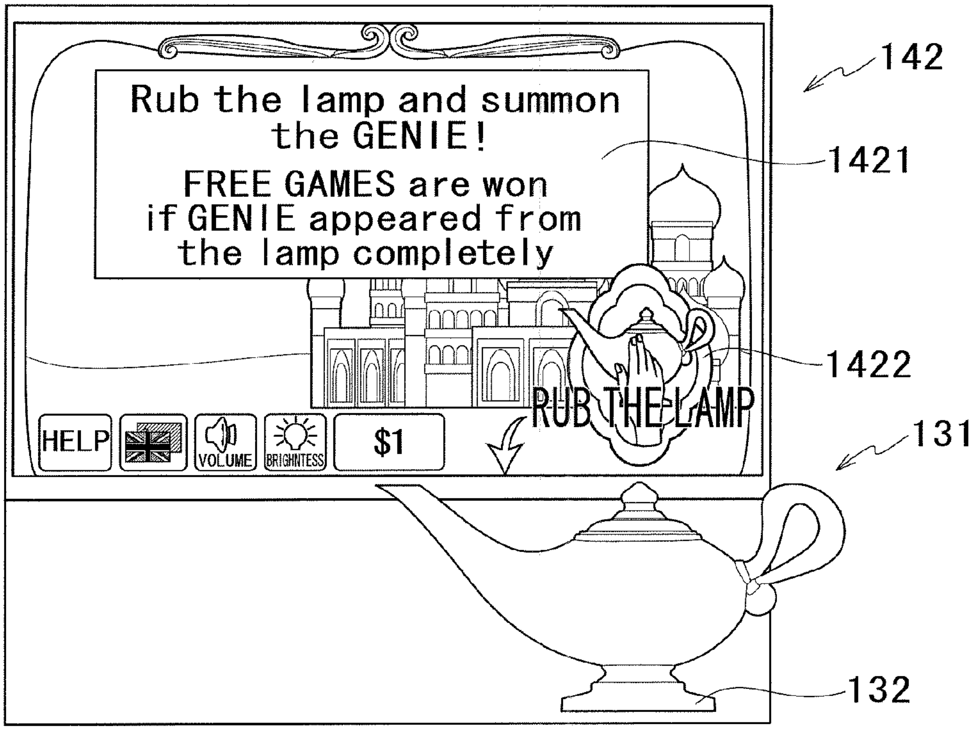
FIG. 11 shows an example of the effect operation.

In this part, a "genie appearance effect" executed when a predetermined game state is established will be specifically explained as an example. As shown in FIG. 11, when the genie appearance effect starts, a message notifying that the genie appearance effect will start and a message 1421 notifying that an advantageous game state is achieved when a predetermined effect is executed are displayed at an upper central part of the upper image display panel 142. In a lower right part of the upper image display panel 142 is displayed a gesture requirement image 1422 showing the gesture of rubbing the lamp body 132. While in the present embodiment whether the predetermined effect is established is determined in advance, a different arrangement may be employed. For example, whether the predetermined effect is established may be determined based on the player's gesture detected by the sensors 134.

In the present embodiment, the player's gesture of rubbing the lamp body 132 is categorized into one of a plurality of patterns. More specifically, the player's gesture of rubbing the lamp body 132 is categorized as "low", "middle", or "high". The judgement regarding the player's gesture of rubbing the lamp body 132 is made based on the detection by the sensors 134. The judgement of the player's gesture of rubbing the lamp body 132 will be described later.

Figure 15:
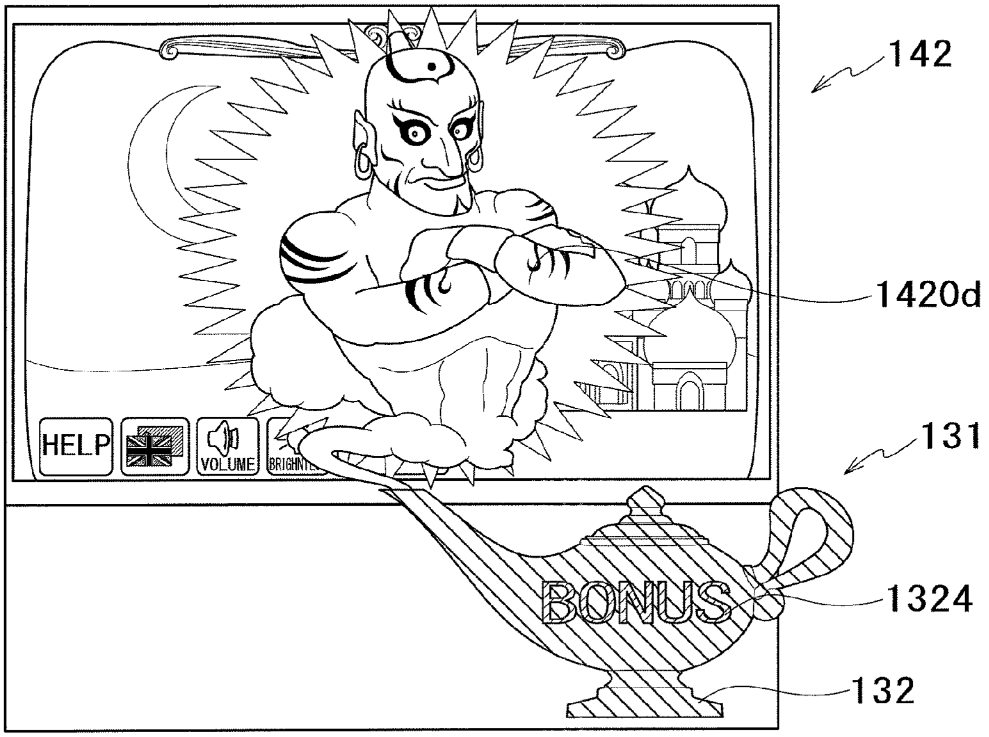
FIG. 15 shows an example of the effect operation.

In the genie appearance effect, four effects are executed. First of all, when the player does not rub the lamp body 132, an effect shown in FIG. 11 is continued. When the state in which the lamp body 132 is not rubbed by the player is continued for 10 seconds, a later-described effect shown in FIG. 15 is executed. Alternatively, the genie appearance effect ends in the state shown in FIG. 11.

Figure 12:
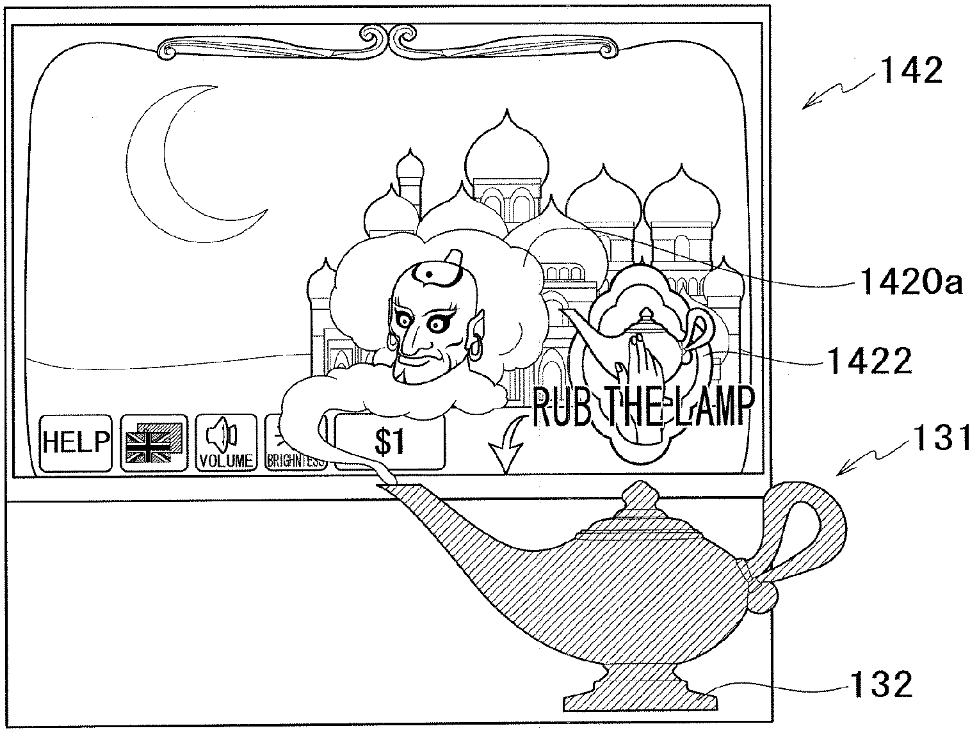
FIG. 12 shows an example of the effect operation.

When the player's gesture of rubbing the lamp body 132 is "low", an effect shown in FIG. 12 is executed. More specifically, a head-only character image 1420*a* is displayed on the upper image display panel 142. With this, the effect with which as if the head-only character image 1420*a* appears from the lamp body 132 is executed. All LEDs of the LED board 1312*a* blink in red. With this, the lamp body 132 is in the light emission mode in which the entirety of the lamp body blinks in red. When the number of times the player rubs the lamp body 132 reaches a predetermined number or when 10 seconds elapse after the start of the genie appearance effect, a later-described effect shown in FIG. 11 or FIG. 15 is executed and the genie appearance effect ends.

Figure 13:
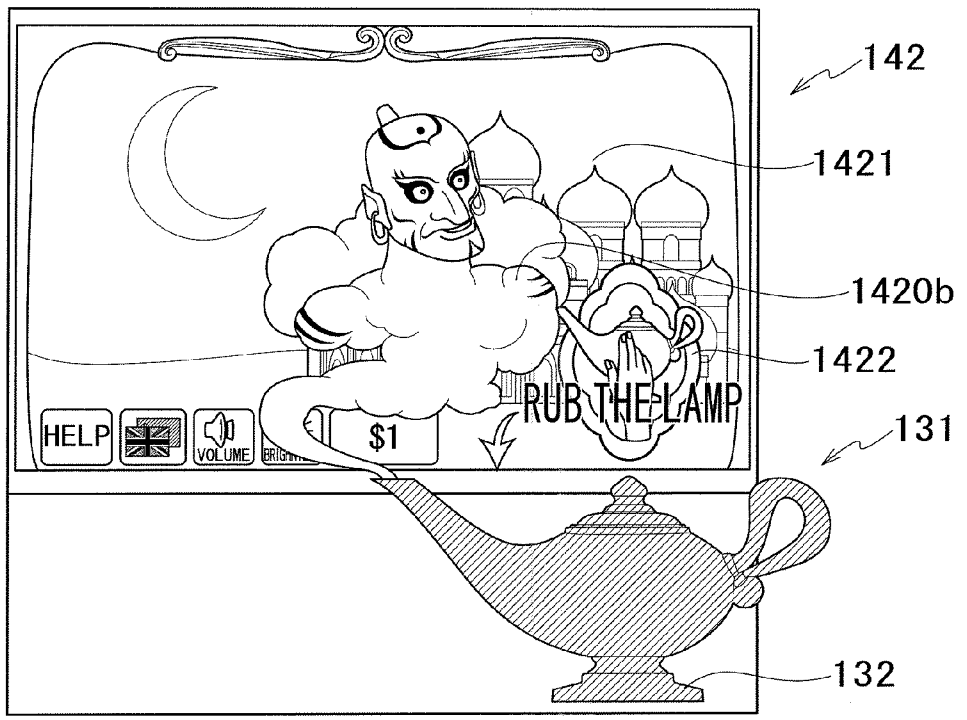
FIG. 13 shows an example of the effect operation.

When the player's gesture of rubbing the lamp body 132 is "middle", an effect shown in FIG. 13 is executed. More specifically, a head-and-shoulders character image 1420*b* is displayed on the upper image display panel 142. With this, an effect as if an image 1420*b* of the head and shoulders of a character appears from the lamp body 132 is executed. All LEDs of the LED board 1312*a* blink in red. With this, the lamp body 132 is in the light emission mode in which the entirety of the lamp body blinks in red. When the number of times the player rubs the lamp body 132 reaches a predetermined number or when 10 seconds elapse after the start of the genie appearance effect, a later-described effect shown in FIG. 11 or FIG. 15 is executed and the genie appearance effect ends.

Figure 14:
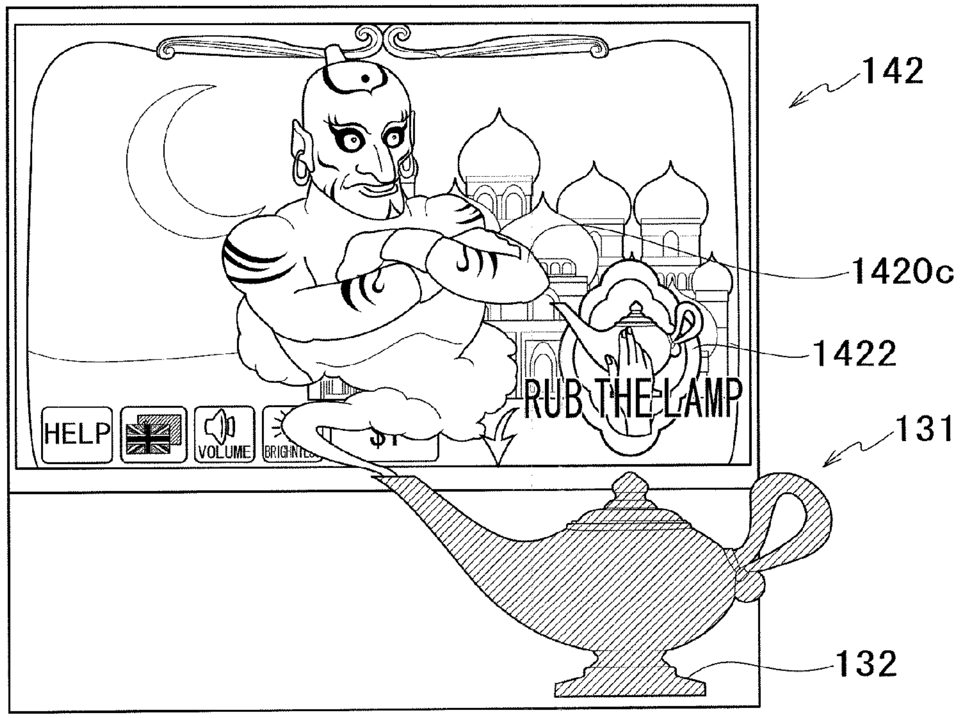
FIG. 14 shows an example of the effect operation.

When the player's gesture of rubbing the lamp body 132 is "high", an effect shown in FIG. 14 is executed. More specifically, a bust character mage 1420*c* is displayed on the upper image display panel 142. With this, an effect as if an image 1420*c* of the upper part of the character appears from the lamp body 132 is executed. All LEDs of the LED board 1312*a* blink in red. With this, the lamp body 132 is in the light emission mode in which the entirety of the lamp body blinks in red. When the number of times the player rubs the lamp body 132 reaches a predetermined number or when 10 seconds elapse after the start of the genie appearance effect, a later-described effect shown in FIG. 11 or FIG. 15 is executed and the genie appearance effect ends.

Note that, in accordance with the player's gesture of rubbing the lamp body 132, the light emission mode of the lamp body 132 may be changed. For example, in accordance with the player's gesture of rubbing the lamp body 132, the blinking speed of the lamp body 132 may be changed. Alternatively, in accordance with the player's gesture of rubbing the lamp body 132, the gesture requirement image 1422 may be changed. For example, in accordance with the player's gesture of rubbing the lamp body 132, the way of flashing the gesture requirement image 1422 may be changed.

The time in which the effects of FIG. 11 to FIG. 14 are being executed is the time to detect the player's gesture. In other words, the time to detect the player's gesture is either 10 seconds or the time until the number of times the player rubs the lamp body 132 reaches a predetermined number.

After the time to detect the player's gesture, an effect of FIG. 15 is conducted if the establishment of an advantageous game state has been determined in advance. More specifically, a from-head-to-belly character image 1420*d* is displayed on the upper image display panel 142. With this, an effect as if an image 1420*c* of the head to the belly of the character appears from the lamp body 132 is executed. The LEDs (second light emitting portion) at a central part 1312*c* of the LED board 1312*a* emit red light. The remaining LEDs (first light emitting portion) of the LED board 1312*a* emit green light. The LEDs at the central part 1312*c* emitting red light illuminate the ellipsoid 1322. As a result, the text "BONUS" is illuminated in red. The other green LEDs illuminate the periphery of the lamp body 132. With this, the BONUS text portion 1324 (second light emitting portion) is emphasized in red whereas the other region (first light emitting portion) of the lamp body 132 is illuminated in green. When the non-establishment of an advantageous game state has already been determined, an effect of FIG. 11 is executed. In so doing, the message 1421 and the gesture requirement image 1422 are not displayed.

(Determination of Operation by Player)

Now, the process of categorizing the player's gesture of rubbing the lamp body 132 as "low", "middle", or "high" will be described. As shown in FIG. 8, three sensors 134 are provided. The sensors are, from right to left, the first sensor, the second sensor, and the third sensor. Each sensor is an optical sensor and is in the ON state when the light received by the light receiving element is blocked by a hand or arm of the player. The sensor is in the OFF state when the light receiving element is receiving light.

Figure 16:
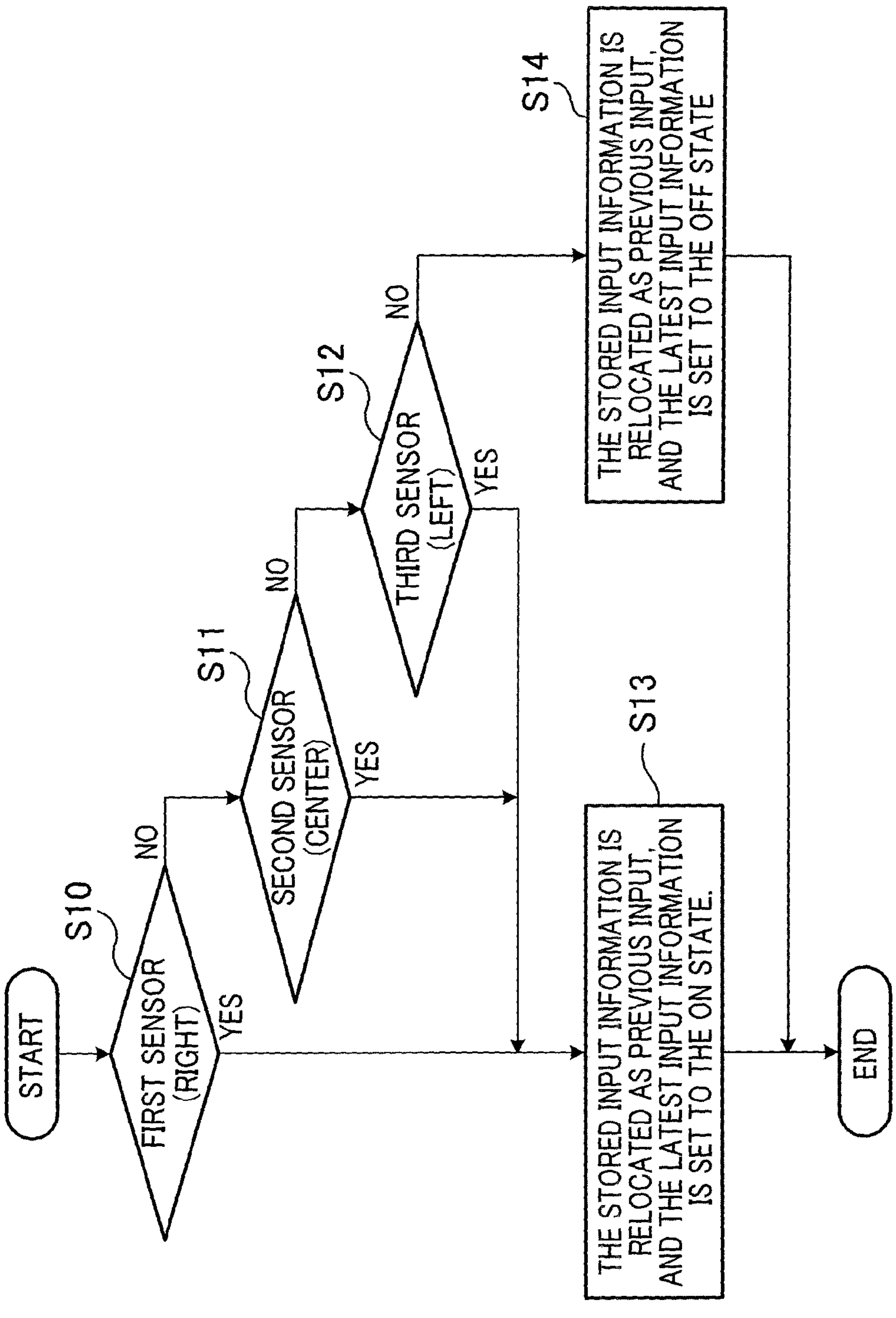
FIG. 16 is a flowchart showing operation determination.

Referring to FIG. 16, the outline of the operation determination will be described as a flowchart. The operation described in the flowchart below is repeatedly conducted at predetermined timings. In the present embodiment, one second is divided into 60 frames and the operation is conducted in each frame. To begin with, whether the first sensor is in the ON state is determined (S10). When the first sensor is not in the ON state, whether the second sensor is in the ON state is determined (S11). When the second sensor is not in the ON state, whether the third sensor is in the ON state is determined (S12). As a result, when at least one of the first to third sensors is in the ON state, the stored input information is relocated as previous input, and the latest input information is set to the ON state (S13). On the other hand, when none of the sensors is in the ON state, the stored input information is relocated as previous input, and the latest input information is set to the OFF state (S14).

Now, referring to FIG. 17, a flowchart of the determination process in each sensor 134 will be described. To begin with, whether the precedent frame was in the ON state is determined (S20). When the frame was not in the ON state, whether the sensor is currently in the ON state is determined (S21). When the sensor is not currently in the ON state, it is determined that the sensor is in the OFF state (S22) and the process is terminated. On the other hand, when the sensor is currently in the ON state, it is determined that the sensor is in the ON state (S23) and the process is terminated.

In S20, when the preceding frame was in the ON state, whether the sensor is currently in the OFF state is determined (S24). When the sensor is currently in the OFF state, it is determined that the sensor is in the ON state (S23) and the process is terminated. On the other hand, when the sensor is currently not in the OFF state, whether this condition has been maintained for at least consecutive 30 frames is determined (S25). The condition indicates that both the precedent frame was in the ON state and the sensor is currently in the ON state. That is to say, the condition is satisfied when at least the latest 29 frames in the stored input information were in the ON state and the sensor is currently in the ON state. When the condition is satisfied, whether the number of successive frames in the ON state in the stored input information is divisible by "7" (S26). When divisible by "7", it is determined that the sensor is in the ON state (S27) and the process is terminated. Either when the condition has not been maintained for at least consecutive 30 frames in S24 or the number is not divisible by "7" in S25, it is determined that the sensor is in the OFF state (S24) and the process is terminated.

Figure 17:
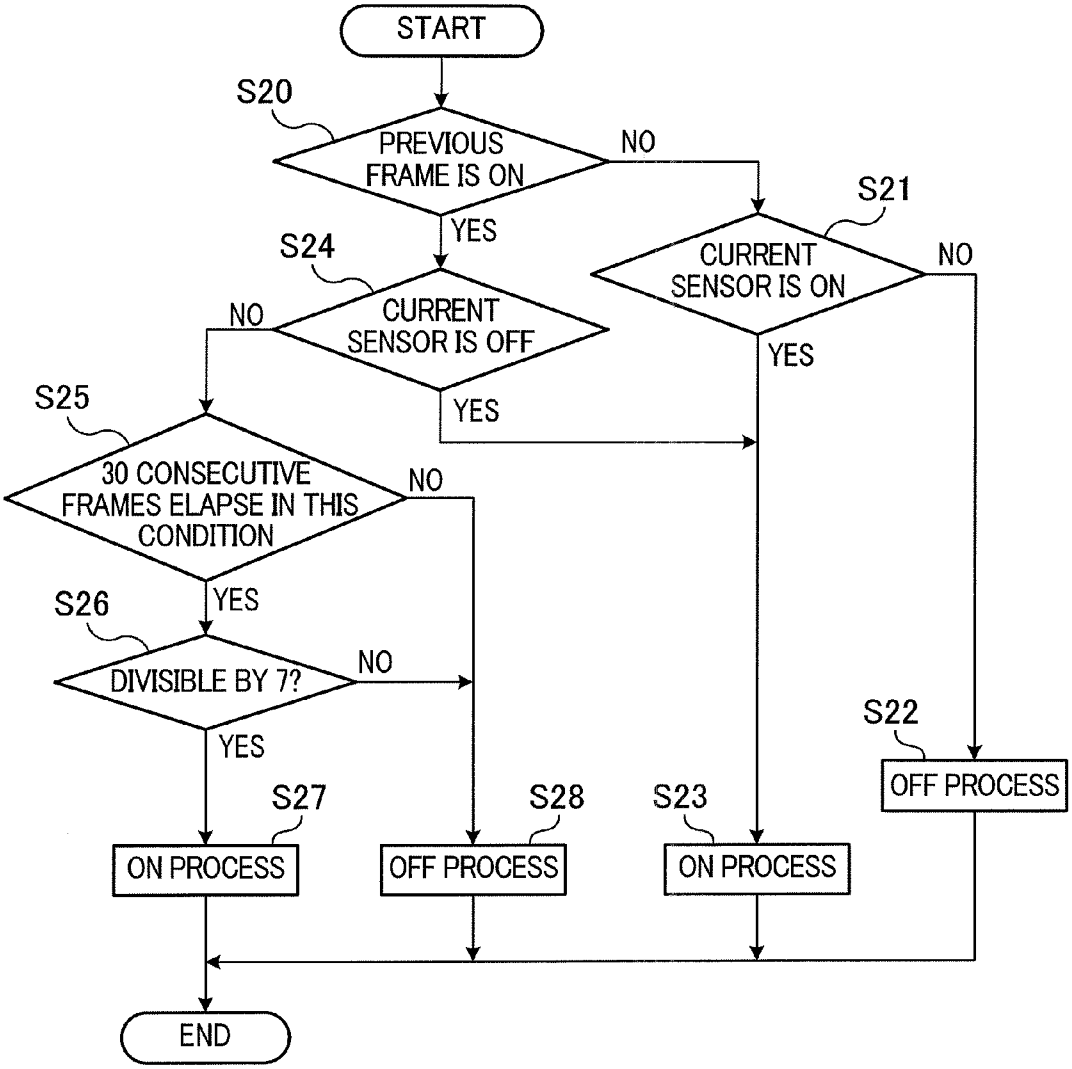
FIG. 17 is a flowchart showing a determination process in each sensor.

The results of the determinations made with reference to FIG. 16 and FIG. 17 are stored in the detection state storage table. As shown in FIG. 18, the detection state storage table has frame fields and state fields. In the frame fields, the latest frame numbers are serially stored from 1. In the state fields, detected states corresponding to the respective frame numbers are stored. For example, in the case of FIG. 18, the state is the OFF state when the frame is "1". That is to say, this indicates that the preceding detection result was the OFF state.

As such, the state detected by the sensor 134 is stored in the detection state storage table. The determination of the player's gesture of rubbing the lamp body 132 is made based on the data stored in this detection state storage table. More specifically, in the initial state, nothing is stored in the state field and the OFF state is set as default. Thereafter, in the first frame after the start of the detection, the ON state or the OFF state is stored in the state field of the frame "1". In the next frame, the data of the state field of the frame "1" is shifted to the state field of the frame "2" and the latest state is stored in the state field of the frame "1". While in the present embodiment the input information is stored for previous 180 frames, the disclosure is not limited to this arrangement.

The determination of the player's gesture of rubbing the lamp body 132 is made based on data of the latest 10 frames stored in the detection state storage table. More specifically, when all of the 10 frames are the ON state, it is determined that the player's gesture is "high". When 4 to 9 frames out of 10 frames are the ON state, it is determined that the player's gesture is "middle". When 1 to 3 frames out of 10 frames are the ON state, it is determined that the player's gesture is "low". When all of the 10 frames are the OFF state, it is determined that the player does not perform the gesture.

(Re-Spinning Feature Game)

Now, the re-spinning feature game executed in B2 and B3 in FIG. 4 will be described. As shown in FIG. 19, when in the reel unit M1 the re-spin symbol 503*c* is rearranged, the re-spinning feature game is executed as the free game. This feature will be detailed by focusing on the upper image display panel 142 and the reel unit M1.

Figure 21:
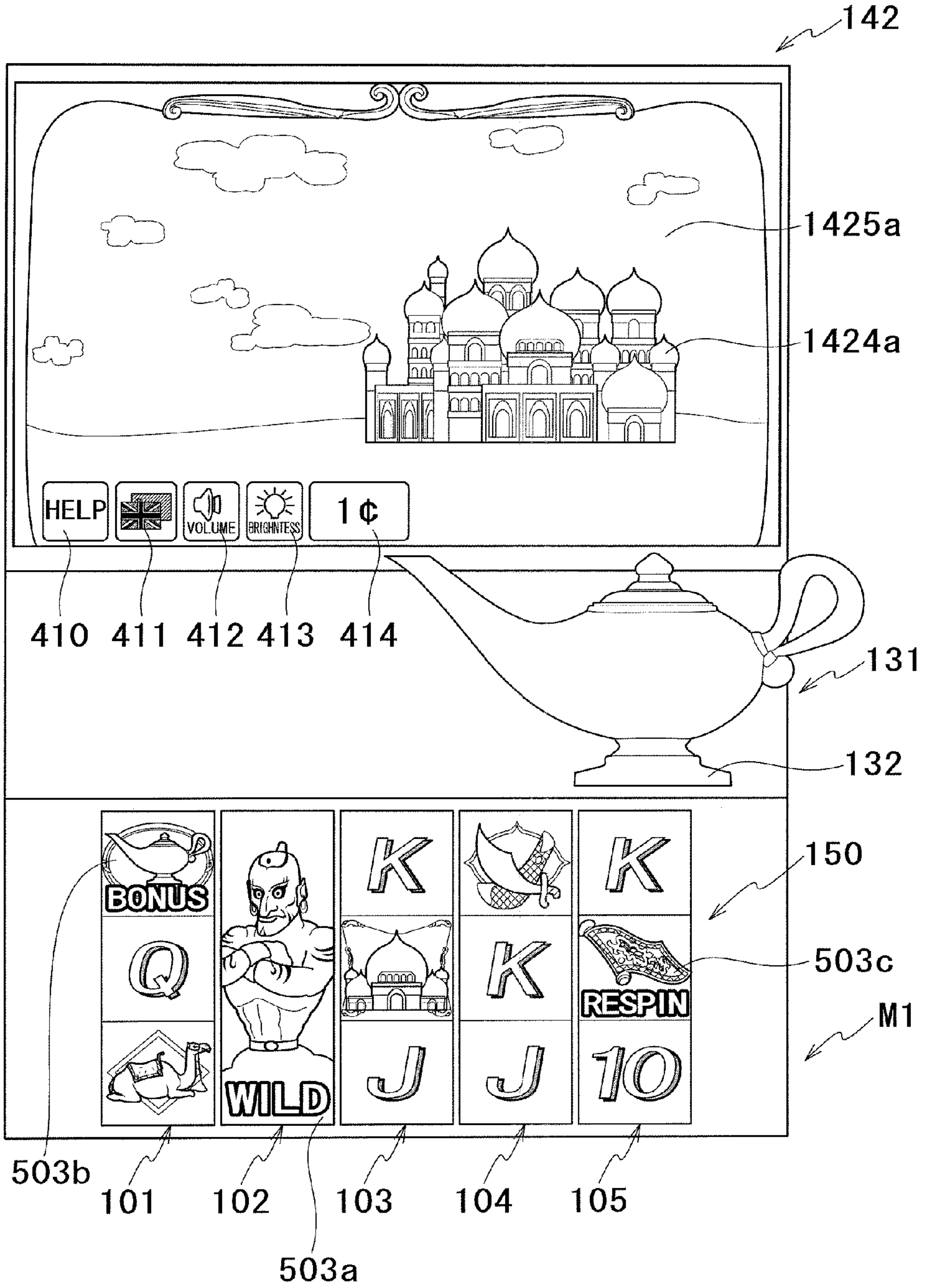
FIG. 21 shows an example of the effect operation.

In the normal game, a slot game is executed so that the reel unit M1 is driven to rearrange the symbols 501 in the display window 150. As shown in FIG. 21, in the normal game, a palace image 1424*a* is displayed and a background image 1425*a* indicating daytime are displayed on the upper image display panel 142. In a lower left part of the upper image display panel 142 are provided a help touch button 410, a language switching touch button 411, a sound volume switching touch button 412, a brightness adjustment button 413, and a denomination button 414. These buttons 410, 411, 412, 413, and 414 are provided from left to right when viewed from the player.

The help touch button 410 displays the first page of the help screen, when touched. The help touch button 410 is darkened when it is invalid, e.g., during the rotation of the reels. This button is displayed when the normal screen is displayed. The button disappears in the help screen 4101, the free game screen, and the double-up screen.

When the language switching touch button 411 is touched, the language is switched between English and Chinese. The language switching touch button 411 is valid only during the advertisement, and is darkened when it is invalid, e.g., during the rotation of the reels.

The sound volume switching touch button 412 is used for switching the game sound in three stages. Each time the button is touched, the game sound volume is changed such that small to middle to large to small to middle, and so on. This button is displayed when the normal screen is displayed. The button disappears when the help screen is displayed.

The brightness adjustment button (brightness button) 413 changes the brightness of the LEDs in three stages (each time the button is pressed, the brightness is changed such that level 3 (maximum brightness: 100%)→level 2 (intermediate brightness: 70%)→level 1 (minimum brightness: 30%)→level 3, and so on. The brightness adjustment button 413 is displayed when the normal screen is displayed, during the free game, during the gamble game, during residual gamble, and when the help screen is displayed. The button is always active when displayed. The brightness adjustment button 413 is not displayed during the AUDIT. The level of the brightness returns to the default level at the start of the game, at the end of the AUDIT, when the credit becomes zero, and when the advertisement occurs. Until 0.15 second (150 msec) elapses from the touch of the brightness adjustment button 413, the brightness adjustment button 413 is inactive.

The denomination button 414 displays the current denomination set in the AUDIT. This button is displayed when screens other than the AUDIT are displayed. The setting range of the denomination is, for example, between 0.01 dollar to 10 dollars.

In the normal game, the re-spinning feature game starts when the re-spin symbol 503*c* is rearranged on the reel 105 (fifth reel). When another winning has been achieved, the notification of the winning is conducted before the start of the re-spinning feature game. In the re-spinning feature game, the bet-per-line of the immediately preceding normal game is maintained. This re-spinning feature game is a free game played only once and no betting is required.

Figure 20:
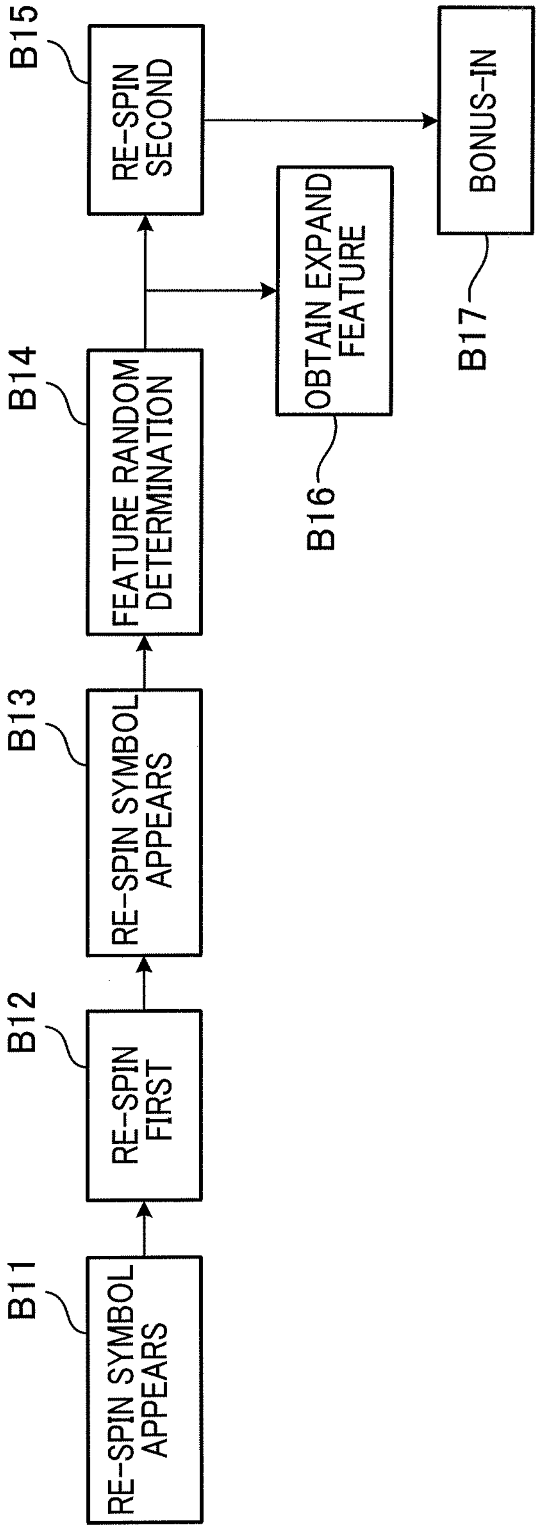
FIG. 20 is a flowchart showing the outline of a re-spinning feature game.

First of all, the overall flow of the re-spinning feature game will be described with reference to FIG. 20. The flow is equivalent to the steps B2 to B6 in FIG. 4. To begin with, in the normal game, the re-spin symbol 503*c* appears on the reel 105 (B11). As a result, the right to play the free game once is awarded to the player as the re-spinning feature game. The re-spinning feature game is a slot game of rearranging the symbols 501 in a similar manner as the normal game but is advantageous over the normal game. In the present embodiment, the re-spinning feature game is advantageous at least because no betting is required. The feature may be advantageous in another way.

As described above, as the re-spin symbol 503*c* is rearranged in the normal game, the first re-spinning feature game starts (B12). The bet per line in the re-spinning feature game in this case is identical with the value set in the normal game in which the re-spin symbol 503*c* is rearranged. In the present embodiment, the data table used for symbol random determination is different between the re-spinning feature game and the normal game. Furthermore, the data table used for symbol random determination is different between the re-spinning feature game of the first time and the re-spinning feature game of the second time. More specifically, in the data table used in the re-spinning feature game of the first time, the probability of the rearrangement of the trigger symbol 503*b* is 0 and hence bonus-in is not triggered in the feature.

The re-spinning feature game of the second time is executed at least when the re-spin symbol 503*c* appears in the reel 105 again in the re-spinning feature of the first time. When in the re-spinning feature game of the first time the re-spin symbol 503*c* appears on the reel 105 (B13), feature random determination is executed (B14). The feature random determination is a process of randomly selecting a bonus game. More specifically, in the feature random determination, expand feature or bonus-in is randomly selected.

When the expand feature is selected in the feature random determination, the re-spinning feature game of the second time is not executed and the expand feature is executed (B16). The expand feature is a free game executed once in the same manner as the re-spinning feature game, but is different from the re-spinning feature game in that the wild symbol 503*a* is always stopped in the reels 101 to 105.

When the bonus-in is selected in the feature random determination, the re-spinning feature game of the second time is executed (B17). In the re-spinning feature game of the second time, the trigger symbol 503*b* which is a bonus symbol is always stopped at the reel 101 (first reel), the reel 103 (third reel), and the reel 105 (fifth reel), the bonus-in is triggered. Now, the display states on the upper image display panel 142 and the reel unit M1 in the re-spinning feature game will be described.

As the re-spinning feature game starts, the variable display (hereinafter, this may be referred to as spinning) of the reels 101, 102, 103, 104, and 105 starts on the reel unit M1 and the display state of the upper image display panel 142 is changed. As shown in FIG. 21, at the center of the upper image display panel 142, a character image 1426 showing Aladdin on the magic carpet is displayed. At the same time, the palace image 1424*a* is changed to a palace image 1424*b* in which the size of the palace is larger than that in the palace image 1424*a*. Furthermore, the background image 1425*a* is changed to a background image 1425*b* indicating evening.

Figure 22:
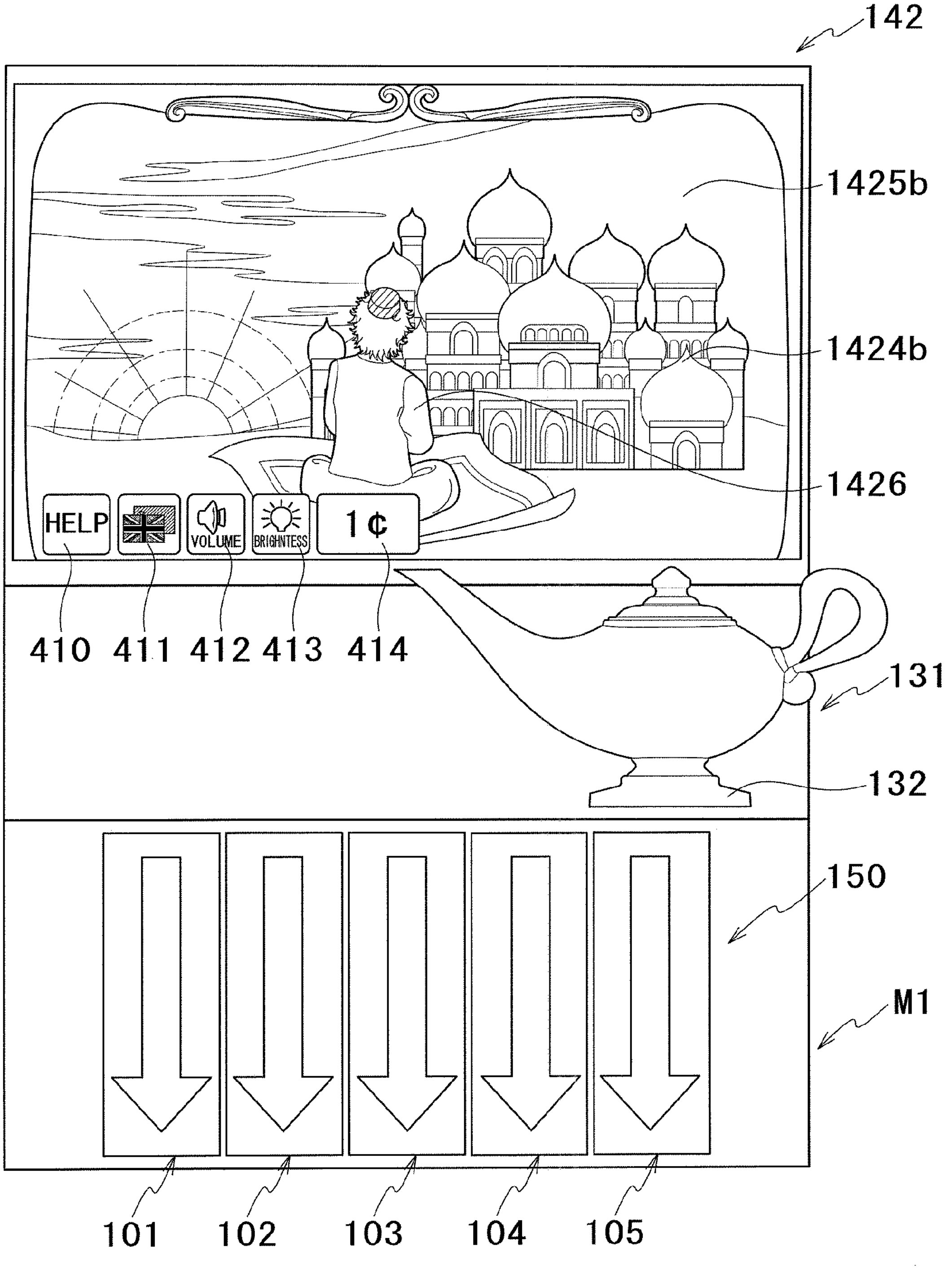
FIG. 22 shows an example of the effect operation.

In this re-spinning feature game, as shown in FIG. 22, when the re-spin symbol 503*c* is rearranged again on the reel 105 (fifth reel), the presence of a chance is notified by effect sound such as voice. In so doing, the character image 1426 is not displayed.

Figure 2:
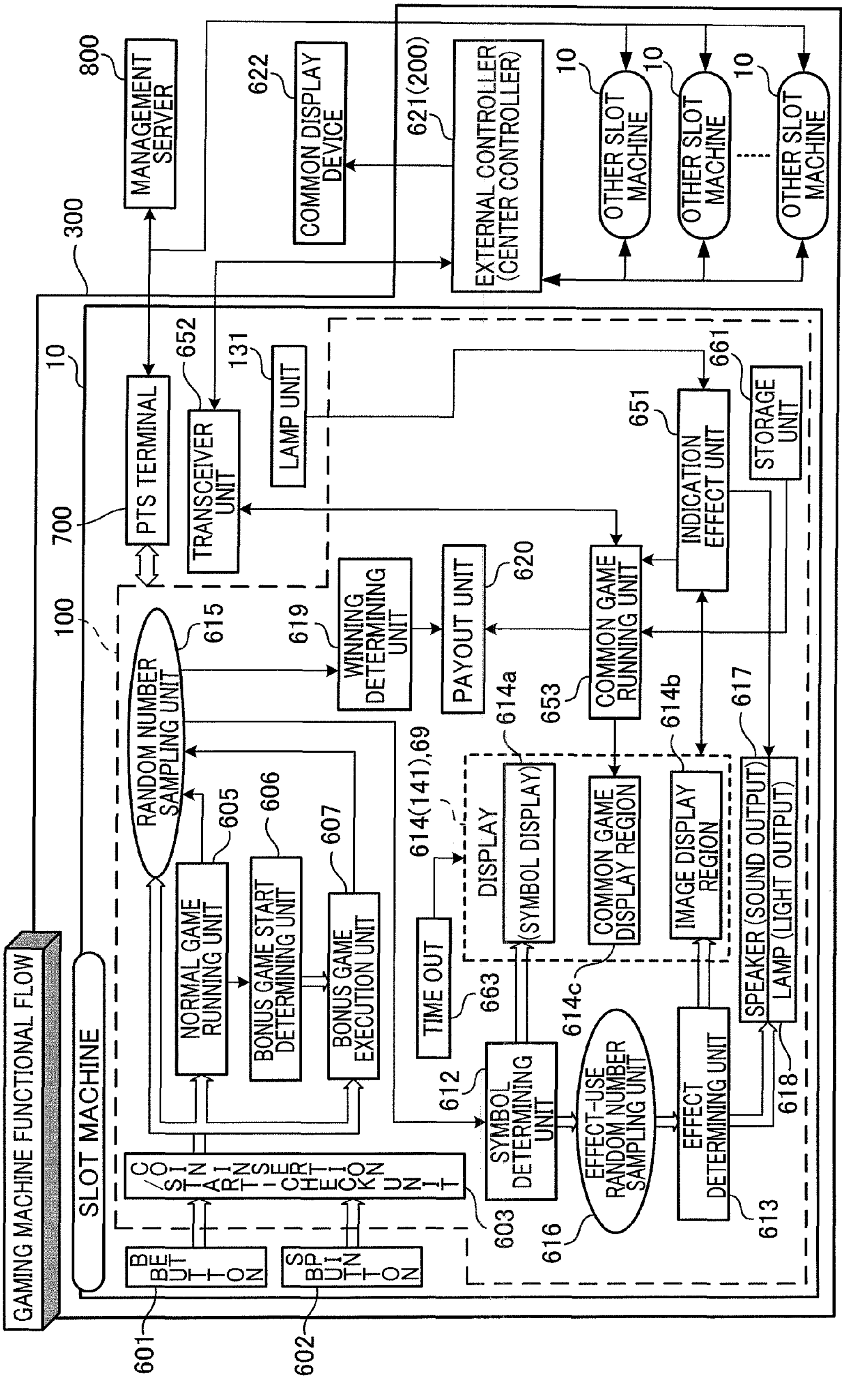
FIG. 2 illustrates the function flow of the gaming machine.
Figure 23:
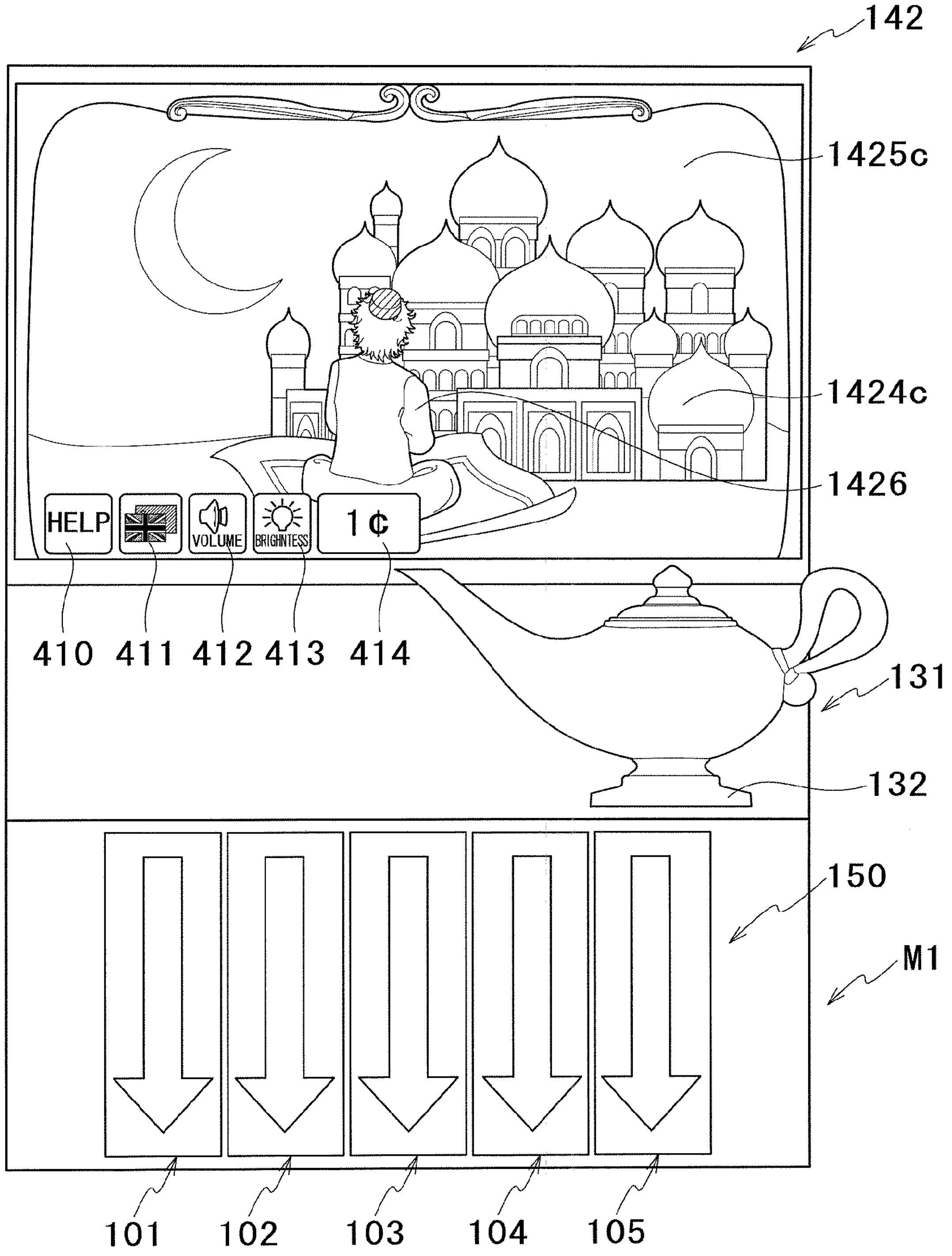
FIG. 23 shows an example of the effect operation.

Thereafter, as the re-spin symbol 503*c* is rearranged, the re-spinning feature game starts again. As the re-spinning feature game starts, the spinning of the reels 101 to 105 starts in the reel unit M1 and the display state of the upper image display panel 142 is changed. As shown in FIG. 23, at the center of the upper image display panel 142, the character image 1426 showing Aladdin on the magic carpet is displayed again. At the same time, the palace image 1424*b* is changed to a palace image 1424*c* in which the size of the palace is larger than that in the palace image 1424*b*. Furthermore, the background image 1425*b* is changed to a background image 1425*c* indicating night. Thereafter, after the character image 1426 disappears, as shown in FIG. 2 and FIG. 20, the expand feature (B5) starts or the bonus-in (B6) is established. Which one of them is executed is randomly determined. The probabilities are 70% for the expand feature and 30% for the bonus-in.

(Bonus-In)

Figure 24:
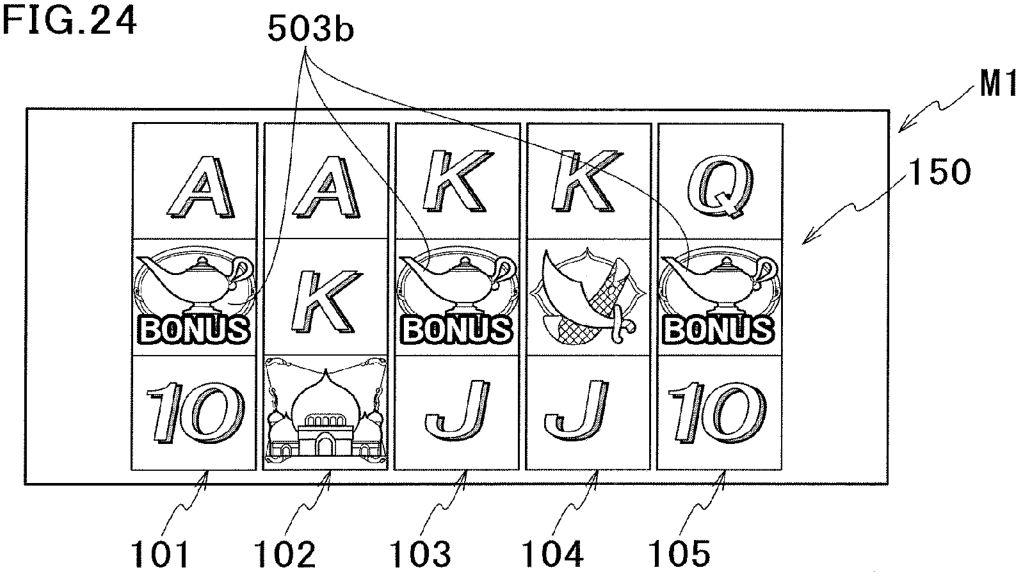
FIG. 24 shows an example of the effect operation.
Figure 25:
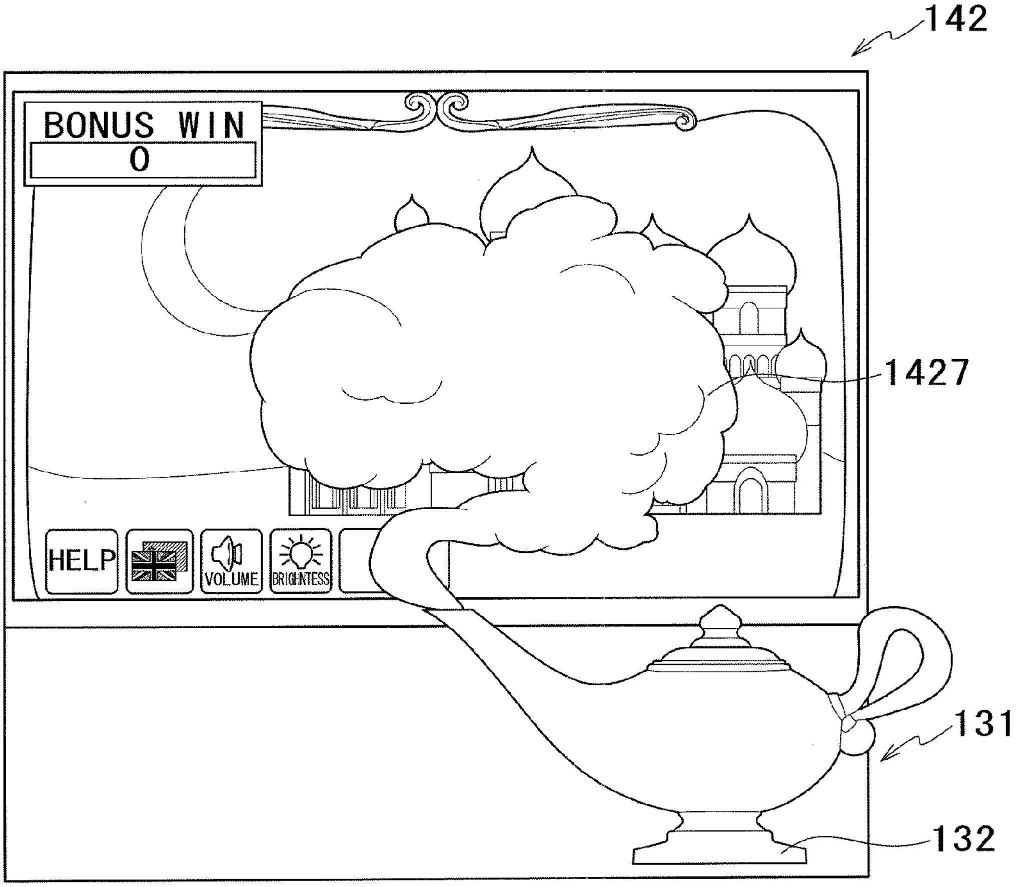
FIG. 25 shows an example of the effect operation.

Now, the bonus-in ("enchanted lamp bonus") executed in B6 shown in FIG. 4 will be described. As shown in FIG. 24, when the trigger symbol 503*b* is rearranged in the reels 101, 103, and 105 on the display window 150 of the reel unit M1, the bonus-in is established so that various bonus game become executable. When the bonus-in is established, as shown in FIG. 25, a smoke image 1427 is displayed to cover the upper image display panel 142. Furthermore, the upper image display panel 142 displays a bonus WIN meter 415 in which credits (that are values after multiplication of bet amount per line (bet per line)) obtained in various bonus games starting from the bonus-in are accumulated.

(Credit Payout Bonus Game)

Figure 26:
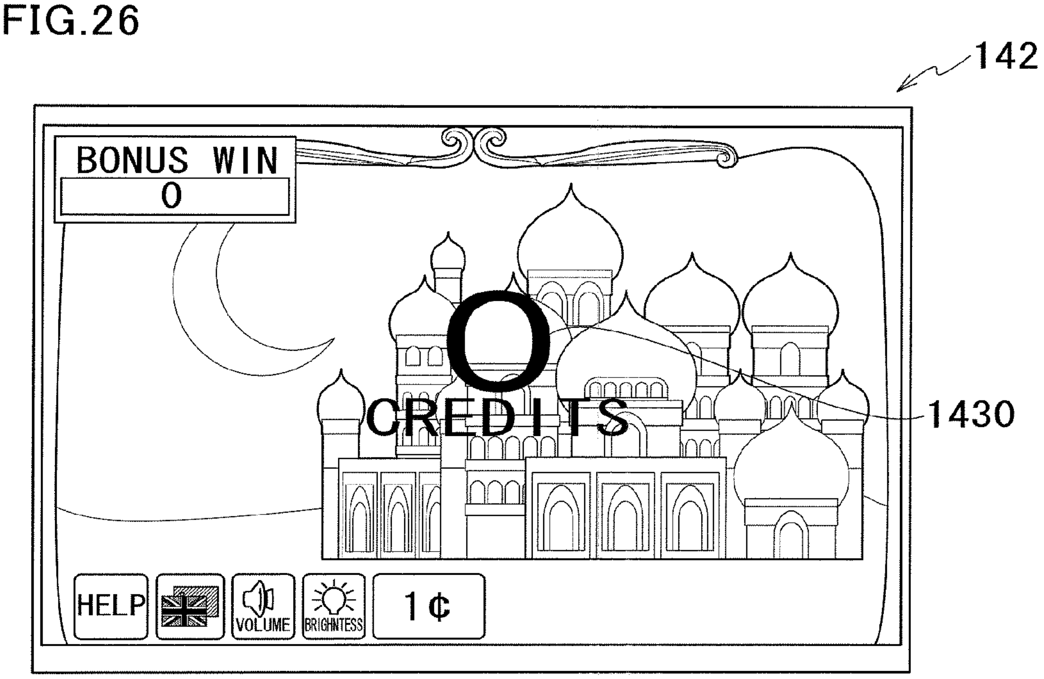
FIG. 26 shows an example of the effect operation.
Figure 27:
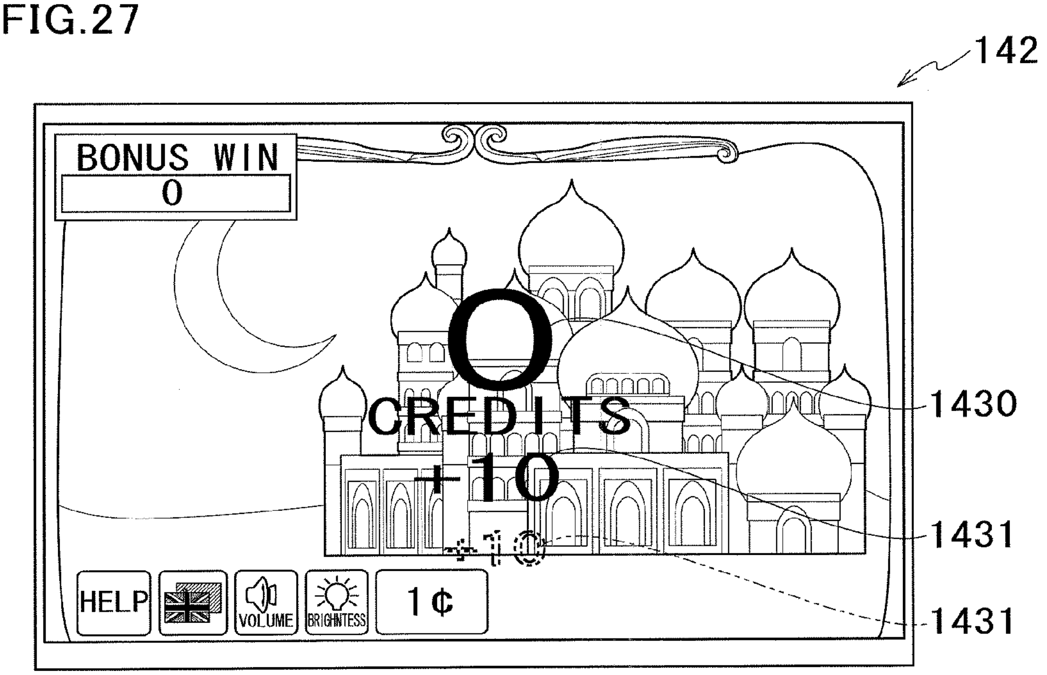
FIG. 27 shows an example of the effect operation.

An effect when the credit payout bonus game is executed from the bonus-in will be described. When the credit payout bonus game is executed, the effect shown in FIG. 25 is changed to the effect shown in FIG. 26. That is to say, the smoke image 1427 on the upper image display panel 142 disappears and a credit payout display image 1430 is displayed at the center. That is to say, numerical characters appears from the smoke. Thereafter, as shown in FIG. 27, image display is carried out such that additional credit display images 1431 serially move upward from below the credit payout display image 1430. To put it differently, image display is carried out such that a credit appears from the lamp body 132 and is added to the credit payout display image 1430. When the additional credit display image 1431 is overlapped on the credit payout display image 1430, the credit payout display image 1430 indicates a number after the addition of the number indicated by the additional credit display image 1431.

Figure 28:
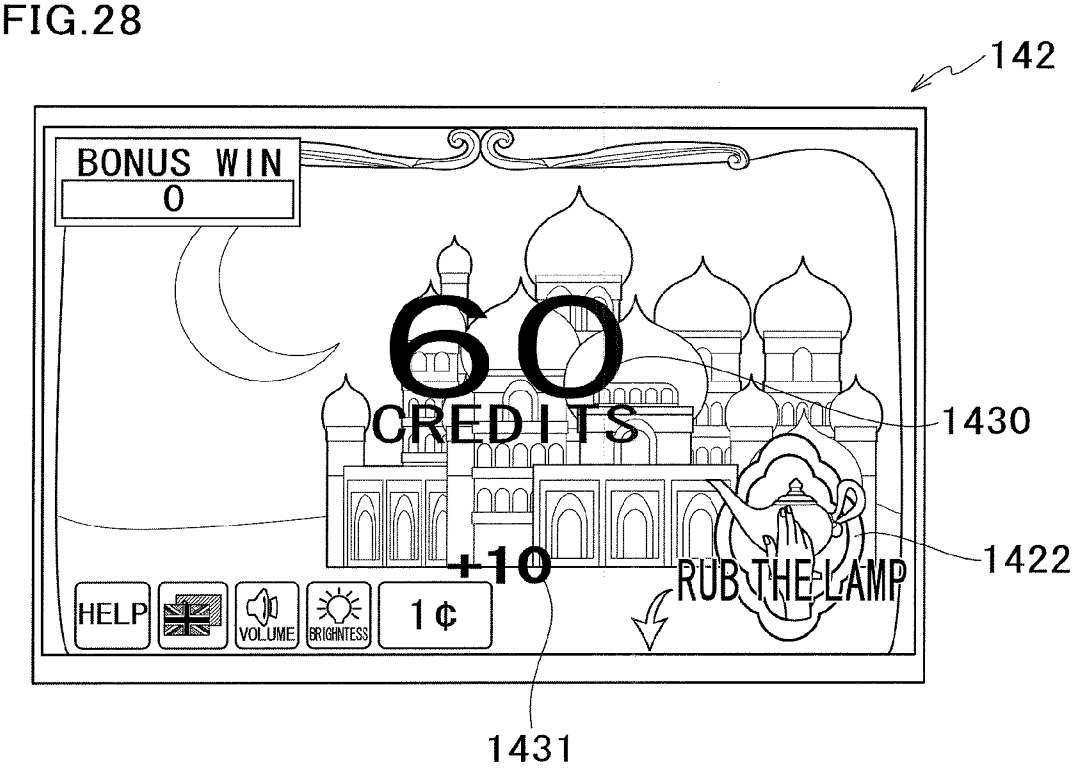
FIG. 28 shows an example of the effect operation.

Thereafter, as shown in FIG. 28, the additional credit display image 1431 remains below the upper image display panel 142 ("teasing") and the gesture requirement image 1422 is displayed in a lower right part. When the gesture of rubbing the lamp body 132 is detected, an effect of vertically moving the additional credit display image 1431 is executed. That is to say, an effect indicating that the credit is incremented is executed when the player keeps rubbing the lamp body 132. As such, sometimes the number indicated by the additional credit display image 1431 moves in accordance with the rubbing of the lamp body 132 by the player, as a teasing effect. Because the additional credit display image 1431 moves up as the player rubs the lamp body 132, the player feels that he/she obtains the credit through his/her own effort.

After the effect shown in FIG. 28 or after a predetermined time (e.g., 5 seconds) elapses if the gesture of rubbing the lamp body 132 is not detected, an effect is executed so that the additional credit display image 1431 having remained moves up and is added to the credit payout display image 1430, or the additional credit display image 1431 is moved downward to go out of view. When the credit payout display image 1430 is added, the effect shown in FIG. 28 is repeated until a subsequent additional credit display image 1431 is moved downward to go out of view.

Figure 29:
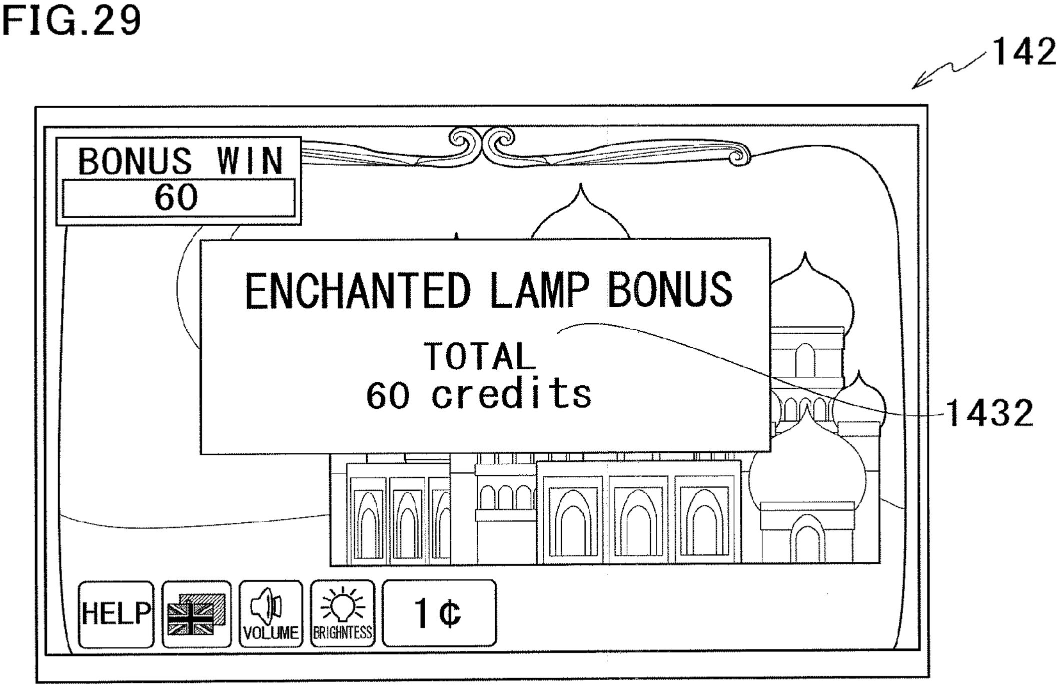
FIG. 29 shows an example of the effect operation.

When the effect that the additional credit display image 1431 is moved downward to go out of view, the value indicated by the credit payout display image 1430 is added to the bonus WIN meter 415 and the credit payout bonus game ends. Thereafter, after the genie appearance effect explained with reference to FIG. 11 through FIG. 15 is executed, the shifting to the expand bonus game or to the multi-type bonus game occurs if one of the games will be executed. When none of the expand bonus game and the multi-type bonus game is executed, after the addition to the bonus WIN meter 415 or after the execution of the genie appearance effect explained with reference to FIG. 11 through FIG. 14, an obtained total credit signboard 1432 shown in FIG. 29 is displayed and the enchanted lamp bonus ends.

(Pickup Bonus Game)

Figure 30:
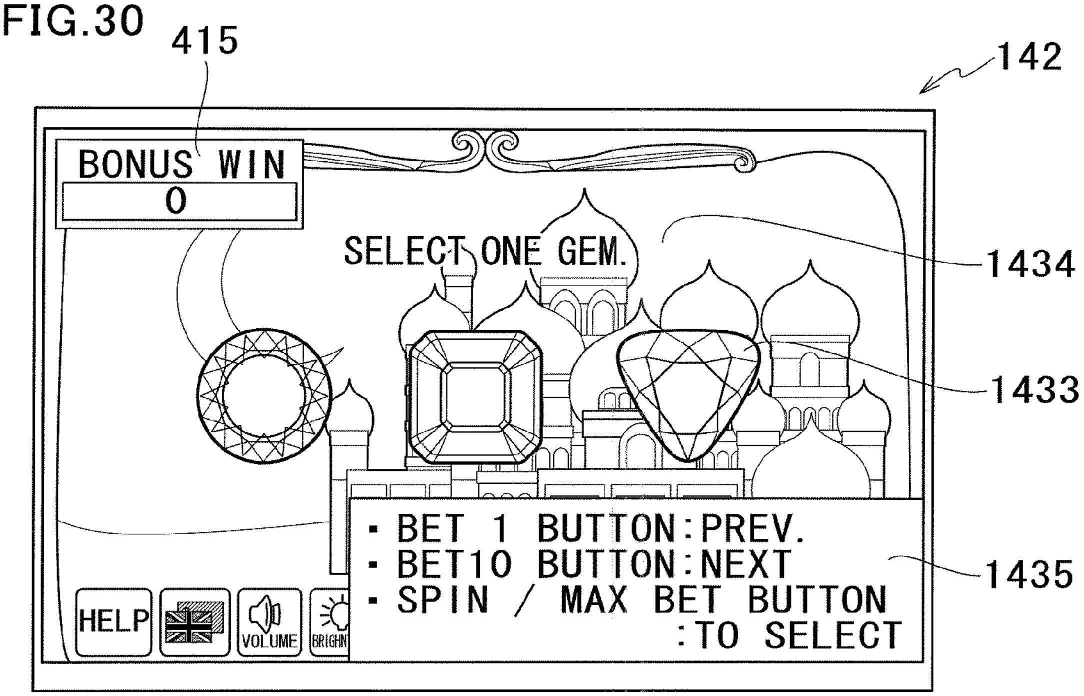
FIG. 30 shows an example of the effect operation.

An effect when the pickup bonus game is executed from the bonus-in will be described. When the pickup bonus game is executed, the effect shown in FIG. 25 shifts to the effect shown in FIG. 30. That is to say, the smoke image 1427 disappears from the upper image display panel 142 and three option images 1433 and a message image 1434 requesting the selection, and a control panel operation navigation image 1435 are displayed.

Figure 31:
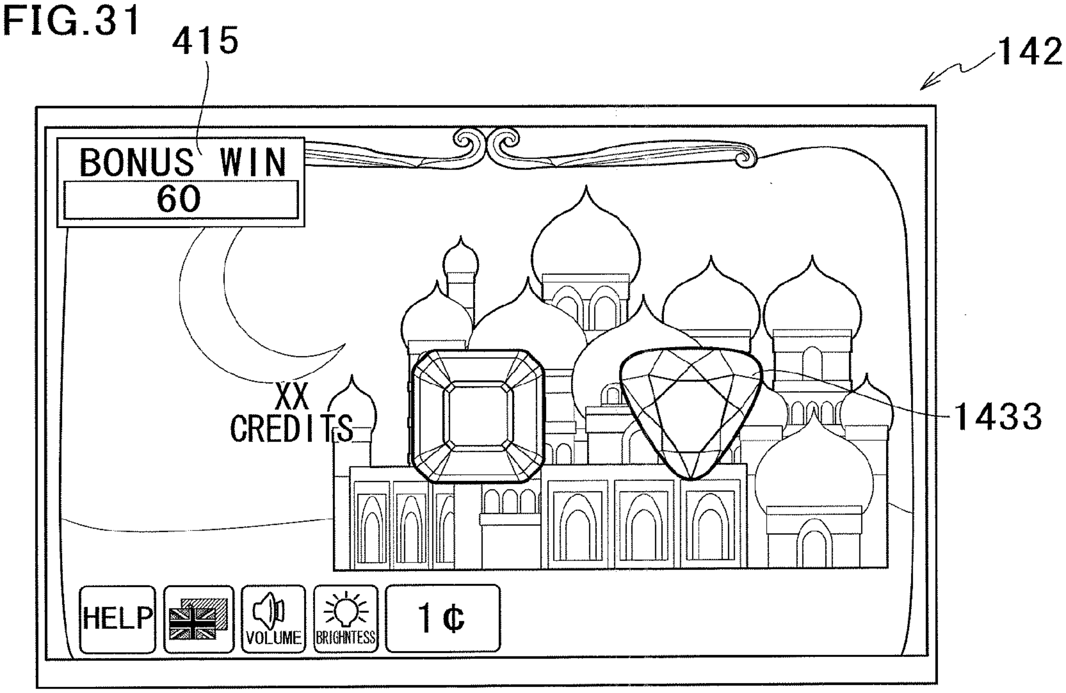
FIG. 31 shows an example of the effect operation.
Figure 32:
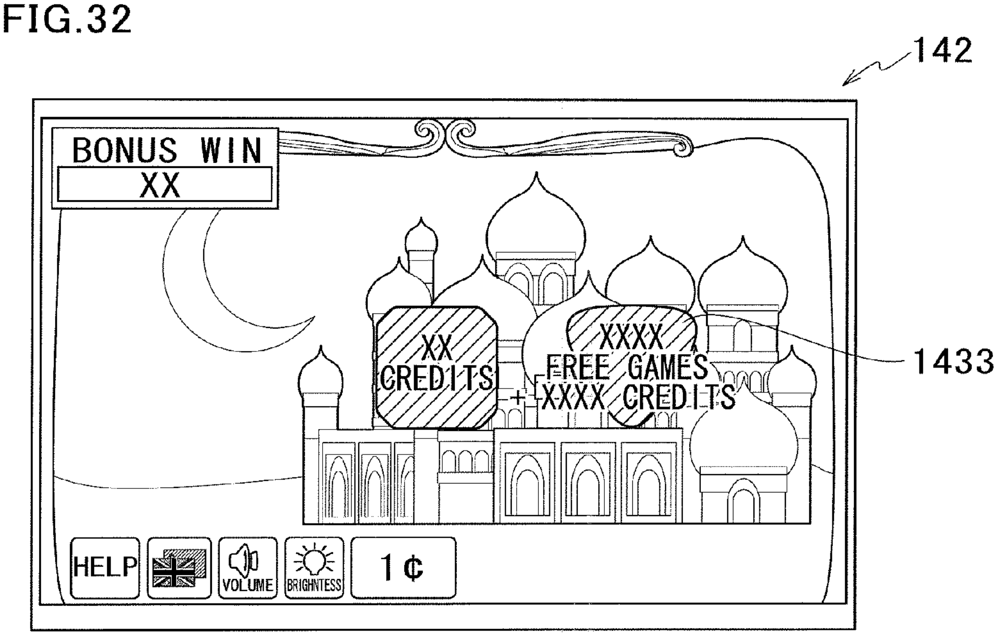
FIG. 32 shows an example of the effect operation.
Figure 33:
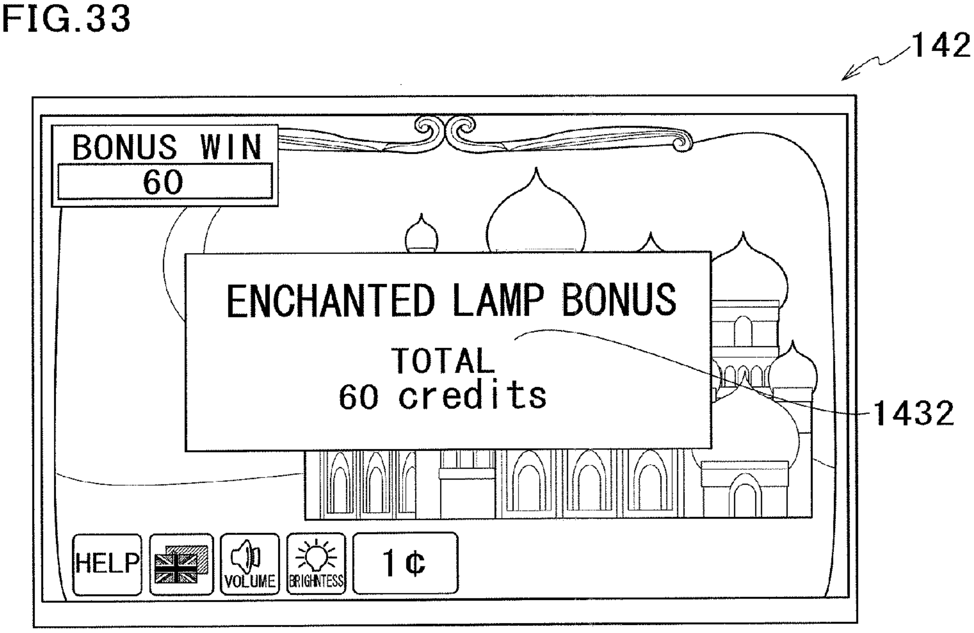
FIG. 33 shows an example of the effect operation.

Thereafter, as shown in FIG. 31, at the same time as one of the three option images 1433 is selected, the message image 1434 and the control panel operation navigation image 1435 disappear and the content of the selected option image 1433 is displayed. Thereafter, as shown in FIG. 32, the obtained credit is added to the bonus WIN meter 415 and the contents of the remaining options are displayed. Thereafter, after the genie appearance effect explained with reference to FIG. 11 through FIG. 15 is executed, the shifting to the expand bonus game or to the multi-type bonus game is conducted if one of these games will be executed. When none of the expand bonus game and the multi-type bonus game is executed, after the addition to the bonus WIN meter 415 or after the execution of the genie appearance effect explained with reference to FIG. 11 through FIG. 14, an obtained total credit signboard 1432 shown in FIG. 33 is displayed and the enchanted lamp bonus ends.

(Multi-Type Bonus Game)

Figure 34:
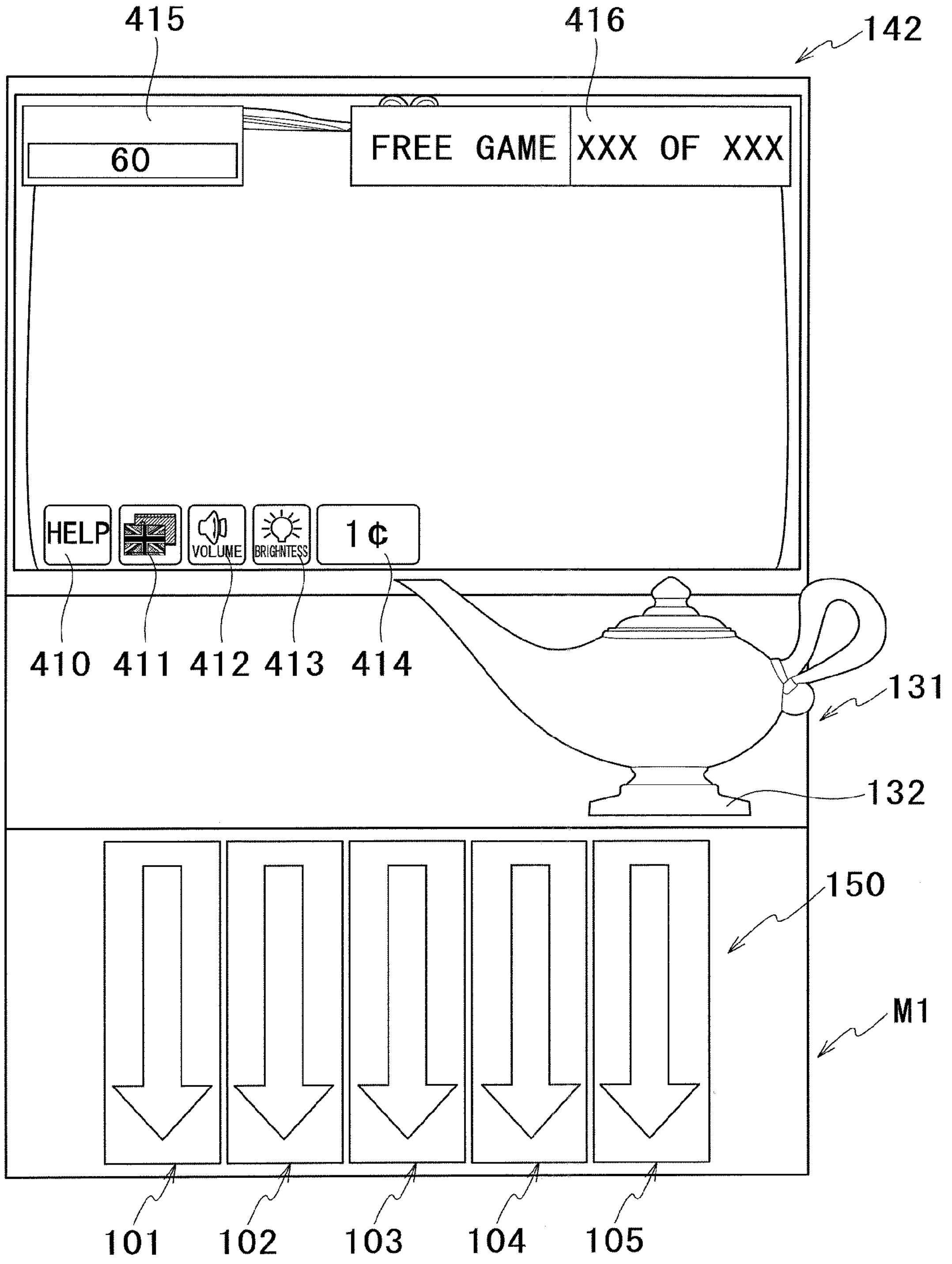
FIG. 34 shows an example of the effect operation.

The multi-type bonus game is a bonus game in which the free game is executable more than once. The following will describe an effect when the multi-type bonus game is executed from the bonus-in or when the multi-type bonus game is executed from the credit payout bonus game or the pickup bonus game. As shown in FIG. 34, as the spinning of the multi-type bonus game starts, a free game counter 416 is displayed on the upper image display panel 142 along with the bonus WIN meter 415. In the case of shifting from the credit payout bonus game or the pickup bonus game, the credit obtained in the credit payout bonus game or the pickup bonus game is displayed on the bonus WIN meter 415.

Figure 35:
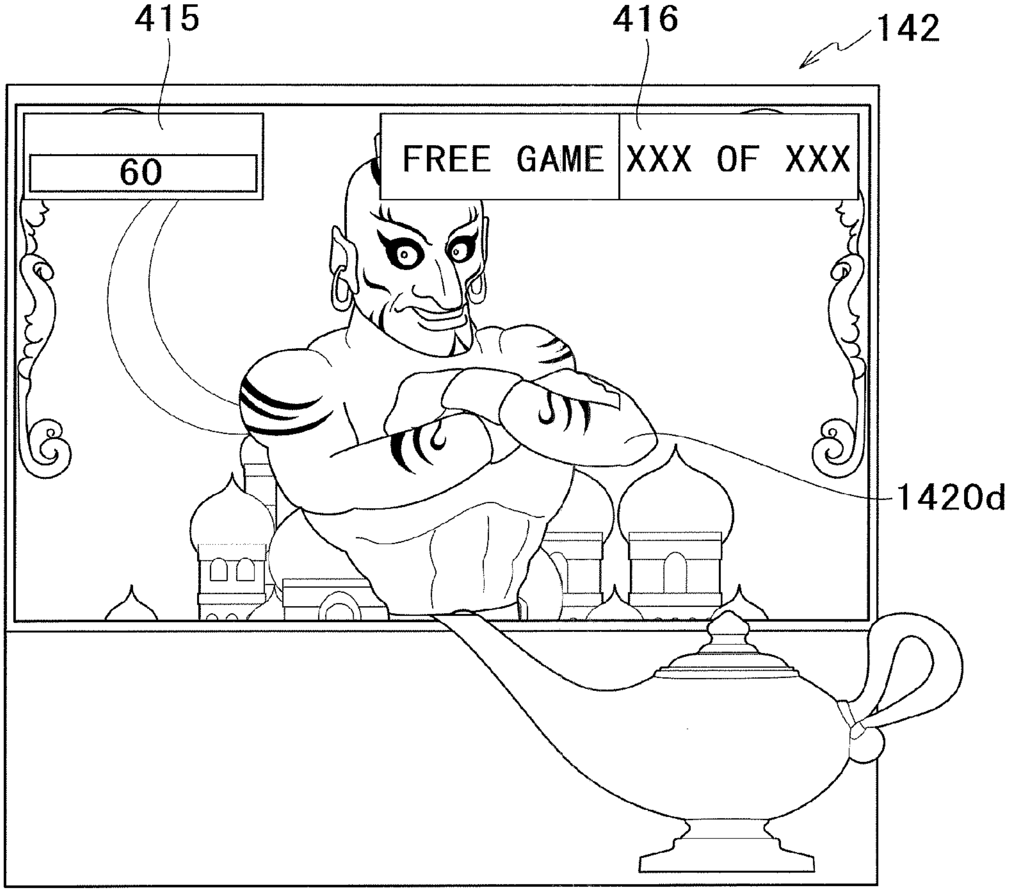
FIG. 35 shows an example of the effect operation.
Figure 36:
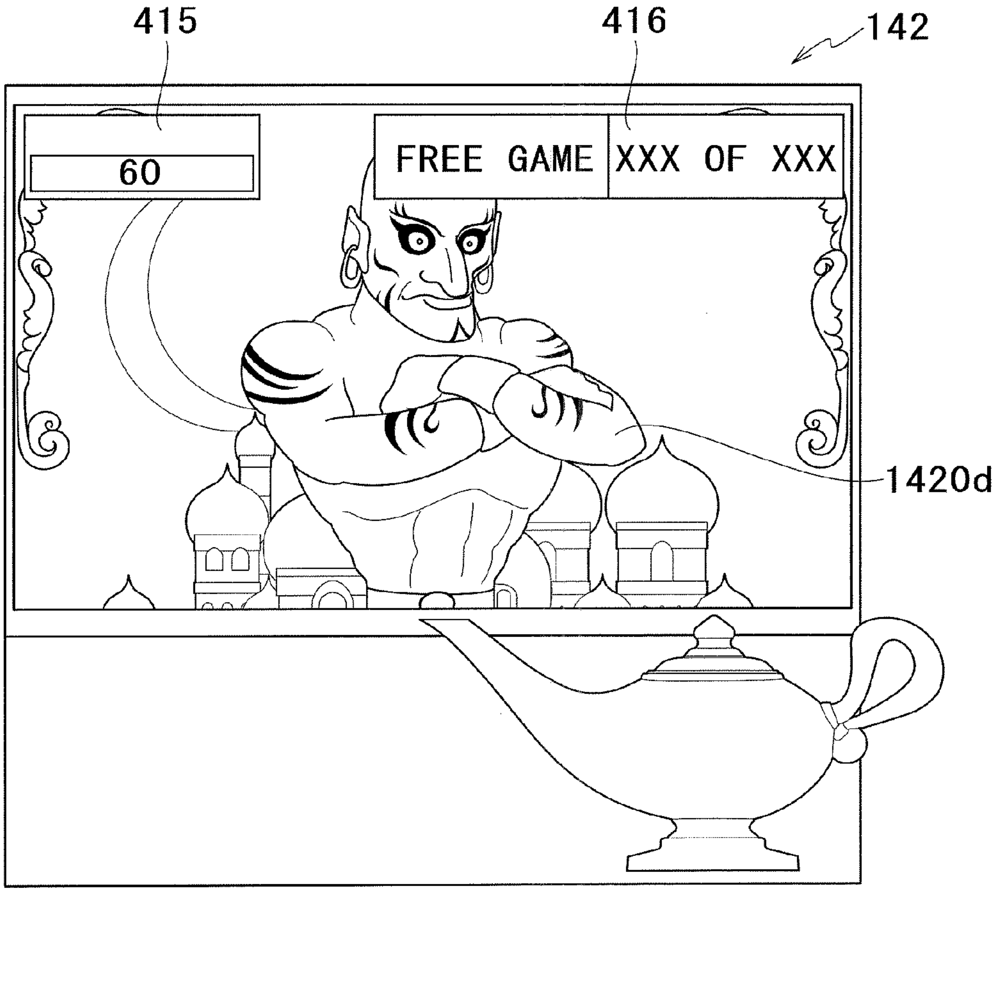
FIG. 36 shows an example of the effect operation.
Figure 37:
FIG. 37 shows an example of the effect operation.

In the multi-type bonus game whether to execute the genie appearance effect explained with reference to FIG. 11 through FIG. 15 is randomly determined each time the free game is executed. When the genie appearance effect is not executed, the free game is normally executed. When the genie appearance effect is executed, the character image 1420*d* is in a different mood in the effect shown in FIG. 15 (see FIG. 35 through FIG. 37). FIG. 35 shows a character image 1420*d* in a good mood. In this case, the probability of the development to a highly-expected benefit is high. FIG. 36 shows a character image 1420*d* in a neutral mood. In this case, the probability of the development to a highly-expected benefit is middle. FIG. 37 shows a character image 1420*d* in a bad mood. In this case, the probability of the development to a highly-expected benefit is low.

Figure 38:
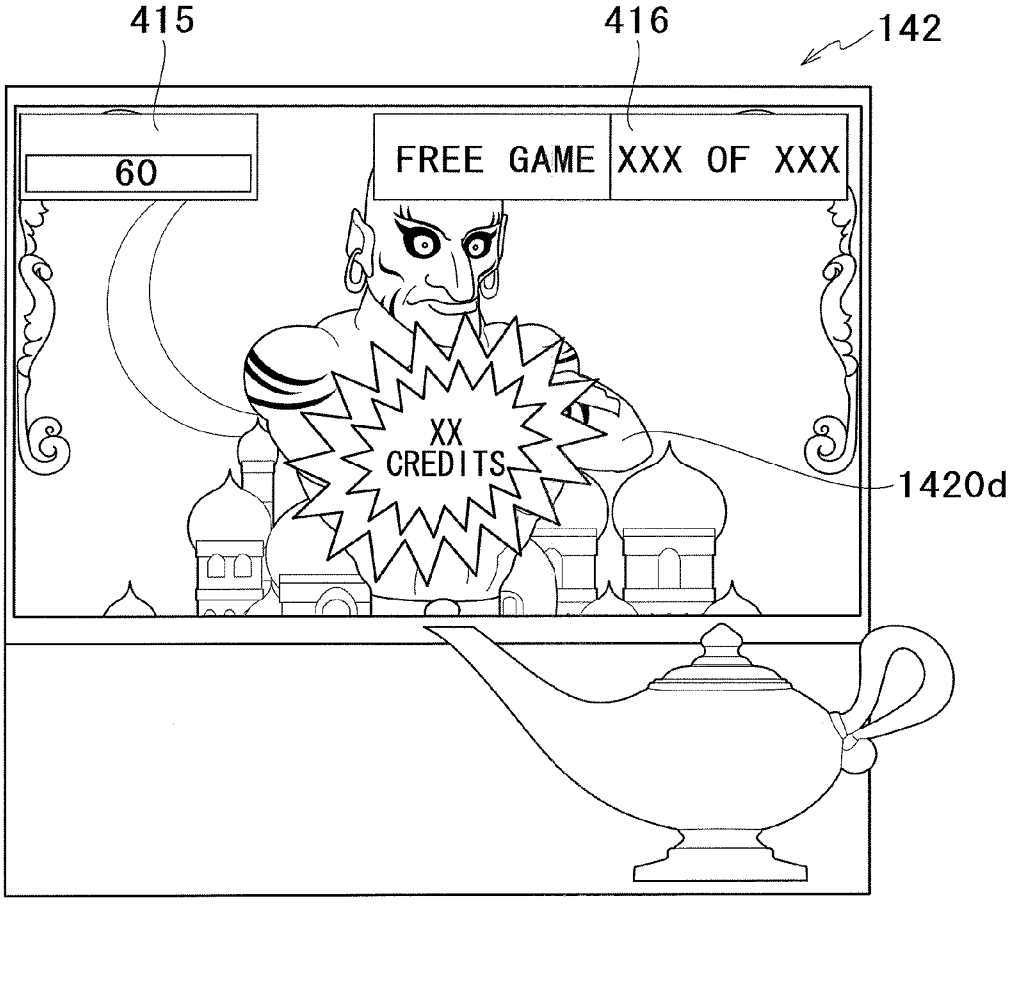
FIG. 38 shows an example of the effect operation.
Figure 39:
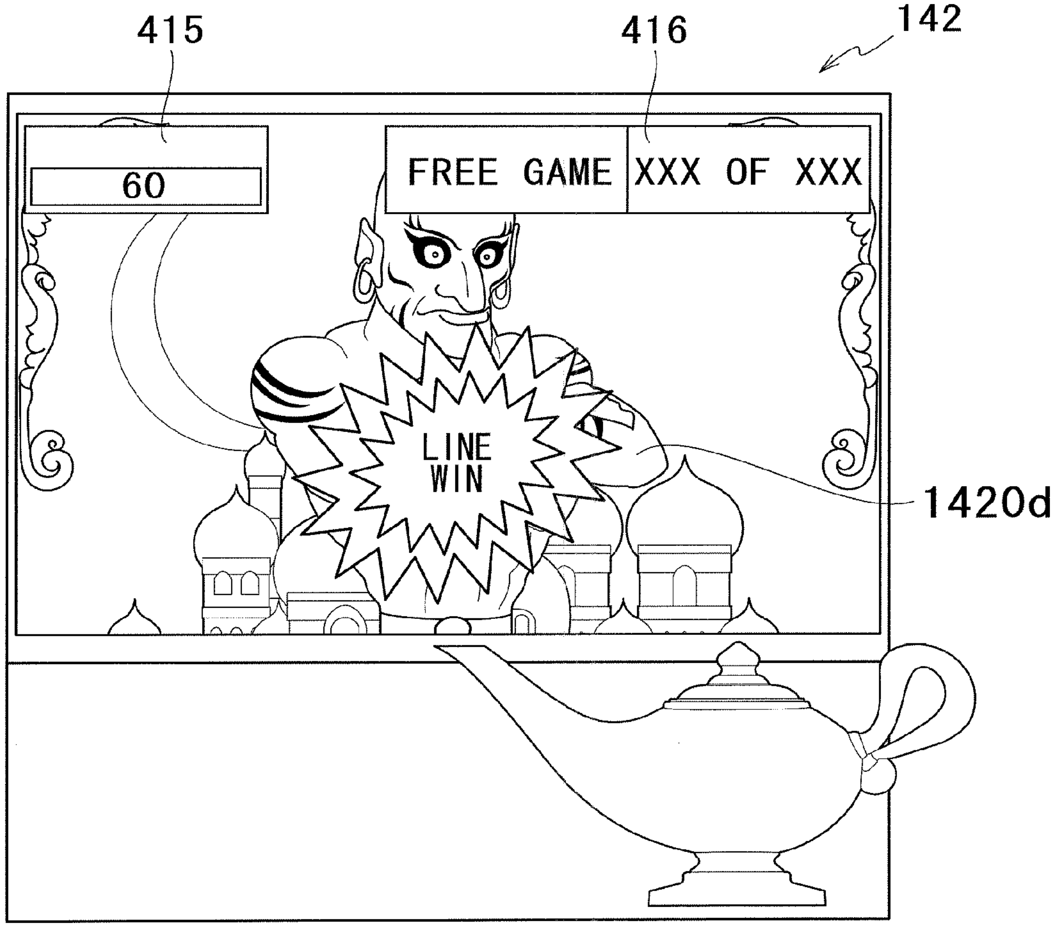
FIG. 39 shows an example of the effect operation.
Figure 40:
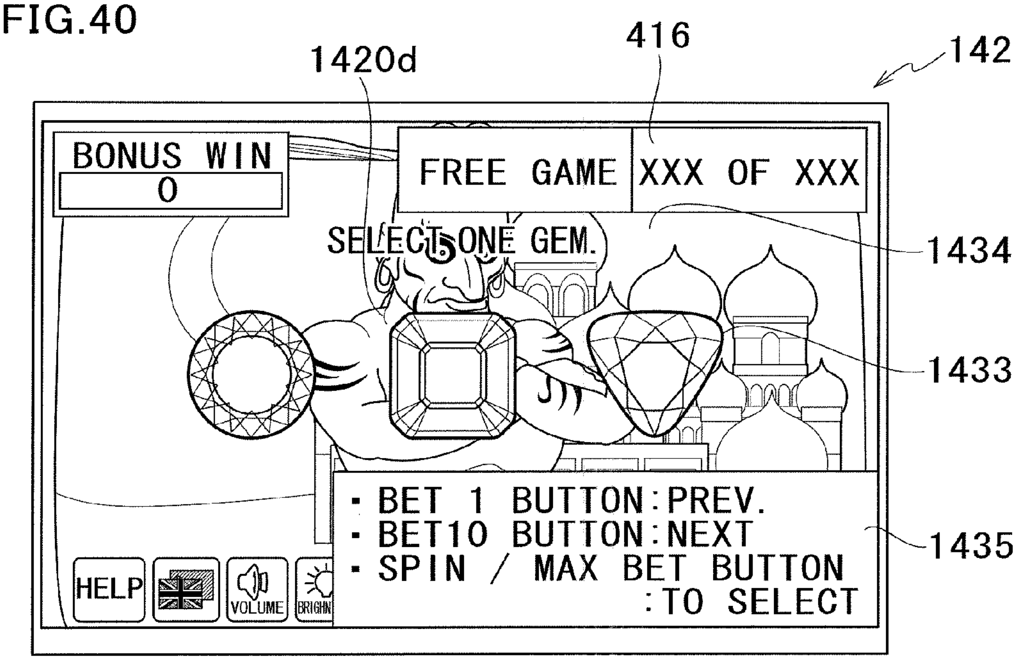
FIG. 40 shows an example of the effect operation.
Figure 41:
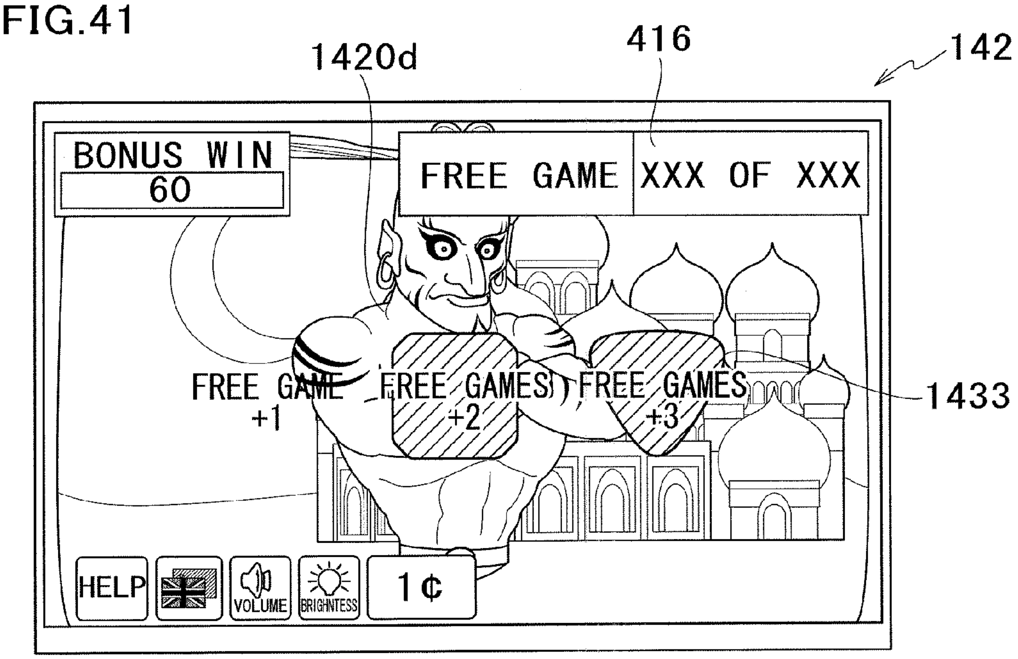
FIG. 41 shows an example of the effect operation.

Thereafter, as shown in FIG. 38, the character image 1420*d* performs a gesture of casting a spell, and awards a benefit to the player. FIG. 38 is an effect when a fixed payout is awarded. After the displayed fixed payout is added to the bonus WIN meter 415, the character image 1420*d* disappears. FIG. 39 is an effect when the payout rate is set. When winning is achieved, an obtained credit is multiplied by a value. The character image 1420*d* disappears when the winning is notified. FIG. 40 shows an effect executed when the number of times of execution of the free game is added. Three option images 1433, a message image 1434 requesting the selection and a control panel operation navigation image 1435 are displayed. Thereafter, as shown in FIG. 41, at the same time as one of the three option images 1433 is selected, the message image 1434 and the control panel operation navigation image 1435 disappear and the content of the selected option image 1433 (i.e., the number of times of execution of the free game to be added) is displayed. The displayed number of times of execution of the free game is added to a free game counter 416.

Figure 42:
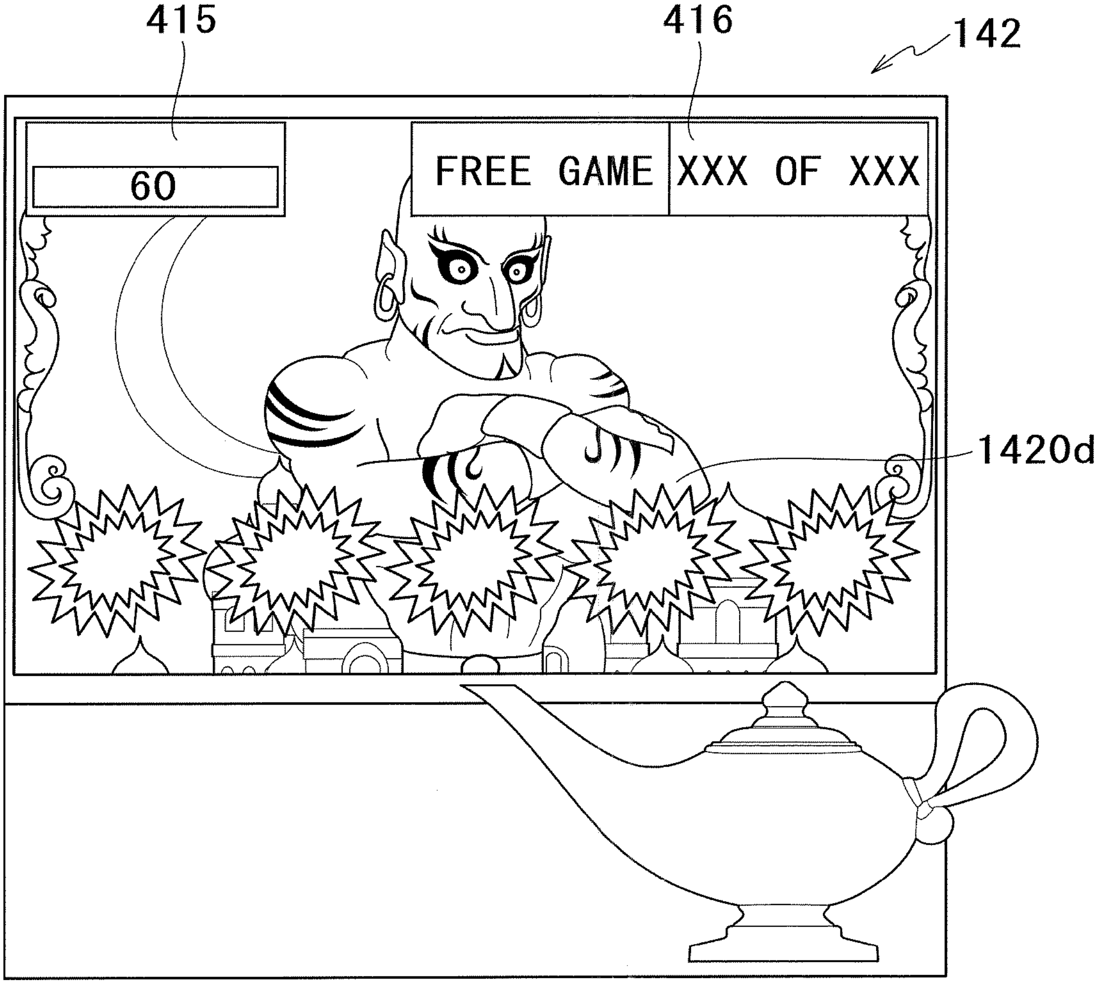
FIG. 42 shows an example of the effect operation.

In FIG. 42, furthermore, after an effect of casting a spell is carried out for the five reels, at least one of the reels is changed to the wild symbol 503*a*. The reel changed to the wild symbol 503*a* stops first, and then all of the remaining reels stop.

When the execution of the free game for the last time ends, notification is performed if winning has been achieved. Thereafter, free game continue challenge is executed. More specifically, the genie appearance effect explained with reference to FIG. 11 through FIG. 14 is executed, and the free game is continued if the character image 1420*d* is displayed as shown in FIG. 15. When the character image 1420*d* is not displayed, an obtained total credit signboard 1432 shown in FIG. 33 is displayed and the enchanted lamp bonus ends.

Figure 43:
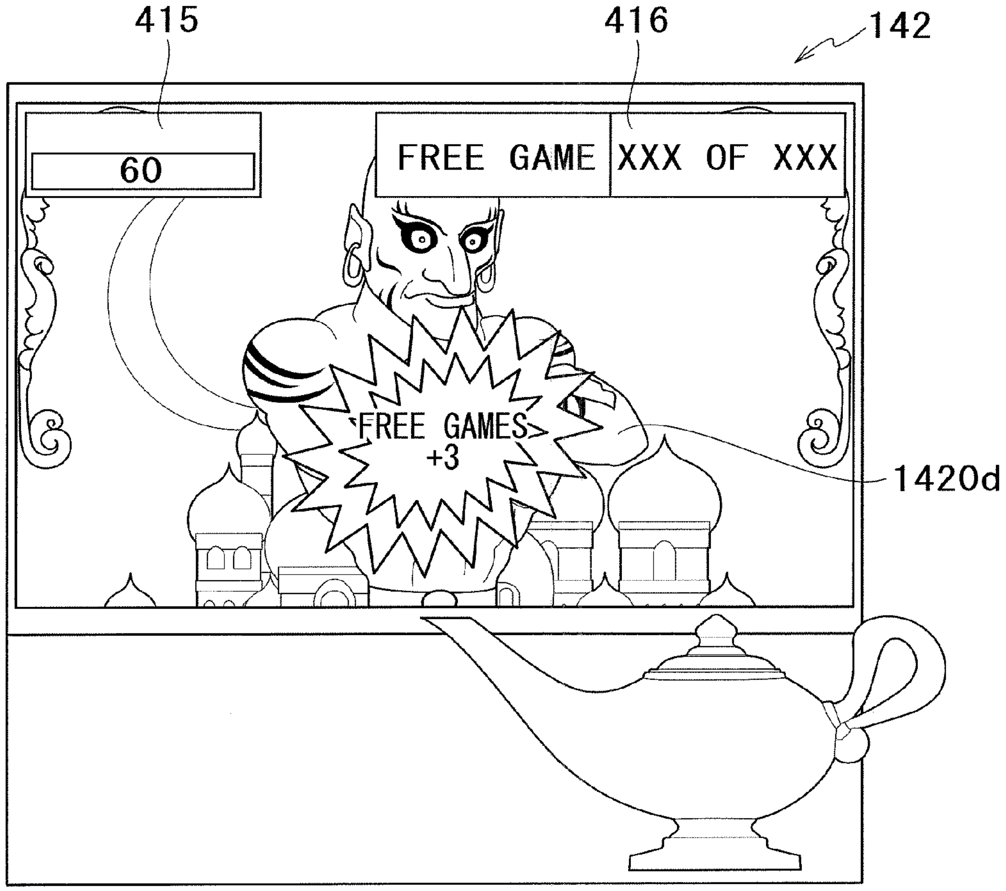
FIG. 43 shows an example of the effect operation.

As shown in FIG. 43, when the character image 1420*d* is displayed, the number of times of execution of the free game to be added to the character image 1420*d* is displayed and this number of times of execution of the free game is added to the free game counter 416 and the free game is continued.

(Expand Bonus Game)

Figure 44:
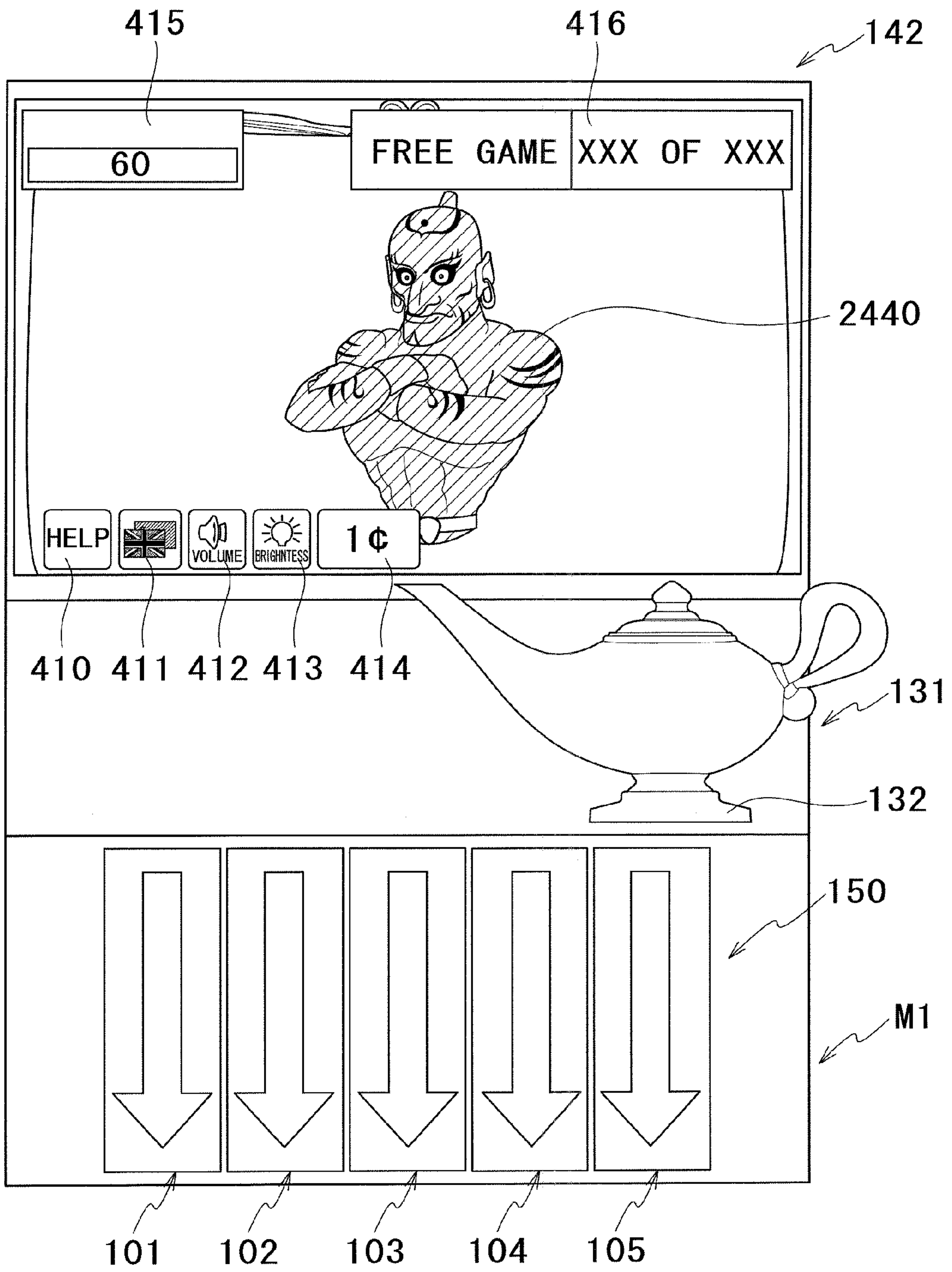
FIG. 44 shows an example of the effect operation.

The expand bonus game is a bonus game in which the free game is executable more than once. The following will describe an effect when the expand bonus game is executed from the bonus-in or when the expand bonus game is executed from the credit payout bonus game or the pickup bonus game. As shown in FIG. 44, as the spinning of the expand bonus game starts, the free game counter 416 is displayed on the upper image display panel 142 along with the bonus WIN meter 415. In the case of shifting from the credit payout bonus game or the pickup bonus game, the credit obtained in the credit payout bonus game or the pickup bonus game is displayed on the bonus WIN meter 415.

Figure 45:
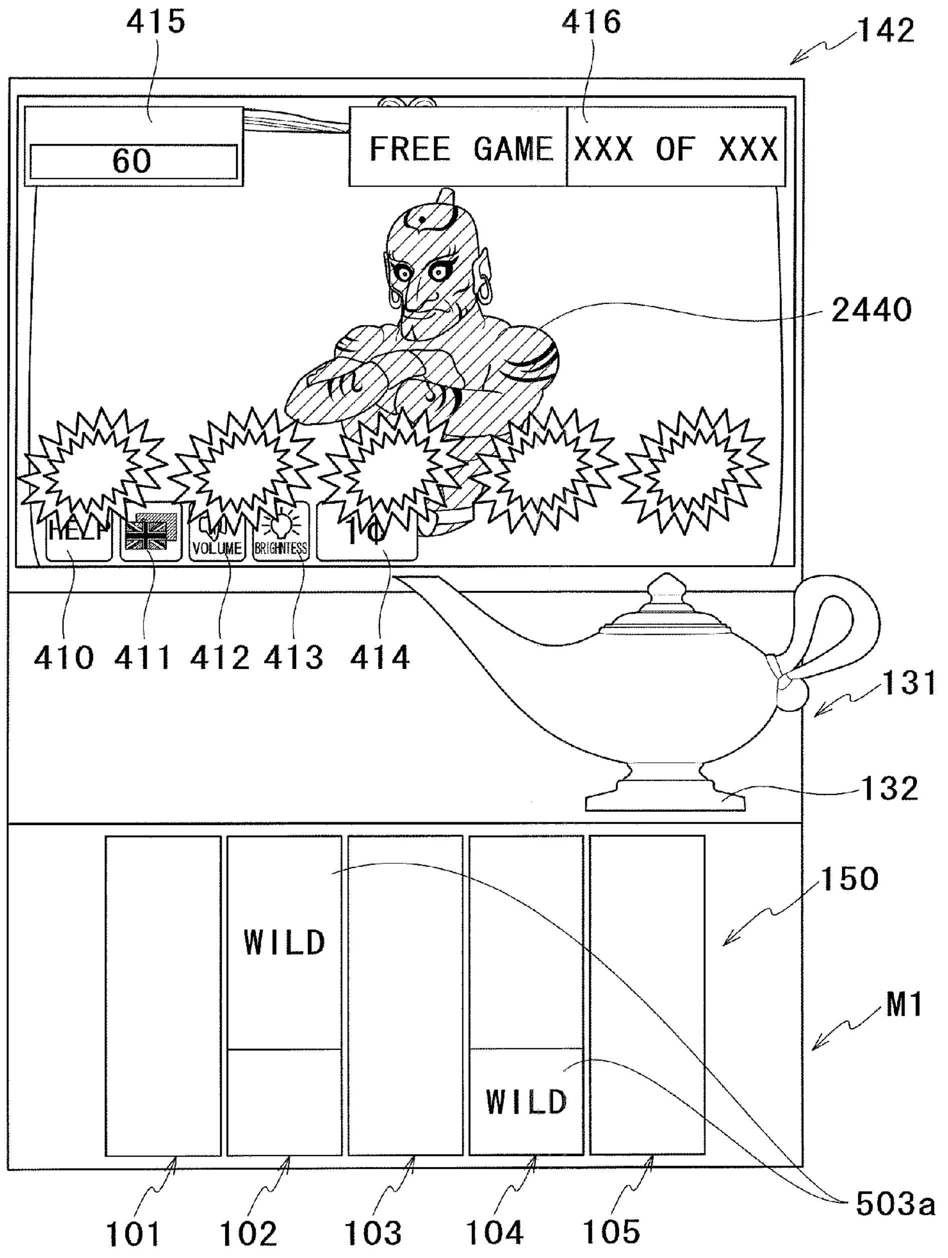
FIG. 45 shows an example of the effect operation.
Figure 46:
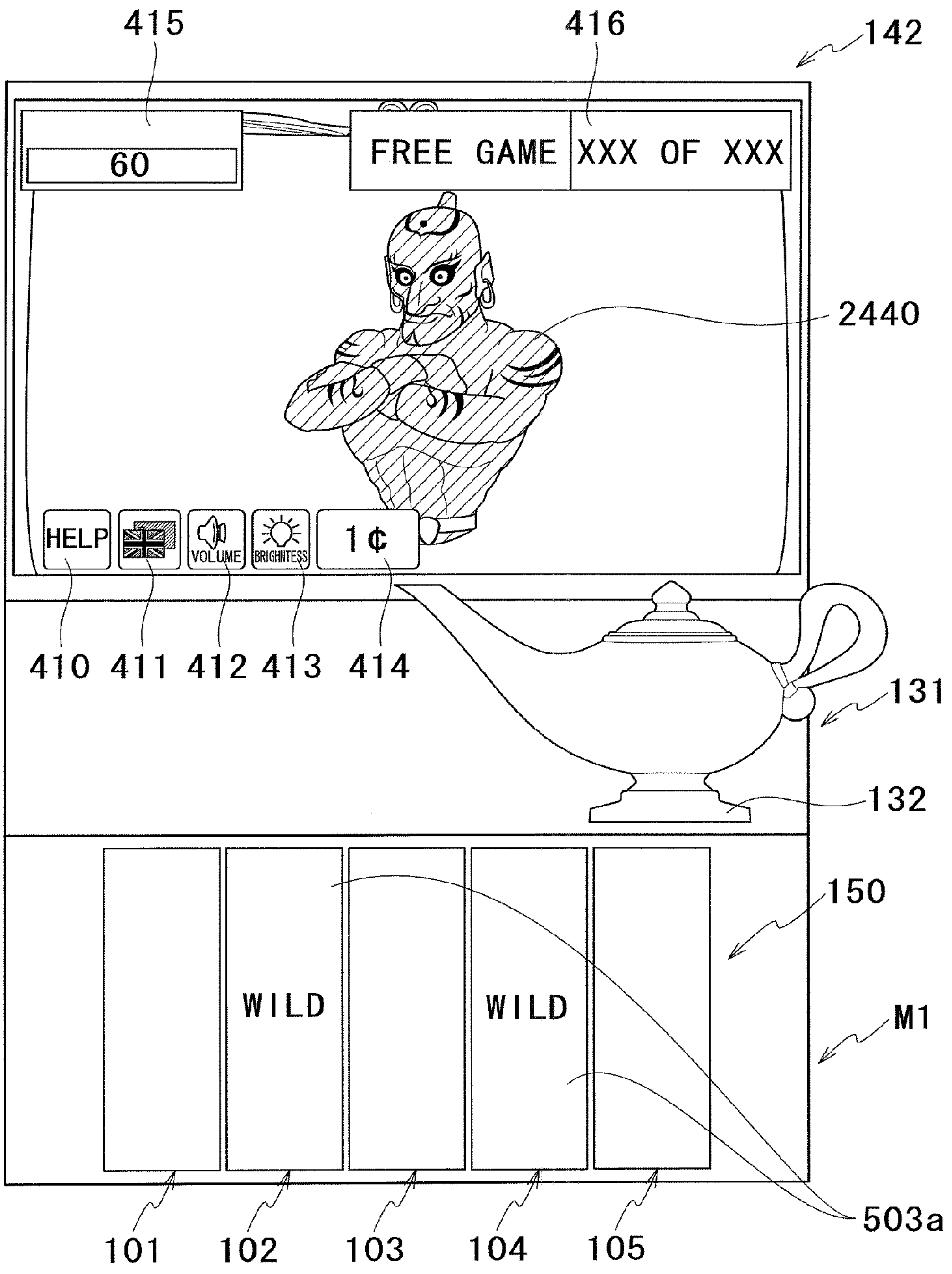
FIG. 46 shows an example of the effect operation.

In the expand bonus game, a character image 1440 different from those in other bonus games is displayed. The character image 1440 is always displayed on the upper image display panel 142. As shown in FIG. 45, after the end of the spinning, an effect image in which the character image 1440 casts a spell to the reel is displayed. The wild symbol 503*a* is a symbol having an area equivalent to three normal symbols 501. When the wild symbol 503*a* is displayed on at least one region of a reel, all cells of that reel becomes the wild symbol 503*a* (see FIG. 46). Thereafter, in which reel all cells become the wild symbol 503*a* is notified.

Figure 47:
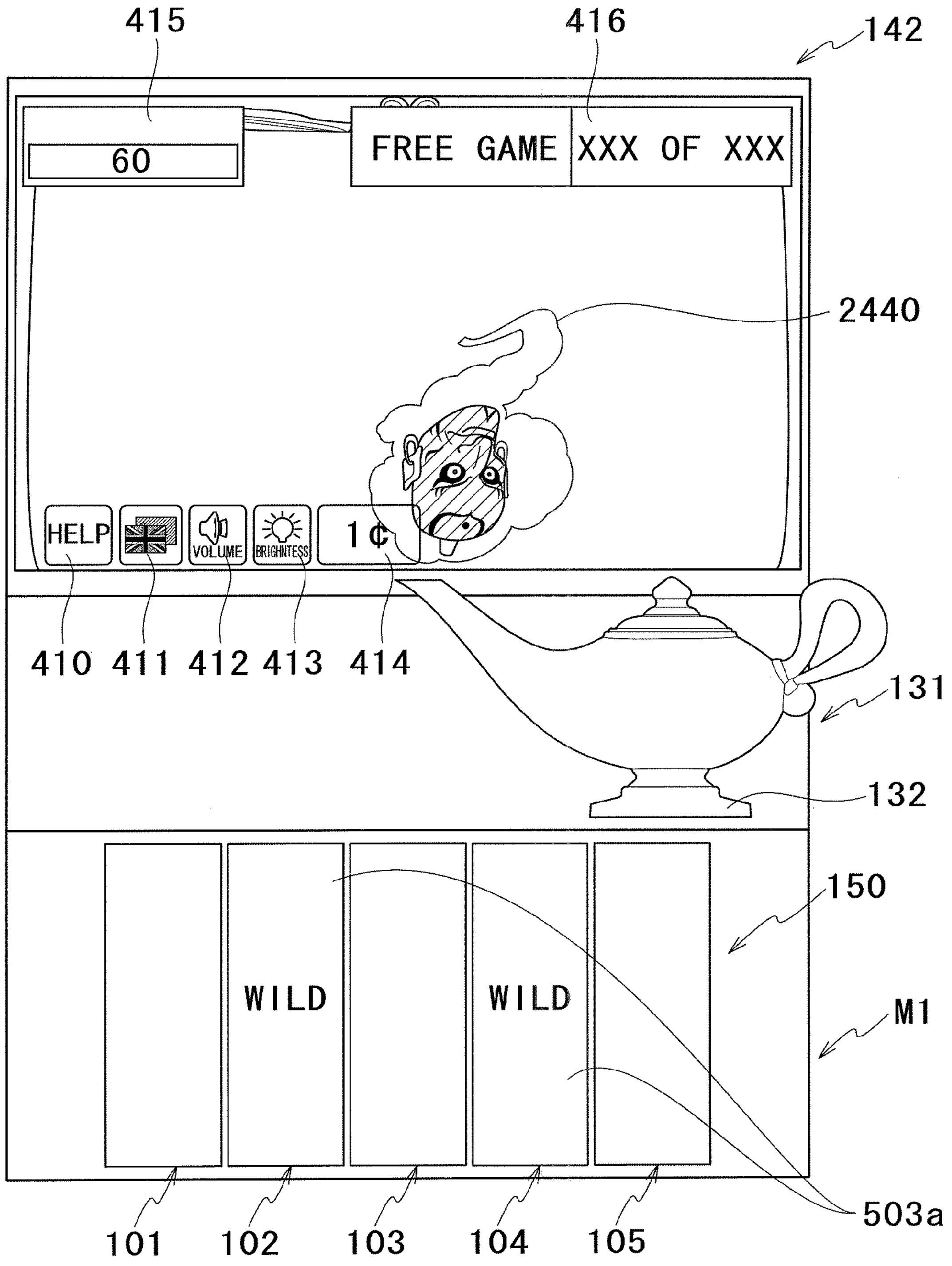
FIG. 47 shows an example of the effect operation.

As shown in FIG. 47, after the execution of the free game is finished, an effect showing that the character image 1440 returns to the lamp body 132 is executed. Thereafter, the free game continue challenge is executed. More specifically, the genie appearance effect explained with reference to FIG. 11 through FIG. 14 is executed, and the free game is continued if the character image 1440 is displayed as shown in FIG. 15. When the character image 1440 is not displayed, an obtained total credit signboard 1432 shown in FIG. 33 is displayed and the enchanted lamp bonus ends.

As shown in FIG. 43, when the character image 1440 is displayed, the number of times of execution of the free game to be added to the character image 1440 is displayed and the number of times of execution of the free game is added to the free game counter 416 and the free game is continued.

(Expand Feature)

Figure 48:
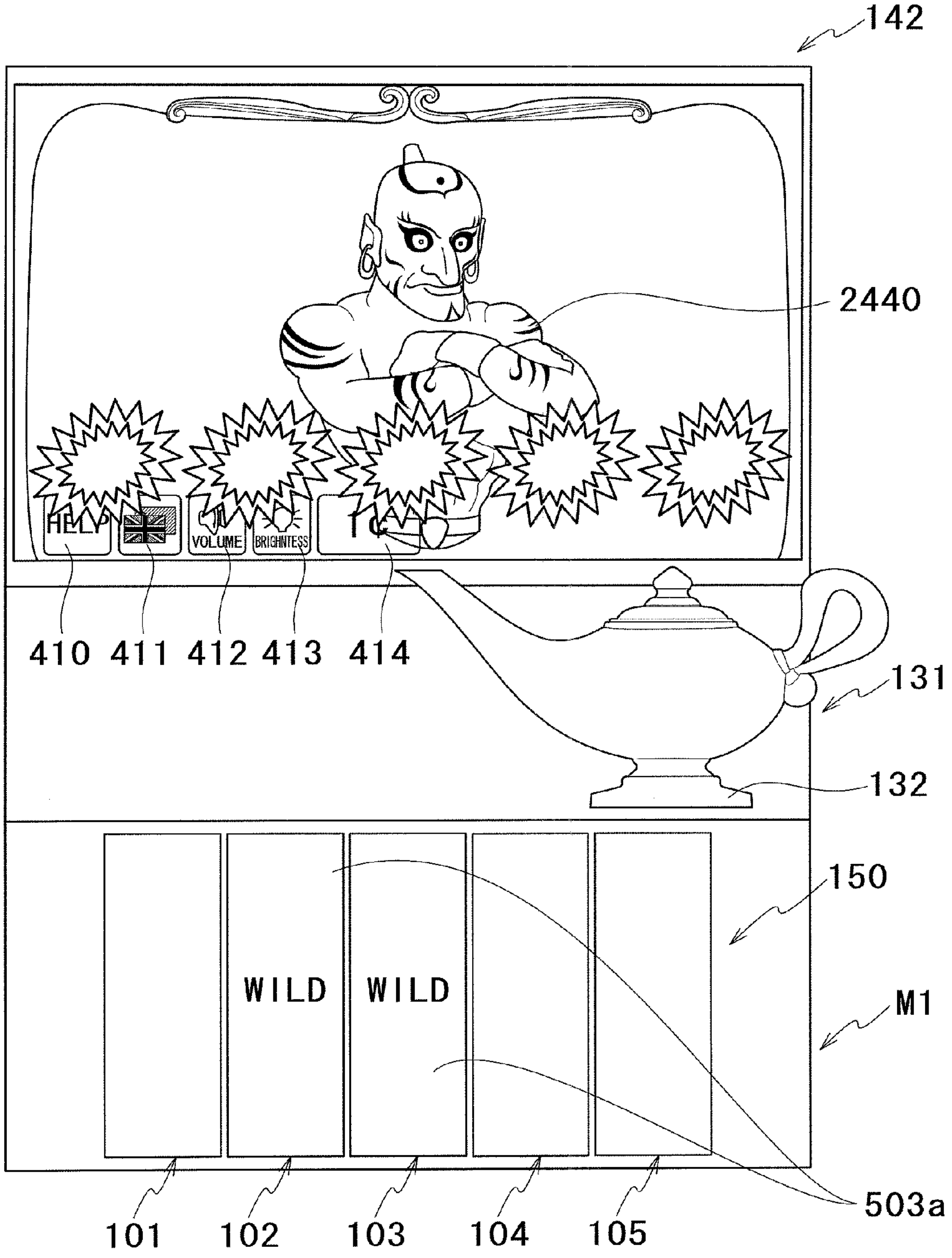
FIG. 48 illustrates betted lines.

After the re-spinning feature game is executed consecutively twice, the expand feature is executed if the bonus-in is not established. As shown in FIG. 48, when the expand feature starts, the character image 2441 is displayed and the wild symbols 503*a* stop at all cells of at least one of the reels 101 to 105. All of the wild symbol 503*a* stops at the center positions (i.e., the cells at the centers of the respective reels). As a result, the entirety of the reel becomes WILD. The bet per line in the expand feature is identical with the value set in the re-spinning feature game of the first time. That is to say, the value set in the normal game in which the re-spin symbol 503*c* is rearranged is used. On which one of the reels 101 to 105 the wild symbol 503*a* stops is randomly determined. The symbols of the reel in which the wild symbol 503*a* does not stop are randomly determined based on a data table. The data table used in the expand feature is arranged so that the probabilities of the stop of the trigger symbol 503*b* and the re-spin symbol 503*c* are zero, and hence neither the bonus-in nor the re-spinning feature game is obtainable.

(Function Flow of Gaming Machine 300: Slot Machine)

The gaming machine 300 arranged as above includes, as shown in FIG. 2, slot machines 10 and an external controller 621 (center controller 200) connected to the slot machines 10 to be able to communicate therewith. The external controller 621 is able to communicate with the slot machines 10 provided in a hall.

Each slot machine 10 includes a BET button 601, a spin button 602, and a display 614 (such as a lower image display panel 141 shown in FIG. 1), and further includes a game controller 100 configured to control these units. The BET button 601 and the spin button 602 are kinds of input devices. The slot machine 10 further includes a transceiver unit 652 that makes it possible to perform data communication with the external controller 621.

The BET button 601 above has a function of receiving a bet amount input by the player. The spin button 602 has a function of receiving an instruction to start a game such as a normal game in response to an operation by the player, i.e., a start operation. The display 614 has a function of displaying still image information such as various symbols 501, numbers, and characters and moving image information such as effect movies. Furthermore, the display 614 has a touch panel 69 as an input device, and has a function of receiving various instructions input by a pressing operation by the player. The display 614 has a symbol display region 614*a*, an image display region 614*b*, and a common game display region 614*c*. The symbol display region 614*a* displays a reel screen including the symbols 501 shown in FIG. 1. The image display region 614*b* displays various types of effect image information (including the common indication effect and the individual indication effect) executed during a game, by means of moving images and still images. The common game display region 614*c* displays a common game.

Although in the present embodiment the symbol display region 614*a*, the image display region 614*b*, and the lower image display panel 141 are provided on the same screen, the disclosure is not limited to this arrangement. The common game display region 614*c* may be formed together with the symbol display region 614*a* and the image display region 614*b*, or may appear as a substitute only when a common game is run.

The game controller 100 includes a coin insertion/start-check unit 603, a normal game running unit 605, a bonus game start determining unit 606, a bonus game execution unit 607, a random number sampling unit 615, a symbol determining unit 612, an effect-use random number sampling unit 616, an effect determining unit 613, a speaker unit 617, a lamp unit 618, a winning determining unit 619, a payout unit 620, and an indication effect unit 651.

The normal game running unit 605 has a function of running a normal game when an operation of the BET button 601 is made. The bonus game start determining unit 606 determines whether to run a bonus game, based on a combination of the symbols 501 rearranged in the normal game. That is to say, the bonus game start determining unit 606 has a function of determining that a bonus game is obtained when a trigger symbol 503*b* or the like is rearranged in a predetermined condition, and shifting the process to the bonus game execution unit 607 so that a bonus game is run from the next unit game.

It is noted that "unit game" is a series of operations from the start of the receiving of a bet to a state in which an award can be established. For example, a unit game in the normal game includes a single bet time for receiving a bet, a single game time of rearranging stopped symbols 501, and a single payout time of a payout process of awarding a payout. A unit game in the normal game is termed unit normal game.

The bonus game execution unit 607 has a function of running a bonus game in which a free game is repeated only by an operation of the spin button 602.

The symbol determining unit 612 has functions of: determining symbols 501 to be rearranged with reference to a random number from the random number sampling unit 615; rearranging the determined symbols 501 on the symbol display region 614*a* of the display 614; outputting rearrangement information of the symbols 501 to the winning determining unit 619 and the indication effect unit 651; adding an increased specific symbol 503 to the symbols 501 that are used for symbol determination; replacing at least one of the symbols 501 used for the symbol determination with at least a part of the increased specific symbol; and outputting an effect specifying signal to the effect-use random number sampling unit 616 based on the state of the rearrangement of the symbols 501.

The effect-use random number sampling unit 616 has a function of sampling an effect random number when receiving an effect instruction signal from the symbol determining unit 612 and a function of outputting the effect random number to the effect determining unit 613. The effect determining unit 613 has a function of determining the effect content by using the effect random number, an effect of outputting the image information of the determined effect content to the image display region 614*b* of the display 614, and a function of outputting audio/light information of the determined effect content to the speaker unit 617 and the lamp unit 618.

The winning determining unit 619 has a function of determining the presence of winning when obtaining rearrangement information of the symbols 501, which is a display state of rearrangement on the display 614, a function of calculating a payout amount based on the winning combination when it is determined that winning is achieved, and a function of outputting a payout signal to the payout unit 620 based on the payout amount. The payout unit 620 has a function of paying out a gaming value to the player, in the form of a coin, a medal, a credit, or the like. Furthermore, the payout unit 620 has a function of adding credit data corresponding to the credit to be paid out to credit data stored in an IC card inserted into the later-described PTS terminal 700.

The indication effect unit 651 has a function of executing an indication effect indicating the winning of the second bonus game during the execution of the first bonus game (when the last selection game is executed). Furthermore, the indication effect unit 651 may have functions of executing various indication effects at predetermined probabilities and executing an indication effect of indicating the winning of various bonus games and the types of the bonus games. Furthermore, the indication effect unit 651 may have a function of randomly determining whether to execute various indication effects based on rearrangement information of the symbols 501 when the rearrangement information is obtained and a function of executing various indication effects by using the display 614 and output mechanisms of the top box 12 such as the speaker unit 617 and the lamp unit 618.

In addition to the above, the game controller 100 includes a storage unit 661 that stores various types of bet amount data. The storage unit 661 stores data in a rewritable manner, e.g., a hard disc device and a memory.

In addition to the above, the game controller 100 has a common game running unit 653. The common game running unit 653 has functions of: outputting bet amount information based on a bet amount bet on a normal game to the external controller 621 in each unit base game; executing a common game in response to a game start command from the external controller 621; and receiving a bet input through the BET button 601 for a bet amount corresponding to bet amount data for a common game, which is stored in the storage unit 661 and is bettable on a common game.

In addition to the above, the game controller 100 is connected to the PTS terminal 700. The PTS terminal 700 is a unit in which an LCD, a microphone, a human detection camera, etc. are integrated, and has, for example, a function of executing an effect for a game by mutual communications with the game controller 100. In particular, the PTS terminal 700 has a card slot to which an IC card can be inserted. With this, the player is able to insert a IC card into the card slot and use the credits stored in the IC card in the slot machine 10.

In addition to the above, when receiving credit data from the PTS terminal 700, the game controller 100 updates the credit display on the display 614. Furthermore, the game controller 100 outputs settled credit data too the PTS terminal 700 when the credits on a game are settled.

Furthermore, the PTS terminal 700 of each of the slot machines 10 constituting the gaming machine 300 is connected to the management server 800 to be able to communicate each other, and centrally manages the download of images, IC cards and credits.

(Function Flow of Gaming Machine 300: External Controller)

Figure 3:
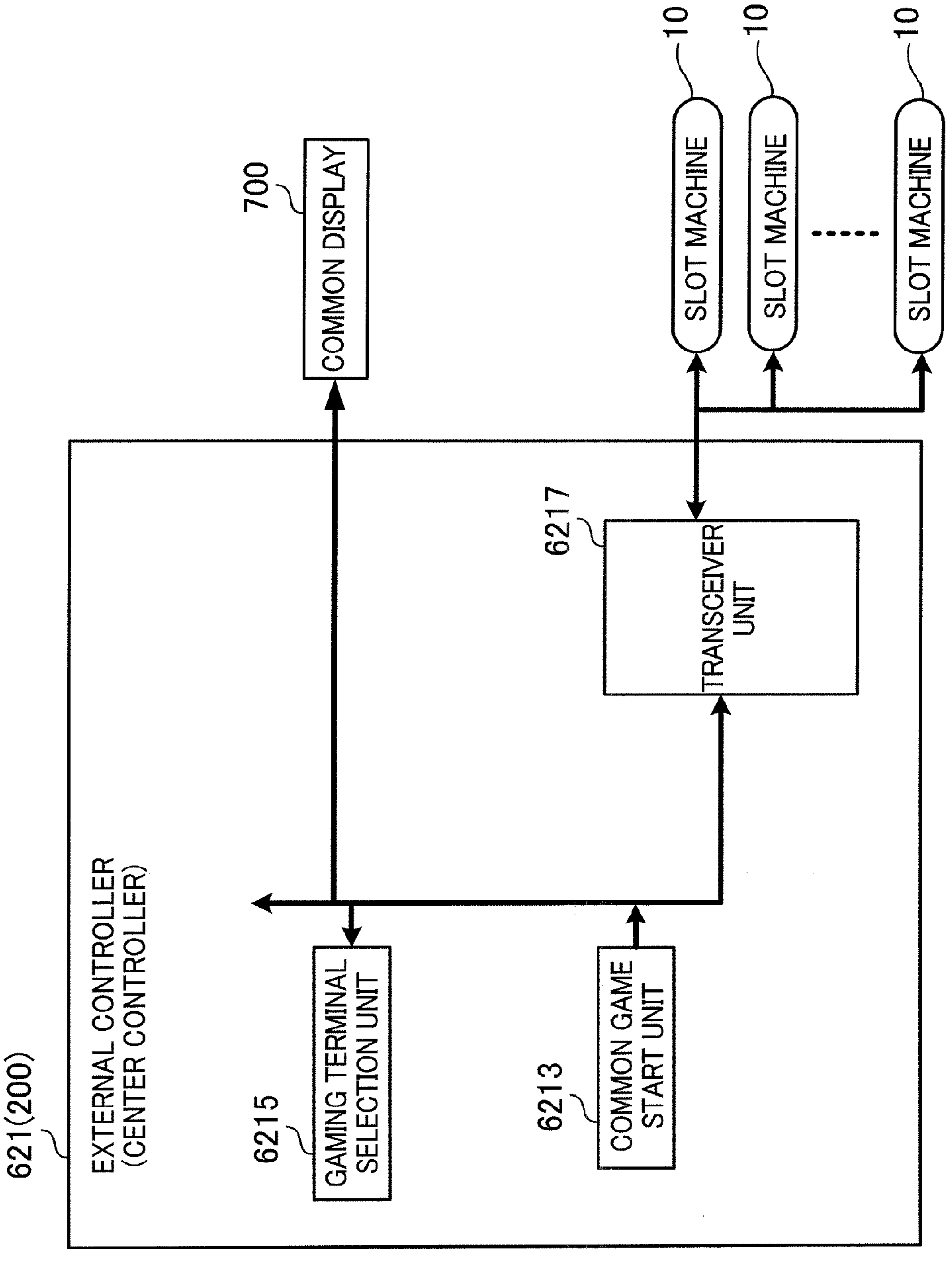
FIG. 3 illustrates the function flow of the gaming machine.

The slot machine 10 arranged as above is, as shown in FIG. 3, connected to the external controller 621. The external controller 621 has a function of remotely operating and monitoring the operation state of each slot machine 10 and processes such as changes in game setting values. Furthermore, the external controller 621 has a function of determining a common game start condition for each gaming terminal which is the slot machine 10, and executing a common game at a plurality of slot machines 10 when a determination result at any gaming terminal satisfies the common game start condition.

More specifically, the external controller 621 includes a common game start unit 6213, a gaming terminal selection unit 6215, and a transceiver unit 6217. The common game start unit 6213 has functions of: determining whether the common game start condition is established based on the accumulated bet amount information sent from the slot machine 10 in each unit base game; outputting a game start command to a plurality of slot machines 10; and displaying on the common display device 622 states until the common game start condition is established.

The determination as to whether the common game start condition is established is based on the accumulated bet amount information or based on all accumulated values that increase as the unit base game is repeated. For example, the number of times of running the base game and the game time of the base game may be used as the accumulated values.

In addition to the above, the common game start unit 6213 has a function of outputting a game start command to the slot machine 10 in which an accumulated value that increases as a result of the repetition of the base game satisfies a game running condition. With this, because the right to participate in the common game is not awarded to a slot machine 10 in which the accumulated value is lower than the minimum setting value, the common game start unit 6213 motivates the player to actively repeat the base game.

In addition to the above, the common game start unit 6213 has a function of monitoring a non-input time in which no start operation is performed, and outputting the game start command to the slot machines 10 except to the slot machine 10 in which the non-input time is equal to or longer than a timeout time. With this, the common game start unit 6213 is able to determine that no player is at a slot machine 10 where the base game has not been played at least for the timeout time, and able to avoid the execution of the common game at such a slot machine 10.

The gaming terminal selection unit 6215 has a function of selecting a specific slot machine 10 from the slot machines 10 and outputting a common game start command signal to that specific slot machine 10. The common game start command signal provides the specific slot machine 10 with the right to start the common game. The transceiver unit 6217 has a function of exchanging data with the slot machines 10.

(Operations of Gaming Machine 300)

The operations of the gaming machine 300 having the functional blocks above will be described. While in the present embodiment the "gaming terminal" shown in the flowcharts indicates a slot machine 10 executing a slot game, the disclosure is not limited to this arrangement.

(Operations of Slot Machine 10)

A slot machine 10 which is a gaming terminal executes terminal-side processes (A1) to (A7). More specifically, to begin with, a base game process (e.g., normal game) is executed (A1). That is, a series of operations below are executed.

(Coin-Insertion/Start-Check)

First, the slot machine 10 checks whether or not a BET button 601 has been pressed by a player, and subsequently checks whether or not a spin button 602 has been pressed by the player.

(Symbol Determination)

Next, when a spin button unit 602 has been pressed by the player, the slot machine 10 extracts a random number for symbol determination, and determines symbols 501 to be displayed for the player at the time of stopping the scroll of the symbol array, for respective video reels displayed on a display unit 614.

(Symbol Display)

Then the slot machine 10 starts the scroll of the symbol array of each video reel, and stops the scroll so that the determined symbols 501 are displayed for the player.

(Winning Determination)

Subsequently, as the rotation of the symbol array of each video reel is stopped, the slot machine 10 determines whether the combination of the symbols 501 displayed for the player is a combination related to winning.

(Payout)

When the combination of the symbols 501 displayed for the player is a combination related to winning, the slot machine 10 offers, to the player, benefit according to the combination.

For example, when a combination of symbols 501 related to a payout of coins has been displayed, the slot machine 10 pays out coins of the number corresponding to the combination of symbols 501 to the player.

Subsequently, whether to win a bonus combination is determined. When winning the bonus combination, a bonus game process is executed. On the other hand, when not winning the bonus combination, the normal game is run again. During a period in which the base game including such a normal game and bonus game is being run, execution state information indicating the start and end of the unit game such as the normal game and the bet amount on the unit game is transmitted to the external controller 621. With this, the external controller 621 centrally manages the execution state information of each slot machine 10.

(Operation of External Controller 621)

When the slot machines 10 operate as above, the external controller 621 executes the following center-side processes in synchronization with the slot machines 10.

To begin with, the external controller 621 receives the execution state information from each slot machine 10 and obtains the execution state of the base game. Thereafter, based on the number of the repetition of the base game, the accumulated bet amount, or the like, whether the common game start condition is established at any slot machine 10 is determined. When the common game start condition is not established, the acquisition of the execution state of the base game at each slot machine 10 is continued.

In the meanwhile, when the common game start condition is established, the game start command is simultaneously output to the slot machines 10 that satisfy the game running condition. Thereafter, a specific slot machine 10 is selected from the slot machines 10 satisfying the game running condition, and a common game start right instruction is output to the specific slot machine 10 (B4).

Thereafter, the external controller 621 waits for the common game start command to be supplied from the specific slot machine 10. Upon receiving the common game start command, the result of the common game is determined as a game result. The game result is, for example, win, lose, or draw. When the game result is not draw, at least a part of a draw game result is skipped among a series of temporarily-stored game results, and the remaining game results are serially output to the slot machines 10, as game result information.

Thereafter, based on the winning or losing game result, whether to win in the common game is determined. When lost, the execution state of the base game at each slot machine 10 is newly obtained. On the other hand, when won, a payout amount is calculated based on the bet amount bet on the common game at each slot machine 10, and the payout amount is sent to each slot machine 10 as payout information.

(Mechanical Structure of Slot Machine)

Figure 49:
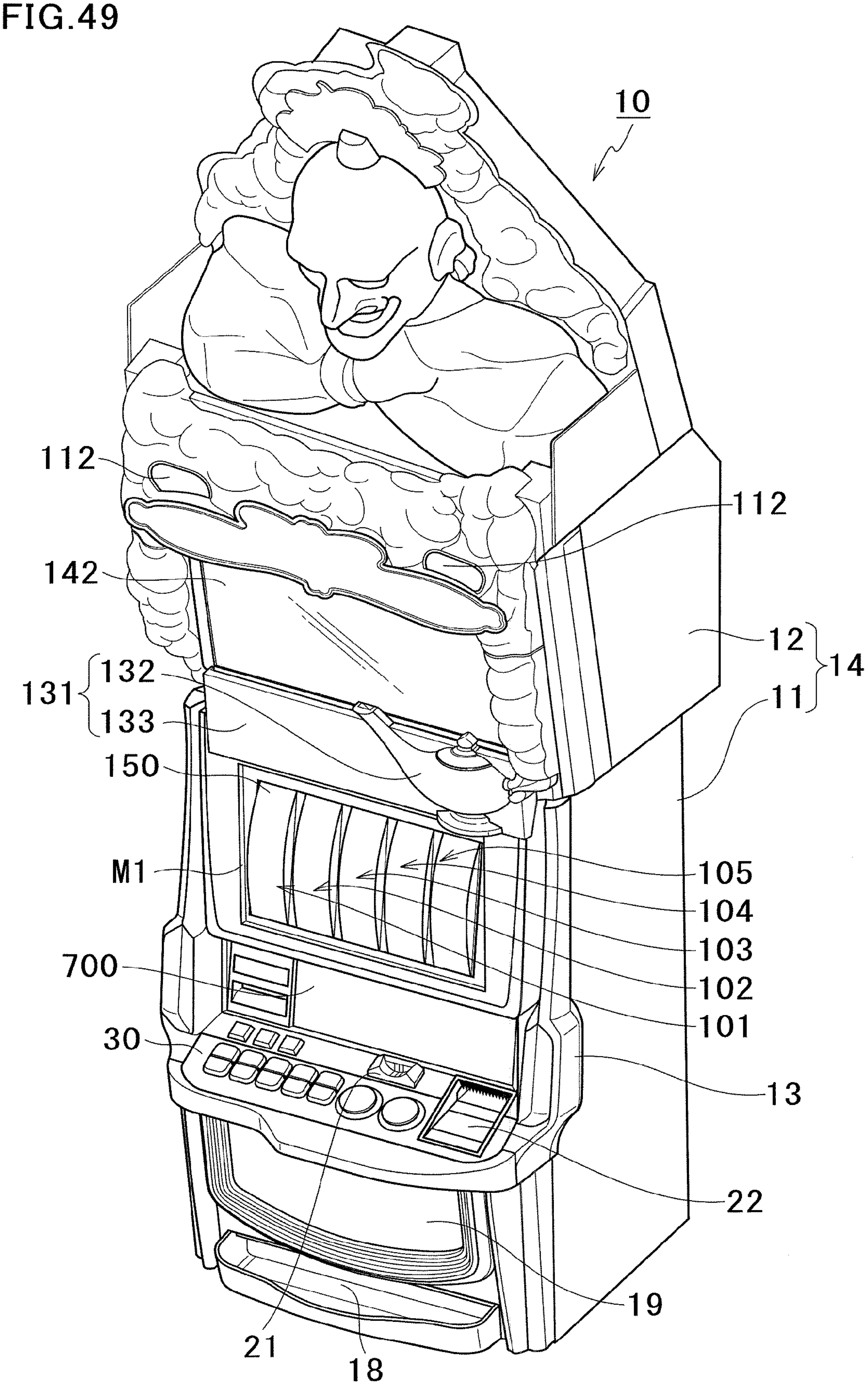
FIG. 49 is a slot machine perspective view of the gaming machine.

Referring to FIG. 49, the overall structure of the slot machine 10 will be described.

A coin, a bill, or electrically valuable information corresponding to these is used as a gaming value in the slot machine 10. In the present embodiment, in particular, credit-related data such as money data stored in an IC card is used.

The slot machine 10 includes a cabinet 11, a top box 12 installed on the upper side of the cabinet 11, and a main door 13 provided at the front surface of the cabinet 11.

On the main door 13, a symbol display device termed lower image display panel 141 is provided. The symbol display device is constituted by a mechanical reel unit M1. A display window 150 of the reel unit M1 is constituted by 15 display blocks 28 forming a matrix of 5 columns and 3 rows. The three display blocks 28 of each column form reels 101 to 105. On each of the reels 101 to 105, three display blocks 28 move downward with changes in speed, so that the symbols 501 on the display blocks 28 are vertically rotated (variably displayed) and then stopped, in other words, the symbols are rearranged.

While the present embodiment the slot machines 10 are so-called mechanical slot machines, some of the reels 101 to 105 in the slot machines 10 of the present invention may be replaced by so-called video reels.

Below the lower image display panel 141 is provided a control panel 30. The control panel 30 is provided with buttons, a coin entry 21 for inserting coins into the cabinet 11, and a bill entry 22. Details of the control panel 30 will be given later.

On the lower front surface of the main door 13, i.e., below the control panel 30, a belly glass 19 on which a character of the slot machine 10 or the like is depicted are provided. Between the lower image display panel 141 and the control panel 30, the PTS terminal 700 is attached. In the PTS terminal 700, devices having a microphone function, a camera function, a speaker function, a display function and the like form a single unit. More specifically, the PTS terminal 700 includes an LCD, a human detection camera, a microphone, a bass reflex speaker, or the like. The human detection camera makes it possible to detect the presence of a player by the camera function. The microphone is used for the player's participation in a game by voice and the authentication of a player by voice recognition. The speaker produces sound effects in games and outputs notification sound when an IC card is left inserted. Furthermore, the speaker outputs notification sound when an inserted IC card is not authenticated.

In addition to the above, the PTS terminal is provided with an LED and a card insertion slot. The LED emits light with plural colors to notify the remaining number of IC cards in a card stacker. The card insertion slot has a mechanism of allowing IC cards to be inserted and ejected. The IC card has a display region. The IC card is completely inside the machine when the player is playing games, and is ejected to expose the display region at the time of the settlement. This allows the player to recognize the credit-related data such as updated money data. Alternatively, the IC card may be arranged to expose the display region not to be completely inserted, even when the player is playing games. This allows the player to always recognize the update of the credits during games.

When it is confirmed by the human detection camera that no player is present at the time of the settlement of the credits, the IC card is drawn into and stored in the card stacker. With this arrangement, the IC card is not left inserted for a long time, even if the player left the machine without taking the IC card after recognizing that the remaining credits on the display region are small.

On the upper part of the slot machine 10 is provided the top box 12. The top box 12 is provided with the above-described lamp body unit 131.

In addition to the above, the top box 12 is provided with speakers 112 and 112 (output mechanisms) that are symmetrical crosswise.

(Configuration of Circuit in Gaming Machine 300)

Figure 50:
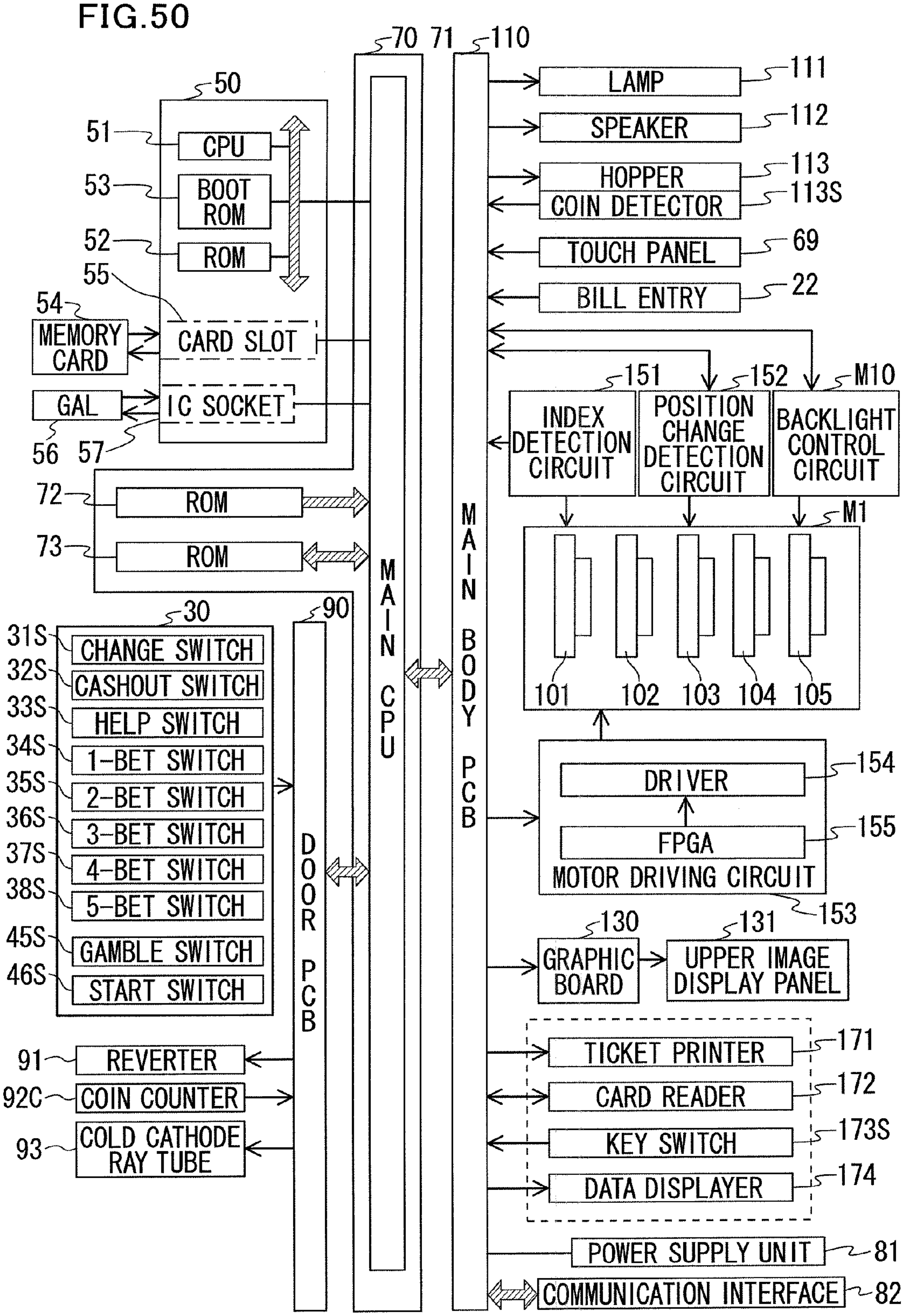
FIG. 50 is an electric block diagram of the gaming machine.

Now, referring to FIG. 50, the configuration of a circuit in the gaming machine 300 will be described.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a random determination program, tables, and a program for producing effects by images and sounds.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 300 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (falsification check program) for authenticating the game program and the game system program. The pre-authentication program is a program for authenticating the aforementioned authentication program. The authentication program and the pre-authentication program are written along a procedure (authentication procedure) for proving that the program to be the subject has not been falsified.

The motherboard 70 is provided with a main CPU 71, a ROM 72, a RAM 73, and a communication interface 82.

The ROM 72 includes a memory device such as a flash memory, and stores a program such as BIOS (Basic Input/Output System) to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data used for the operation of the main CPU 71 and programs. For example, when the processing of loading the aforementioned game program, game system program or authentication program is conducted, the RAM 73 can store the program. The RAM 73 is provided with working areas used for operations in execution of these programs. Examples of the areas include: an area that stores the number of games, the number of bets, the number of payouts, the number of credits and the like; and an area that stores symbols randomly determined.

The communication interface 82 is for communicating with the external controller 621 such as a server, through the communication line. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a change switch 31S, a cashout switch 32S, a help switch 33S, a 1-BET switch 34S, a 2-BET switch 35S, a 3-BET switch 36S, a 4-BET switch 37S, a 5-BET switch 37S, a gamble switch 45S, and a start switch 46S to correspond to the respective buttons described above. Each of the switches outputs a signal to the main CPU 71 upon detection of press of the button corresponding thereto by the player.

The coin counter 92C checks if the material, the shape or the like of an inserted coin is proper, and outputs a signal to the main CPU 71 when a proper coin is detected. An improper coin is ejected through the coin payout exit 18.

The reverter 91 operates based on a control signal output from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face side of the upper image display panel 142, and lights up based on a control signal output from the main CPU 71.

The body PCB 110 is connected with the lamp 111, the speaker 112, the hopper 113, the coin detecting portion 113S, the touch panel 69, the bill entry 22, the graphic board 130, the index detection circuit 151, the position change detection circuit 152, the backlight control circuit M10, the motor driving circuit 153, the ticket printer 171, the card reader 172, the key switch 173S, and the data displayer 174. The index detection circuit 151, the position change detection circuit 152, the motor driving circuit 153, and the backlight control circuit M10 are connected with the reel unit M1.

The lamp 111 is turned on in response to a control signal output from the main CPU 71. The speakers 112 output BGM sound or the like in accordance with a control signal output from the main CPU 71.

The hopper 113 operates based on a control signal output from the main CPU 71, and pays out coins of the specified number of payouts from the coin payout exit to a coin payout exit 18. The coin detecting portion 113S outputs a signal to the main CPU 71 upon detection of coins paid out by the hopper 113.

The touch panel 69 detects a position touched by a finger or the like of the player, and outputs a position signal corresponding to the detected position to the main CPU 71. When receiving a genuine bill, the bill entry 22 outputs a signal indicating the amount of the bill to the main CPU 71.

The graphic board 130 controls display of images conducted by the lower image display panel 141, based on a control signal output from the main CPU 71. The graphic board 130 is provided with the VDP generating image data based on a control signal outputted from the main CPU 71, the video RAM temporarily storing the image data generated by the VDP, and the like.

The motor driving circuit 153 is provided with a FPGA (Field Programmable Gate Array) 155 and a driver 154. The motor driving circuit 153 is connected to a stepper motor that rotates the reels 101, 102, 103, 104, and 105.

The FPGA155 is a programmable electronic circuit such as LSI and functions a s control circuit of the stepper motor. The driver 154 functions as a circuit for amplifying pulses input to the stepper motor.

The index detection circuit 151 detects the positions of the rotating reels 101, 102, 103, 104, and 105, and is able to detect the step out of the reels 101, 102, 103, 104, and 105.

The position change detection circuit 152 detects changes in the stop positions of the reels 101, 102, 103, 104, and 105 after the reels 101, 102, 103, 104, and 105 stop the rotation. For example, the position change detection circuit 152 detects a change in the stop positions of the reels 101, 102, 103, 104, and 105 when, even if a combination of symbols 501 does not relate to winning, a stop position is changed to form a winning combination of the symbols 501 by an external unfair action. The position change detection circuit 152 is arranged to be able to detect a change in the stop positions of the reels 101, 102, 103, 104, and 105 by detecting fins (not illustrated) attached to the inside of each of the reels 101, 102, 103, 104, and 105 at predetermined intervals.

Non-limiting examples of the excitation method of the stepper motor include 1-2 phase excitation and 2-phase excitation. A DC motor may be used in place of the stepper motor. When the DC motor is used, the body PCB 110 is connected to an error counter, a D/A converter, and a servo amplifier in this order, and the DC motor is connected to the servo amplifier. The rotational position of the DC motor is detected by a rotary encoder, and the data of the current rotational position is supplied from the rotary encoder to the error counter.

The backlight control circuit M10 is connected to the backlight source M70 of each backlight unit M7 to supply a driving power thereto. Based on an instruction from the main CPU 71, the backlight control circuit M10 changes the amount of illumination light emitted from the backlight source M70 in plural stages. The five backlight units M7 provided on the inner circumferential surfaces of the reels 101, 102, 103, 104, and 105 are able to individually output illumination light from 15 backlight sources M70 to 15 symbols 501 stopped on the display window 150, through the backlight control circuit M10.

The ticket printer 171 prints a barcode, in which data such as the credits stored in the RAM73, date and time, and the identification number of the gaming machine 300 is encoded, on a ticket based on a control signal output from the main CPU 71, and outputs the ticket as a barcoded ticket 175.

The card reader 172 reads data stored in a card inserted in the card slot 176 and sends the data to the main CPU 71, and performs data writing based on a control signal from the data main CPU 71.

The key switch 173S is provided in the keypad 173, and outputs a predetermined signal to the main CPU 71 when the keypad 173 has been operated by the player.

The data displayer 174 displays data read by the card reader 172 and data inputted by the player through the keypad 173, based on a control signal outputted from the main CPU 71.

(Symbols, Combinations, or the Like)

The symbols 501, which are displayed on pseudo reels 101 to 105 of the slot machine 10, form a symbol array. Each symbol 501 constituting the symbol array has a code number for identifying that symbol 501.

The three successive symbols 501 in the symbol array are displayed (provided) at the upper stage, the central stage, and the lower stage of the display region of each of the reels 101 to 105, so that a symbol matrix of 5 columns and 3 rows is formed on the display window 150. The symbols 501 forming the symbol matrix start to scroll (spin) at least when a game starts in response to the pressing of the start button 46. After a predetermined time elapses from the start of the scroll, the scroll of the symbols 501 stops (rearrangement).

In addition to the above, for the symbols 501, various winning combinations are set in advance. A winning combination indicates that an award is established. A winning combination is a combination in which symbols 501 having stopped on a payline L is advantageous for the player. The advantageous state indicates states such as a state that coins corresponding to the winning combination are paid out, a state that the number of coins to be paid out is added to the credits, and a state that a bonus game starts.

The winning combination in the present embodiment is a combination in which a predetermined number or more of symbols 501 of at least one type are rearranged on an activated payline L. When a particular type of symbols 501 is set as a scatter symbol, a winning combination is established when a predetermined number or more of such scatter symbols are rearranged, no matter whether a payline L is activated or not.

In the present embodiment, the types of the symbols are wild symbols 503*a* "WILD", "PALACE", "CAMEL", "SWORD", "A (ACE)", "K (KING", "Q (QUEEN)", "J (JACK", and "10 (TEN", a trigger symbol 503*b* "ENCHANTED LAMP (BONUS)", and a re-spin symbol 503*c* "RING (RESPIN)".

(Details of Display Screen: Payline Box)

Figure 51:
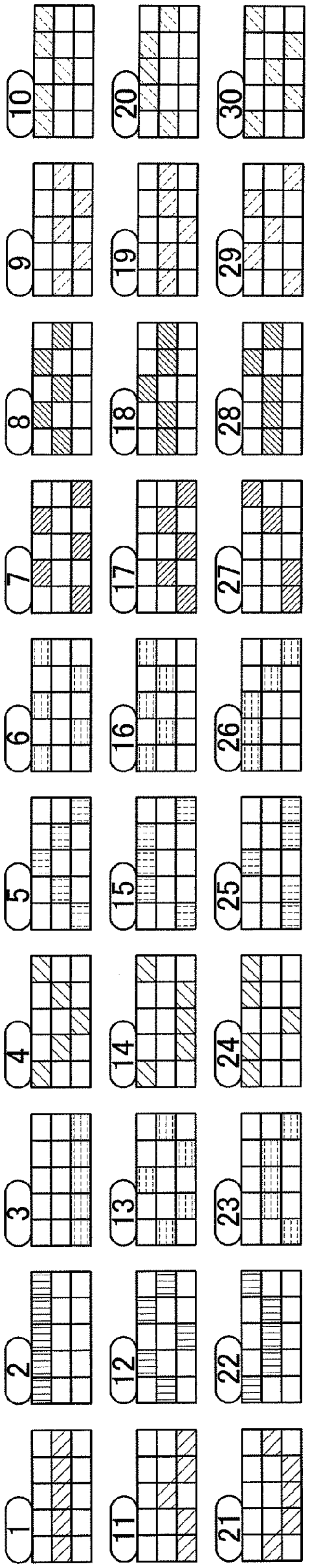
FIG. 51 illustrates the payline box.

The lower image display panel 141 described above forms, as shown in FIG. 51, payline boxes in the display window 150. As the payline boxes forming three rows and five columns are combined, 30 paylines L are formed.

(Data Tables)

A game result and the content of an effect of a game executed by the gaming machine 300 are determined based on random determination conducted with reference to data tables. The following will describe such data tables.

(Data Table: Expand Feature Weight Table)

An expand feature weight table (see FIG. 52) is a table used for determining in which reels 101 to 105 (R1 to R5) the wild symbol 503*a* is stopped in the expand feature. It is noted that, "WILD" indicates that wild symbol 503*a* stops whereas "/WILD" indicates that the wild symbol 503*a* does not stop. Each of the stop patterns of the wild symbol 503*a* is provided with a weight, and the winning probability of each pattern is calculated by dividing the total weights by each weight.

(Data Table: Credit Payout Bonus Game Table)

A credit payout bonus game table (see FIG. 53) is a table for determining a credit payout to be obtained in a credit payout bonus game.

(Data Table: Pickup Bonus Game Payout Table)

A pickup bonus game payout table (see FIG. 54) is a table showing the list of credit payouts included in three options in a pickup bonus game.

(Data Table: Pickup Bonus Game Development Table)

A pickup bonus game development table (see FIG. 55) is a table for determining the type of a bonus game included in three options, in the pickup bonus game.

(Data Table: Pickup Bonus Game Redevelopment Table)

A pickup bonus game redevelopment table (see FIG. 56) is a table for randomly determining redevelopment to the bonus game when the development to the bonus is not achieved in three options in the pickup bonus game.

(Data Table: Expand Wild Occurrence Random Determination Table)

An expand wild occurrence random determination table (see FIG. 57) is a table for determining whether to execute an expand bonus game.

(Data Table: Expand Wild Rank Determination Table)

An expand wild rank determination table (see FIG. 58) is a table for executing preliminary random determination for determining in which reels 101 to 105 the wild symbol 503*a* is stopped in the expand bonus game.

(Data Table: Expand Wild Random Determination Table (LOW))

An expand wild random determination table (LOW) (see FIG. 59) is a table for determining the stop position of the wild symbol 503*a* when in the expand bonus game "LOW" is selected in the expand wild rank determination table.

(Data Table: Expand Wild Random Determination Table (MIDDLE))

An expand wild random determination table (MIDDLE) (see FIG. 60) is a table for determining the stop position of the wild symbol 503*a* when in the expand bonus game "MIDDLE" is selected in the expand wild rank determination table.

(Data Table: Expand Wild Random Determination Table (HIGH))

An expand wild random determination table (HIGH) (see FIG. 61) is a table for determining the stop position of the wild symbol 503*a* when in the expand bonus game "HIGH" is selected in the expand wild rank determination table.

(Data Table: Expand Wild Revival Random Determination Table)

An expand wild revival random determination table (see FIG. 62) is a table for determining whether the game is continued, when in the expand bonus game the number of times of execution of the free game becomes 0.

(Data Table: Expand Wild Additional Number of Execution Random Determination Table)

The expand wild additional number of execution random determination table (see FIG. 63) is a table for determining the number of times of execution of the free game to be added, when in the expand bonus game the free game is continued.

(Data Table: Multi-Type Bonus Game Benefit Random Determination Table)

A multi-type bonus game benefit random determination table (see FIG. 64) is a table for randomly determining a benefit awarded to the player in the multi-type bonus game.

(Data Table: Multi-Type Bonus Game Fixed Payout Random Determination Table)

A multi-type bonus game fixed payout random determination table (see FIG. 65) is a table for randomly determining a value when a fixed payout is awarded as a benefit to the player in the multi-type bonus game.

(Data Table: Multi-Type Bonus Game Random Determination Table)

A multi-type bonus game random determination table (see FIG. 66) is a table for randomly determining an option when the number of times of execution of the free game is added as a benefit to the player in the multi-type bonus game.

(Data Table: Multi-Type Bonus Game Additional Number of Execution Type Table)

A multi-type bonus game additional number of execution type table (see FIG. 67) is a table for randomly determining the type of an option when the number of times of execution of the free game is added as a benefit to the player in the multi-type bonus game.

(Data Table: Multi-Type Bonus Game Line Payout Rate Random Determination Table)

A multi-type bonus game line payout rate random determination table (see FIG. 68) is a table storing the type of an option when the number of times of execution of the free game is added as a benefit to the player in the multi-type bonus game.

(Data Table: Multi-Type Bonus Game Revival Random Determination Table)

A multi-type bonus game revival random determination table (see FIG. 69) is a table for determining whether to continue the game, when the number of times of execution of the free game becomes zero in the multi-type bonus game.

(Data Table: Multi-Type Bonus Game Additional Number of Execution Random Determination Table)

A multi-type bonus game additional number of execution random determination table (see FIG. 70) is a table for determining the number of times of execution of the free game to be added, when the free game is continued in the multi-type bonus game.

(Data Table: Normal Game Symbol Random Determination Table)

A normal game symbol random determination table (FIG. 71) is a table for randomly determining symbols used in the base game.

(Data Table: Re-Spinning Feature First Time Symbol Random Determination Table)

A re-spinning feature first time symbol random determination table (FIG. 72) is a table for randomly determining symbols used in the re-spinning feature of the first time.

(Data Table: Re-Spinning Feature Second Time Symbol Random Determination Table)

A re-spinning feature second time symbol random determination table (see FIG. 73) is a table for randomly determining symbols used in the re-spinning feature of the second time.

(Data Table: Multi Bonus Common Symbol Random Determination Table)

A multi bonus common symbol random determination table (see FIG. 74) is a table for randomly determining symbols used in the multi-type bonus game.

(Data Table: Multi Bonus Payout Rate Symbol Random Determination Table)

A multi bonus payout rate symbol random determination table (see FIG. 75) is a table for randomly determining symbols used in the multi-type bonus game.

(Data Table: Expand Symbol Random Determination Table)

An expand symbol random determination table (see FIG. 76) is a table for randomly determining symbols used in the expand feature, the expand bonus game, and the multi-type bonus game.

(Other Arrangements)

Arrangements other than the above will be described below.

(VFD)

Figure 77:
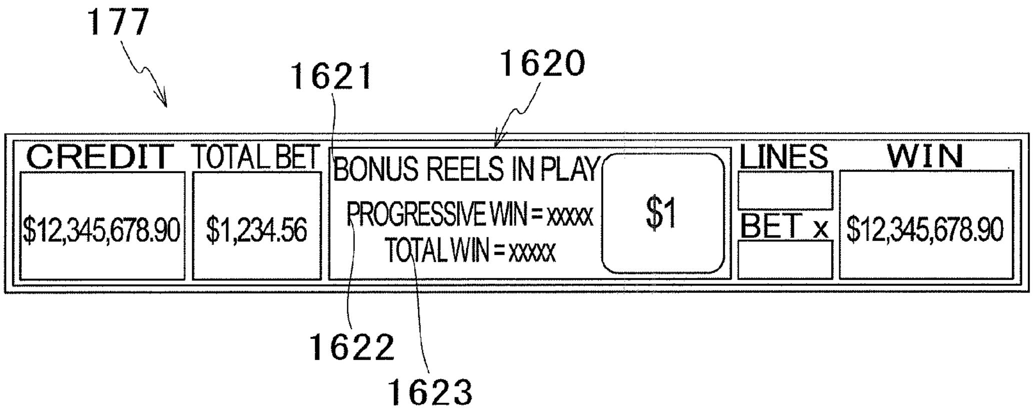
FIG. 77 shows an example of VFD display in the gaming machine.

FIG. 77 shows a display screen of a VFD 177 of the PTS terminal 700. At the center of the VFD 177 is provided a game status area 1620 for displaying the status of the game. The game status area 1620 displays a bonus state 1621, a winning detail 1622, an obtained credit 1623, or the like. Furthermore, credits, the total number of bets, denomination, lines, bet, and the WIN meter are displayed.

(WIN Plate)

When a winning is achieved, the text “WIN XXX CREDITS” is displayed. The WIN information is displayed such that “LINE 123 WIN=123456”, “LINE 123 WIN× 12=123456”, and “TOTAL WIN=123456”. When a two-line winning is achieved in the normal game, all lines are simultaneously illuminated for one second. The adjustment of the number of seconds is carried out. More specifically, a line WIN frame is illuminated for 0.5 second from the smallest line to the largest line. At the same time, WIN information is displayed. The symbol flickers (in sync with the flickering at the switching of the line WIN at intervals of one second). The next line WIN frame is illuminated for 0.5 second. The symbol flickers (in sync with the switching of the line WIN). The WIN information is also switched. The operation above is repeated from the occurrence of winning to the start of the next game. When the credit becomes 0, the plate disappears when 90 seconds elapse from the time at which the credit meter becomes 0. The WIN signboard (plate) disappears when one of the following cases occurs: When cashout is conducted; When the bet button is pressed; When the MAXBET button is pressed; When the spin button is pressed; or When a credit is inserted.

When both scatter WIN and line WIN are achieved, both of the images indicating these WINs are simultaneously illuminated for one second. The animation for the scatter WIN, such as the illumination of the frame, is conducted (for 0.5 second) and the WIN information is displayed. The symbol flickers. After the scatter, the line WIN frame is illuminated for 0.5 second. The WIN information is switched. The symbol flickers. The operation above is repeated from the occurrence of the winning to the start of the next game. When the credit becomes 0, the plate disappears when 90 seconds elapse from the timing at which the credit meter becomes 0. The WIN signboard (plate) disappears when one of the following cases occurs: When cashout is conducted; When the bet button is pressed; When the MAXBET button is pressed; When the spin button is pressed; or When a credit is inserted. After the end of the bonus, the image display is returned to the state when the bonus game is triggered.

(Big WIN Effect)

When “5 OF A KIND” is established, a sound and visual effect is executed irrespective of the size of the combination. When 5 Kind is established at the stop of the reels, the text “5 OF A KIND” is displayed on the upper image display panel 142 for around 2 seconds, and sound corresponding to the symbol where the “5 OF A KIND” is established is output. The voice, sound effect or the like of the sound is preferably changed in accordance with each combination of the symbols. At this stage, the increment of the WIN meter or the like does not occur. Thereafter, the random determination of a multiplier is conducted. Then a payout is determined in accordance with the multiplier and the WIN meter conducts increment display. Then the scatter WIN is displayed and the symbol where the "5 OF A KIND" is established flickers.

When winning with 10/1 or higher and smaller than 25/1 occurs without the establishment of the "5 OF A KIND", the multiplier is randomly determined before the WIN display, after the reels are stopped. Then a text "BIG WIN" is displayed on the display or the like. This image display preferably disappears after a predetermined time (e.g., 5 seconds) elapses. Immediately after being displayed, in the image display a large WIN meter exclusively for "BIG WIN" is incremented. The speed of the increment is preferably identical with the speed of the meter in the VFD. The increment display disappears when the next spinning starts or when the cashout button is pressed. The WIN line involved in the "BIG WIN" is simultaneously displayed.

When winning with 10/1 or higher and smaller than 25/1 occurs with the establishment of the "5 OF A KIND", the text "5 OF A KIND" is displayed on the upper image display panel 142 for about 2 seconds and sound corresponding to the symbol where the "5 OF A KIND" is established is output. The voice, sound effect or the like of the sound is preferably changed in accordance with each combination of the symbols. At this stage, the increment of the WIN meter or the like does not occur. Thereafter, the random determination of a multiplier is conducted. Then a text "BIG WIN" is displayed on the display or the like. This image display preferably disappears after a predetermined time (e.g., 5 seconds) elapses. Immediately after being displayed, in the image display a large WIN meter exclusively for "BIG WIN" is incremented. The speed of the increment is preferably identical with the speed of the meter in the VFD. The increment display disappears when the next spinning starts or when the cashout button is pressed. The WIN line involved in the "BIG WIN" is simultaneously displayed.

(Demonstration)

It is very important to attract the attention of the customers, because a lot of machines are installed in a casino floor. For this reason, the reels are illuminated by LEDs as an effect to allow distant customers to notice the existence of the machine. More specifically, in the idle state in which the credit of the credit meter and the money amount display indicate "zero", the demonstration of the gaming machine automatically starts when 90 seconds elapse after both of the values become zero. The demonstration is executed by using the reels, the top portion, the LEDs on the both sides of the upper display, or the like. When a credit is inserted, when the help is displayed, or when the AUDIT is conducted during the demonstration, the demonstration is immediately terminated and the machine becomes in the idle state. Furthermore, when the demonstration is completed from the start to the end, the machine becomes in the idle state. When the demonstration occurs as a predetermined occurrence condition is satisfied, the demonstration may not be interrupted even if game buttons such as the bet button and the spin button are pressed. In time series, the demonstration starts when 90 seconds elapse in the idle state after the credit and money amount become zero. When money is inserted, when the change button or the help button is pressed, or when the AUDIT is conducted during the demonstration, the demonstration is terminated and the machine becomes in the idle state. The idle state returns when the demonstration finishes. In the present embodiment, the "genie appearance effect" described with reference to FIG. 11 to FIG. 15 may be conducted in the demonstration. In the "genie appearance effect" conducted in the demonstration, after the genie (character image 1420*d*) is displayed, a message different from the message in the game is preferably displayed. For example, when the character image 1420*d* is displayed, the player is notified of the awarding of a benefit.

(Structure of Control Panel)

As shown in FIG. 19, the control panel 30 is provided with buttons 31 to 38, 45, and 46 (a change button 31, a cashout button 32, a help button 33, a 1-BET button 34, a 2-BET button 35, a 3-BET button 36, a 4-BET button 37, a 5-BET button 38, a gamble button 45, and a start button 46). Each of the button 31 to 38, 45, and 46 includes a light source therein, and the state of lighting of the light source (on/off) is viewable from the outside. When a game with a high-power mode is available, a high-power button may be provided.

When the RAM of the gaming machine 300 is empty, the buttons of the control panel 30 operate as below. When the change button 31 is pressed, the light is turned on or off. Although not illustrated, the change button 31 has a text string "CHANGE" or "RESERVE". The cashout button 32 is in the off state and cannot be operated. Although not illustrated, the cashout button 32 has a text string "CASHOUT/TAKE WIN", "CASHOUT", or "COLLECT". The help button 33 is in the on state and is operable. Although not illustrated, the help button 33 has a text string "HELP" or "GAME RULES". The BET buttons 34 to 38 (1-BET button 34, 2-BET button 35, 3-BET button 36, 4-BET button 37, and 5-BET button 38) are in the off state but are operable. Although not illustrated, the BET buttons 34 to 38 have text strings "BET1", "BET2", "BET3", "BET4", and "BET5", respectively. Alternatively, the text strings on the BET buttons 34 to 38 may be switched in accordance with a preset pattern of betting The start button 46 is in the off state and cannot be operated. Although not illustrated, the start button 46 has a text string "SPIN". When the high-power button is provided, the button is in the off state and is not operable. The high-power button preferably has a text string "HIGH POWER".

(Details of Operations of Control Panel 30: Idle State (No Credits))

When the gaming machine 300 is in the idle state with no credits, the buttons on the control panel 30 are arranged as follows. When the change button 31 is pressed, the light is turned on or off. The cashout button 32 is in the off state and cannot be operated. The help button 33 is in the on state and is operable. The BET buttons 34 to 38 are arranged to indicate the betting in the previous game and are operable. That is to say, when 1 BET is made in the previous game, the 1-BET button 34 is in the on state whereas the 2-BET button 35, the 3-BET button 36, the 4-BET button 37, and the 5-BET button 38 are in the off state. The start button 46 is in the off state and cannot be operated. The high-power button is in the off state and cannot be operated.

(Details of Operations of Control Panel 30: Idle State (with Credit))

When the gaming machine 300 is in the idle state with a credit, the buttons on the control panel 30 operate as follows. When the change button 31 is pressed, the light is turned on or off. The cashout button 32 is in the on state and is operable. The help button 33 is in the on state and is operable. The BET buttons 34 to 38 indicate the betting in the previous game and are operable. The start button 46 is in the on or off state in accordance with the remaining credits. The button is operable when turned on, and cannot be operated when turned off. That is to say, the start button 46 is turned on when the credits that the player has betted is not larger than the remaining credits. When the start button 46 in this state is pressed, a game starts in the normal mode. When the credits betted by the player is larger than the remaining credits, the start button is turned off. The gamble button 45 is in the on or off state in accordance with the remaining credits. The gamble button is operable when turned on, and cannot be operated when turned off. That is to say, the gamble button 45 is turned on when the credits betted by the player is not larger than the remaining credits. If the high-power button is pressed in this state, a game starts in the high-power mode. When the credits betted by the player is larger than the remaining credits, the gamble button 45 is turned off.

When the gaming machine 300 is in an error state, the buttons of the control panel 30 are arranged as follows. The change button 31 is in the off state and is turned on when pressed. The cashout button 32 is in the off state and cannot be operated. The buttons other than the above are in the off state and cannot be operated.

When the gaming machine 1 is in a state of having recovered from an error, the buttons on the control panel 30 are arranged as follows. The change button 31 is in the off state and cannot be operated. However, the change button 31 is turned on or off when pressed, after 120 seconds elapse from the recover. The cashout button 32 is in the on state and is operable. The help button 33 is in the on state and is operable. The BET buttons 34 to 38 indicate the betting on the previous game and are operable. The start button 46 is in the on or off state in accordance with the remaining credits. The button is operable when turned on, and cannot be operated when turned off. The high-power button is in the on or off state in accordance with the remaining credits. The button is operable when turned on, and cannot be operated when turned off.

When on the control panel 30 the start button 46 or the high-power button is continuously pressed, the buttons on the control panel 30 are arranged as follows. It is noted that it is possible to start a game in the same conditions as in the previous game when the start button 46 or the high-power button is continuously pressed.

The buttons on the control panel 30 operate in a similar manner as in cases where the reels of the gaming machine 300 are spinning as described later or where WIN increment at the time of winning in a normal game is being executed. However, in the case of WIN increment, the game is not over and the next game starts if a button which is in the on state is pressed. That is to say, the WIN increment ends and the next game starts at each winning. When no winning is achieved, the next game starts.

When a feature game is waited for, the start button 46 or the high-power button must be press again.

When the gaming machine 300 is in a state in which help information is displayed as the help button 33 is pressed (i.e., a help screen is displayed), the buttons on the control panel 30 are arranged as follows. When the change button 31 is pressed, the light is turned on or off. The cashout button 32 is in the off state and cannot be operated. The help button 33 is in the on state and the help screen disappears when the button is pressed. The 1-BET button 34 is in the on state, and the help screen is switched to the previous page when the button is pressed. The 2-BET button 35 is in the on state, and the help screen is switched to the next page when the button is pressed. The start button 46 is in the on state and the help screen disappears when the button is pressed. The high-power button is in the on state and the help screen disappears when the button is pressed. The buttons other than the above are in the off state and cannot be operated.

When the gaming machine 300 is spinning the reels, the buttons on the control panel 30 are arranged as follows. The change button 31 is turned on or off when pressed. The start button 46 is in the on state and quick stop is carried out when the button is pressed. The high-power button is in the on state and quick stop is carried out when the button is pressed. The buttons other than the above are in the off state and cannot be operated.

When the gaming machine 300 is displaying an effect screen which is cancellable, the buttons on the control panel 30 are arranged as follows. The change button 31 is turned on or off when pressed. The help button 33 is in the off state and cannot be operated. The start button 46 is in the on state and the effect is canceled when pressed. The high-power button is in the on state and the effect is canceled when pressed. The buttons other than the above are in the off state and cannot be operated.

When the gaming machine 300 is displaying WIN increment (incremental display of obtained amount) at the time of achieving a winning in a normal game, the buttons on the control panel 30 are arranged as follows. The change button 31 is turned on or off when pressed. The cashout button 32 is in the on state. When the button is pressed, the WIN increment is canceled and the game becomes over. The help button 33 is in the off state and cannot be operated. The BET buttons 34 to 38 indicate the betting on the previous game. When one of these buttons is pressed, the game becomes over and the BET corresponding to the button is selected. The start button 46 is in the on state. When the button is pressed, the WIN increment is canceled, the game becomes over, and the next game starts if the remaining credits allow repeat BET. The high-power button is in the on state. When the button is pressed, the WIN increment is canceled, the game becomes over, and the next game starts if the remaining credits allow repeat BET. When the gamble game is available, the WIN increment is canceled and the GAMBLE screen is displayed when the gamble button 45 is pressed.

When the gaming machine 300 is conducting the WIN increment (incremental display of obtained amount) at the time of achieving a winning in a free game, the buttons on the control panel 30 are arranged as follows. The change button 31 is turned on or off when pressed. The cashout button 32 is in the on state. When the button is pressed, the WIN increment is canceled and the next game starts if available. When the number of remaining games is zero, a screen indicating the total obtained credits in the free game is displayed. The help button 33 is in the off state and cannot be operated. The BET buttons 34 to 38 indicate the betting on the previous game. When one of the buttons is pressed, the WIN increment is canceled and the next game starts if available. When the number of remaining games is zero, a screen indicating the total obtained credits in the free game is displayed. The start button 46 is turned on. When the button is pressed, the WIN increment is canceled and the next game starts if available. When the number of remaining games is zero, a screen indicating the total obtained credits in the free game is displayed. The high-power button is in the on state. When the button is pressed, the WIN increment is canceled and the next game starts if available. When the number of remaining games is zero, a screen indicating the total obtained credits in the free game is displayed.

When the gaming machine 300 wins a free game and a trigger payout is incremented, the buttons on the control panel 30 are arranged as follows. The change button 31 is turned on or off when pressed. The help button 33 is in the off state and cannot be operated. The start button 46 is in the on state, and the shifting to the next step is conducted when the button is pressed. The high-power button is in the on state, and the shifting to the next step is conducted when the button is pressed. The buttons other than the above are in the off state and cannot be operated.

When the gaming machine 300 is waiting for the selection in a selection game, the buttons on the control panel 30 are arranged as follows. The change button 31 is turned on or off when pressed. The cashout button 32 is in the off state and cannot be operated. The help button 33 is in the off state and cannot be operated. Each of the BET buttons 34 to 38 is in the off state and cannot be operated if it is not associated with a selection button. Each of the BET buttons 34 to 38 is in the on state and is operable if it is associated with the selection button. The start button 46 and the high-power button are in the off state and cannot be operated.

When the gaming machine 300 is displaying a screen indicating the total obtained credits after a free game in the normal mode (i.e., increment display of the total obtained credits), the buttons on the control panel 30 are arranged as follows. The change button 31 is turned on or off when pressed. The cashout button 32 is in the off state and cannot be operated. The start button 46 and the high-power button are in the off state and cannot be operated until four seconds elapse from the display of the screen. Furthermore, the start button 46 and the high-power button are turned on after four seconds elapse from the display of the screen, and the increment is canceled when one of the buttons is pressed. The buttons other than the above are in the off state and cannot be operated.

When the gaming machine 300 is displaying a screen indicating the total obtained credits after a free game in the high-power mode (i.e., increment display of the total obtained credits), the buttons on the control panel 30 are arranged as follows. The change button 31 is turned on or off when pressed. The cashout button 32 is in the off state and cannot be operated. The start button 46 and the high-power button are in the off state and cannot be operated until two seconds elapse from the display of the screen. Furthermore, the start button 46 and the high-power button are turned on after two seconds elapse from the display of the screen, and the increment is canceled when one of the buttons is pressed. The buttons other than the above are in the off state and cannot be operated.

(Control Panel: Button Effects)

The gaming machine 300 operates as below in response to inputs to the control panel. The operations can be enabled and disabled by the AUDIT. For example, the operations are enabled or disabled in accordance with the country of shipment of the gaming machine.

In the gaming machine 300, auto re-betting (making betting identical with the betting on the previous game) is performed when a button is continuously pressed. For example, a scatter-type gaming machine may be arranged so that auto re-betting is set only when the spin button (start button) is pressed, and the pressing of the button again is requested when a feature game is waited for. Furthermore, for example, a payline-type gaming machine may be arranged so that, auto re-betting is activated by means of a repeat bet button of the touch panel or the control panel, and the pressing of the button or a start feature again is requested when the feature game is waited for.

In the gaming machine 300, furthermore, it is possible to cancel a winning effect (such as increment) and to start the next game by pressing a button. In the gaming machine 300, furthermore, it is possible to skip the rotation of the reels (quick stop) by pressing a button while the reels are rotating. In the gaming machine 300, furthermore, it is possible to antecedently input the cancellation of a winning effect by pressing a button during the bound (e.g., during an effect at reel stop). In the gaming machine 300, furthermore, it is possible to antecedently input the cancellation of a wining effect and the start of the next game by pressing a button during the bound (e.g., during an effect at reel stop).

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine comprising:

a display on which images associated with the play of a game are displayed;

a console with a plurality of input buttons;

a three-dimensional, formed object supplemental to the display, provided between the display and the console, with a light emitting portion so that the lighting state of the light emitting portion is viewable from the outside;

optical sensors provided along the periphery of the formed object and configured to detect a player's gesture of rubbing the formed object along the periphery of the formed object, as each of the sensors is turned on or off by the player in a contactless manner; and a controller used to start a game, the controller being programmed to execute the steps of: (A) starting the detection of the player's gesture by the sensors at a timing corresponding to the state of the game; and (B) while in the step (A) the player's gesture is being detected, causing the light emitting portion to emit light in a light emission mode in sync with the detected player's gesture while causing a character to appear on the display as if the character is emanating from the formed object.

2. A gaming machine comprising:

a display on which images associated with the play of a game are displayed;

a console with a plurality of input buttons;

a three-dimensional, formed object supplemental to the display, provided between the display and the console, with a light emitting portion so that the lighting state of the light emitting portion is viewable from the outside;

optical sensors provided along the periphery of the formed object and configured to detect a player's gesture of rubbing the formed object along the periphery of the formed object, as each of the sensors is turned on or off by the player in a contactless manner; and a controller used to start a game, the controller being programmed to execute the steps of: (A) in the game, at a timing of the end of a particular state, starting to detect the player's gesture by the sensors, (B) during a predetermined time in which the player's gesture is detected in the step (A), causing the light emitting portion to emit light in a first light emission mode in sync with the detected player's gesture while causing a character to appear on the display as if the character is emanating from the formed object; and (C) after the predetermined time, causing the light emitting portion to emit light in a second light emission mode which is different from the first light emission mode.

3. A gaming machine comprising:

a display on which images associated with the play of a game are displayed;

a console with a plurality of input buttons;

a three-dimensional, formed object supplemental to the display, provided between the display and the console, with a light emitting portion so that the lighting state of the light emitting portion is viewable from the outside;

optical sensors provided along the periphery of the formed object and configured to detect a player's gesture of rubbing the formed object along the periphery of the formed object, as each of the sensors is turned on or off by the player in a contactless manner; and a controller used to start a game, the controller being programmed to execute the steps of: (A) starting the detection of the player's gesture by the sensors at a timing corresponding to the state of the game; (B) during a predetermined time in which the player's gesture is detected in the step (A), causing the first light emitting portion and the second light emitting portion to emit light in a first light emission mode in sync with the detected player's gesture while causing a character to appear on the display as if the character is emanating from the formed object; and (C) after the predetermined time, causing the first light emitting portion to emit light in a second light emission mode which is different from the first light emission mode, while keeping the second light emitting portion to emit light in the first light emission mode.

4. The gaming machine according to claim 1, wherein the controller is further programmed to cause the display to display an effect image in sync with the detected player's gesture.

5. The gaming machine according to claim 2, wherein the controller is further programmed to cause the display to display an effect image in sync with the detected player's gesture.

6. The gaming machine according to claim 3, wherein the controller is further programmed to cause the display to display an effect image in sync with the detected player's gesture.

* * * * *